(12) United States Patent
Ma et al.

(10) Patent No.: US 11,509,397 B2
(45) Date of Patent: Nov. 22, 2022

(54) BALANCED PHOTONIC ARCHITECTURES FOR MATRIX COMPUTATIONS

(71) Applicant: Celestial AI Inc., Sunnyvale, CA (US)

(72) Inventors: Yangjin Ma, New York, NY (US); Nikolaos Pleros, Salonika (GR); David Lazovsky, Los Gatos, CA (US); George Giamougiannis, Salonika (GR); Apostolos Tsakyridis, Salonika (GR); Angelina Totovic, Central Macedonia (GR); Martinus Bos, San Jose, CA (US); Philip Winterbottom, San Jose, CA (US)

(73) Assignee: Celestial AI Inc., Santa Clara, CA (US)

( * ) Notice: Subject to any disclaimer, the term of this patent is extended or adjusted under 35 U.S.C. 154(b) by 0 days.

(21) Appl. No.: 17/645,001

(22) Filed: Dec. 17, 2021

(65) Prior Publication Data
US 2022/0263582 A1    Aug. 18, 2022

Related U.S. Application Data

(60) Provisional application No. 63/201,155, filed on Apr. 15, 2021, provisional application No. 63/199,412, (Continued)

(51) Int. Cl.
*H04B 10/516*    (2013.01)
*H04J 14/02*     (2006.01)
*H04B 10/61*     (2013.01)

(52) U.S. Cl.
CPC ......... *H04B 10/516* (2013.01); *H04B 10/614* (2013.01); *H04J 14/0267* (2013.01); *H04J 14/0278* (2013.01)

(58) Field of Classification Search
None
See application file for complete search history.

(56) References Cited

U.S. PATENT DOCUMENTS

| 4,934,775 | A | * | 6/1990 | Koai | H04Q 11/0005 385/16 |
| 5,457,563 | A | * | 10/1995 | Van Deventer | H04B 10/64 398/204 |

(Continued)

FOREIGN PATENT DOCUMENTS

| WO | WO-2020191217 A1 | 9/2020 |
| WO | WO-2021021787 A1 | 2/2021 |
| WO | WO-2022032105 A1 | 2/2022 |

OTHER PUBLICATIONS

"International Application Serial No. PCT/US2021/044956, International Search Report dated Nov. 19, 2021", 4 pgs.

(Continued)

*Primary Examiner* — David W Lambert
(74) *Attorney, Agent, or Firm* — Ray Quinney & Nebeker P.C.; Paul N. Taylor

(57) ABSTRACT

Vector and matrix multiplications can be accomplished in photonic circuitry by coherently combining light that has been optically modulated, in amplitude and/or phase, in accordance with the vector and matrix components. Disclosed are various beneficial photonic circuit layouts characterized by loss- and delay-balanced optical paths. In various embodiments, loss balancing across paths is achieved with suitable optical coupling ratios and balanced numbers of waveguide crossings (using dummy crossings where needed) across the paths. Delays are balanced in some embodiments with geometrically delay-matched optical paths.

23 Claims, 24 Drawing Sheets

Related U.S. Application Data filed on Dec. 23, 2020, provisional application No. 63/199,286, filed on Dec. 17, 2020.

(56) References Cited

U.S. PATENT DOCUMENTS

| | | | |
|---|---|---|---|
| 9,495,295 | B1 | 11/2016 | Dutt et al. |
| 2015/0354938 | A1 | 12/2015 | Mower et al. |
| 2018/0260703 | A1 | 9/2018 | Soljacic et al. |
| 2019/0049665 | A1* | 2/2019 | Ma .................... H01L 33/58 |
| 2019/0294199 | A1 | 9/2019 | Carolan et al. |
| 2019/0356394 | A1* | 11/2019 | Bunandar ............ G06N 3/084 |
| 2019/0372589 | A1* | 12/2019 | Gould ................... H04B 10/25 |
| 2020/0250532 | A1* | 8/2020 | Shen ...................... G06E 3/008 |
| 2021/0036783 | A1* | 2/2021 | Bunandar ............ G06N 3/084 |
| 2021/0173238 | A1* | 6/2021 | Hosseinzadeh ...... H04B 10/506 |
| 2022/0012582 | A1 | 1/2022 | Pieros et al. |
| 2022/0044092 | A1 | 2/2022 | Pieros et al. |
| 2022/0045757 | A1 | 2/2022 | Pieros et al. |

OTHER PUBLICATIONS

"International Application Serial No. PCT/US2021/044956, Written Opinion dated Nov. 19, 2021", 7 pgs.
"International Application Serial No. PCT/US2021/073003, International Search Report dated Mar. 22, 2022", 5 pgs.
"International Application Serial No. PCT/US2021/073003, Written Opinion dated Mar. 22, 2022", 8 pgs.
Agrawal, Govind, "Chapter 4—Optical Receivers", Fiber-Optic Communications Systems, John Wiley & Sons, Inc., (2002), 133-182.
Burgwal, Roel, et al., "Using an imperfect photonic network to implement random unitaries,", Opt. Express 25(23), (2017), 28236-28245.
Capmany, Francoy, et al., "The programmable processor.", Nature Phontonics 10:6, (2016), 5 pgs.
Carolan, Jacques, et al., "Universal Linear Optics", arXiv:1505.01182v1, (2015), 13 pgs.
Clements, William, et al., "Optimal design for universal multiport interferometers", Optica, vol. 3, No. 12, (2016), 1460-1465.
Eltes, Felix, et al., "A BaTiO3-Based Electro-Optic Pockels Modulator Monolithically Integrated on an Advanced Silicon Photonics Platform", J. Lightwave Technol. vol. 37, No. 5, (2019), 1456-1462.
Eltes, Felix, et al., "Low-Loss BaTiO3—Si Waveguides for Nonlinear Integrated Photonics", ACS Photon., vol. 3, No. 9, (2016), 1698-170.
Harris, N C, et al., "Efficient, compact and low loss thermo-optic phase shifter in silicon", Opt. Express, vol. 22, No. 9, (2014), 7 pgs.
Jiang, W, "Nonvolatile and ultra-low-loss reconfigurable mode (De)multiplexer/switch using triple-waveguide coupler with Ge2Sb2Se4Te1 phase change material,", Sci. Rep., vol. 8, No. 1, (2018), 12 pgs.
Lambrecht, Joris, et al., "90-Gb/s NRZ Optical Receiver in Silicon Using a Fully Differential Transimpedance Amplifier,", Journal of Lightwave Technology, vol. 37, No. 9, (2019), 1964-1973.

Manolis, A, et al., "Non-volatile integrated photonic memory using GST phase change material on a fully etched Si3N4/SiO2 waveguide", Conference on Lasers and Electro-Optics, OSA Technical Digest, paper STh3R.4, (2020), 2 pgs.
Miller, David A, "Perfect optics with imperfect components", Optica, vol. 2, No. 8, (2015), 747-750.
Miller, David A, et al., "Self-Configuring Universal Linear Optical Component", Photon. Res. 1, [Online], Retrieved from the Internet: <URL: https://arxiv.org/ftp/arxiv/papers/1303/1303.4602.pdf>, (2013), 1-15.
Miscuglio, Mario, et al., "Photonic Tensor cores for machine learning", Applied Physics Reviews vol. 7, Issue 3. arXiv:2002.03780, (2020), 16 pgs.
Mourgias-Alexandris, G, et al., "An all-optical neuron with sigmoid activation function", Optics Express, vol. 27, No. 7, (Apr. 2019), 11 pgs.
Mourgias-Alexandris, George, et al., "Neuromorphic Photonics with Coherent Linear Neurons Using Dual-IQ Modulation Cells", Journal of Lightwave Technology. vol. 38, No. 4, (Feb. 15, 2020), 811-819.
Pai, Sunil, et al., "Parallel Programming of an Arbitrary Feedforward Photonic Network,", IEEE Journal of Selected Topics in Quantum Electronics, vol. 26, No. 5, (2020), 13 pgs.
Perez, Daniel, et al., "Reconfigurable lattice mesh designs for programmable photonic processors", Optics Express vol. 24, Issue 11, (2016), 14 pgs.
Reck, M, et al., "Experimental Realization of any Discrete Unitary Operator", Phys. Rev. Lett. 73, (1994), 58-61.
Shen, Yichen, et al., "Deep learning with coherent nanophotonic circuits", https://arxiv.org/pdf/1610.02365.pdf, (2016), 8 pgs.
Shi, Bin, et al., "Numerical Simulation of an InP Photonic Integrated Cross-Connect for Deep Neural Networks on Chip", Applied Sciences, (Jan. 9, 2020), 1-15.
Shokraneh, Farhad, et al., "The diamond mesh, a phase-error- and loss-tolerant field-programmable MZI-based optical processor for optical neural networks", Opt. Express, 28(16), (2020), 23495-23508.
Sun, Chen, et al., "A 45 nm CMOS-SOI monolithic photonics platform with bit-statistics-based resonant microring thermal tuning,", EEE Journal of Solid-State Circuits, vol. 51, No. 4, (2016), 20 pgs.
Tait, Alexander, et al., "Broadcast and Weight: An Integrated Network for Scalable Photonic Spike Processing,", Journal of Lightwave Technology, vol. 32, No. 21, (2014), 4029-4041.
Yang, Lin, et al., "On-chip CMOS-compatible optical signal processor", Opt. Express 20(12), (2012), 13560-13565.
Zhuang, L, et al., "Programmable photonic signal processor chip for radiofrequency applications", Optica 2, 854-859, (2015), 10 pgs.
U.S. Appl. No. 17/305,486, filed Jul. 8, 2021, Neuromorphic Photonics With Coherent Linear Neurons.
U.S. Appl. No. 17/395,849, filed Aug. 6, 2021, Coherent Photonic Computing Architectures.
U.S. Appl. No. 17/395,903, filed Aug. 6, 2021, Coherent Photonic Computing Architectures.

* cited by examiner

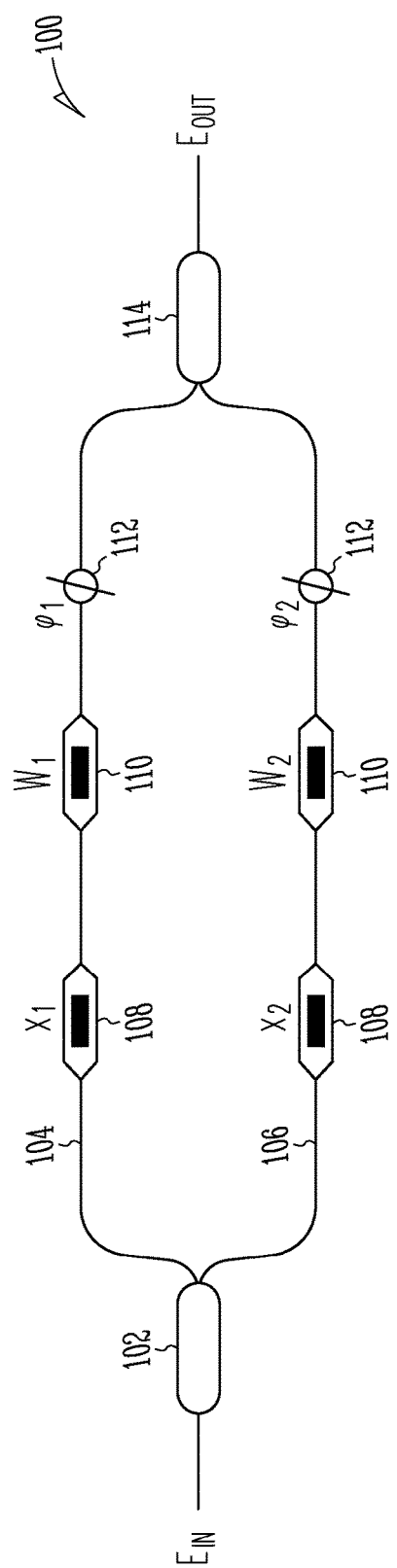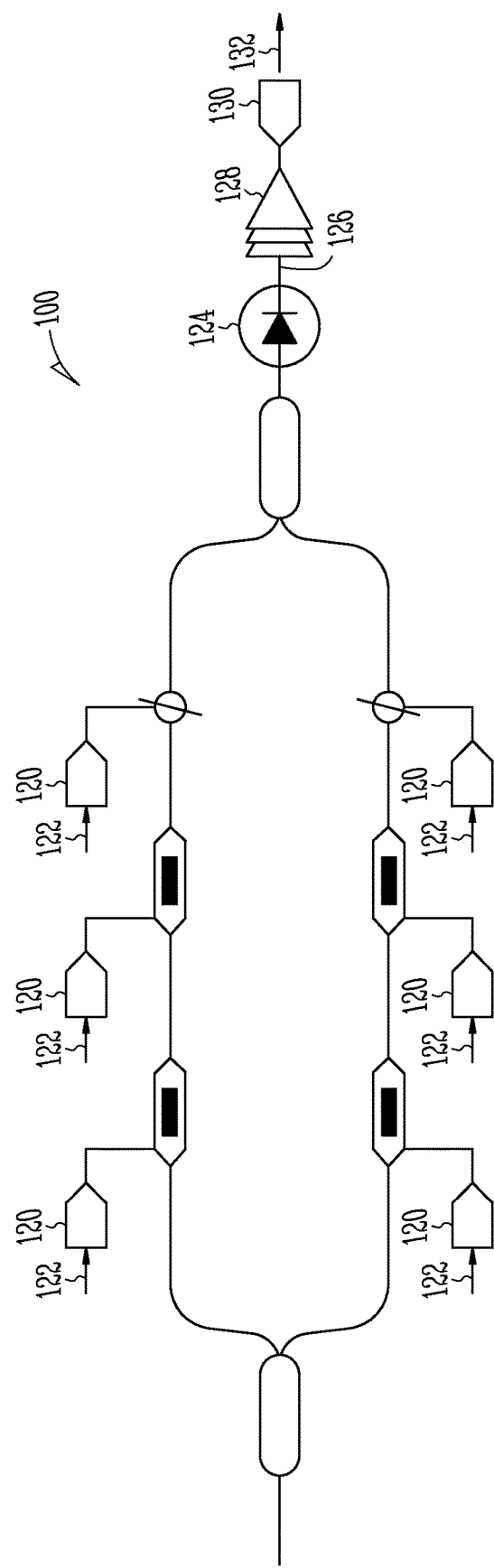

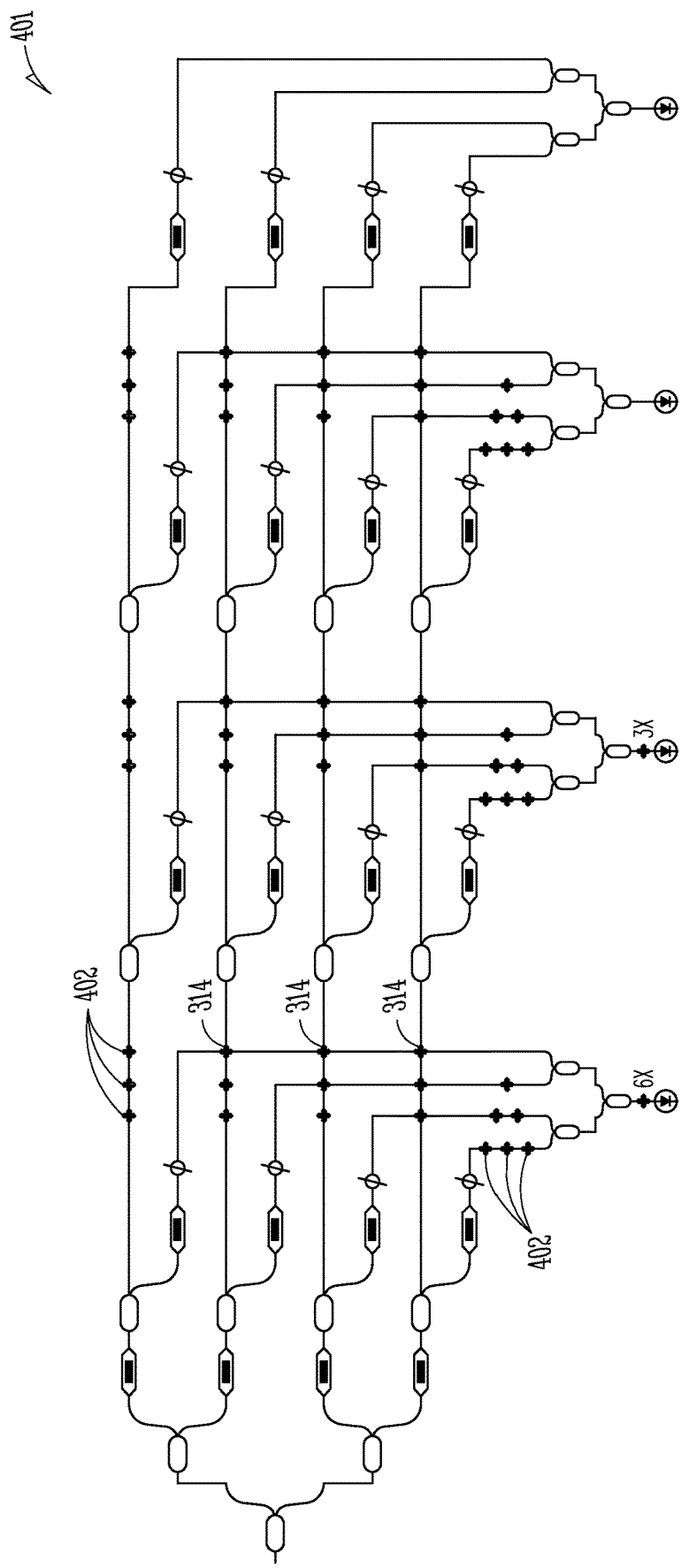

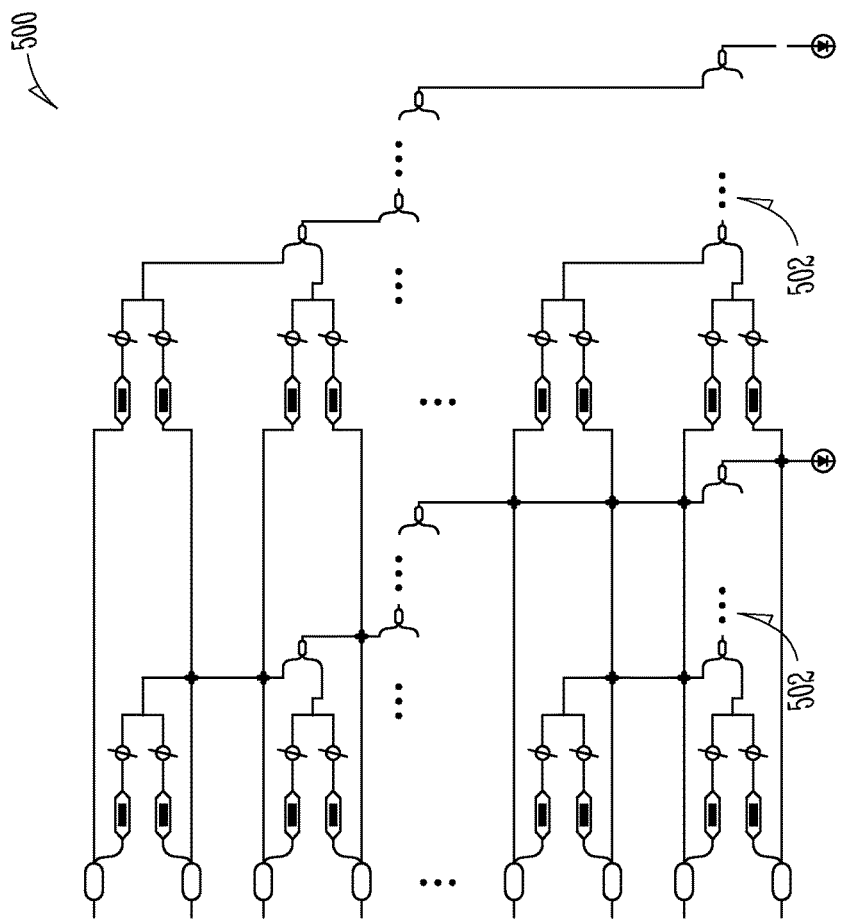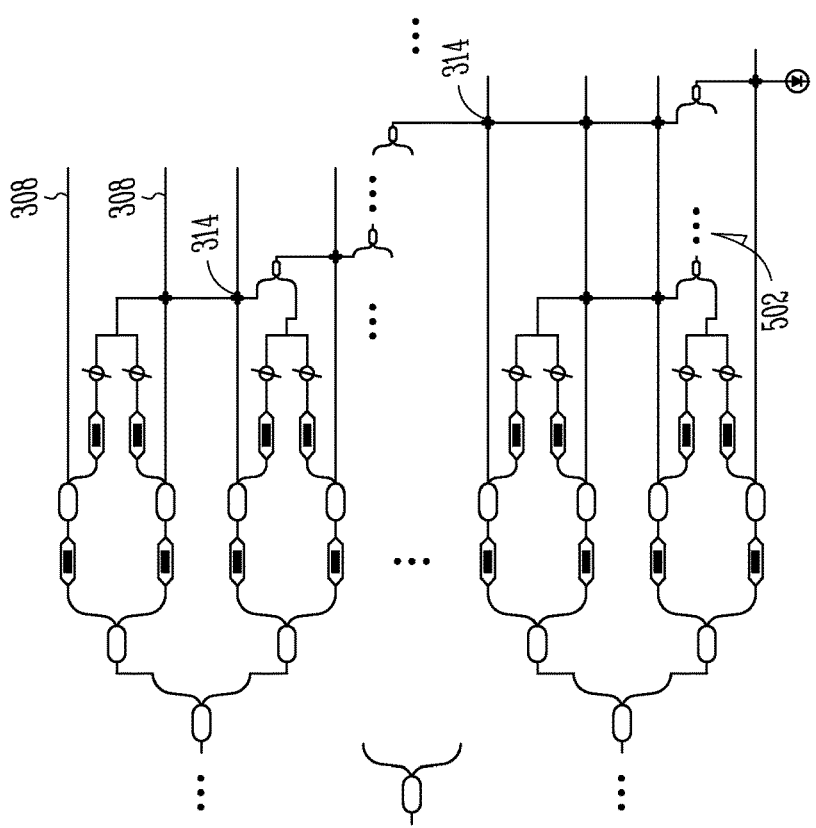
Fig. 5

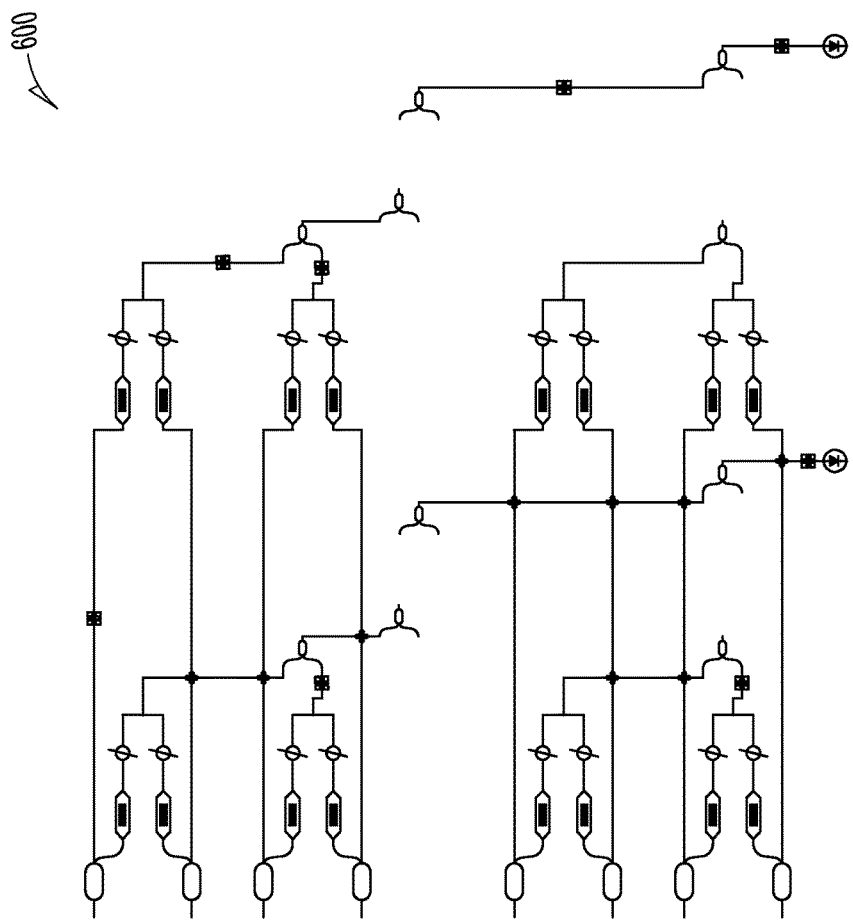
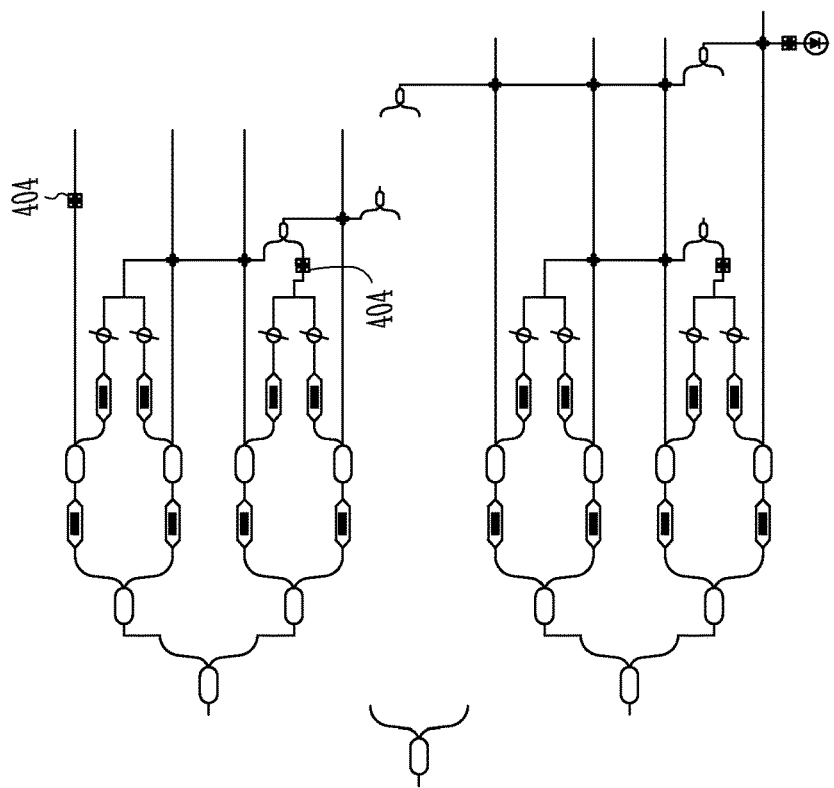
Fig. 6A

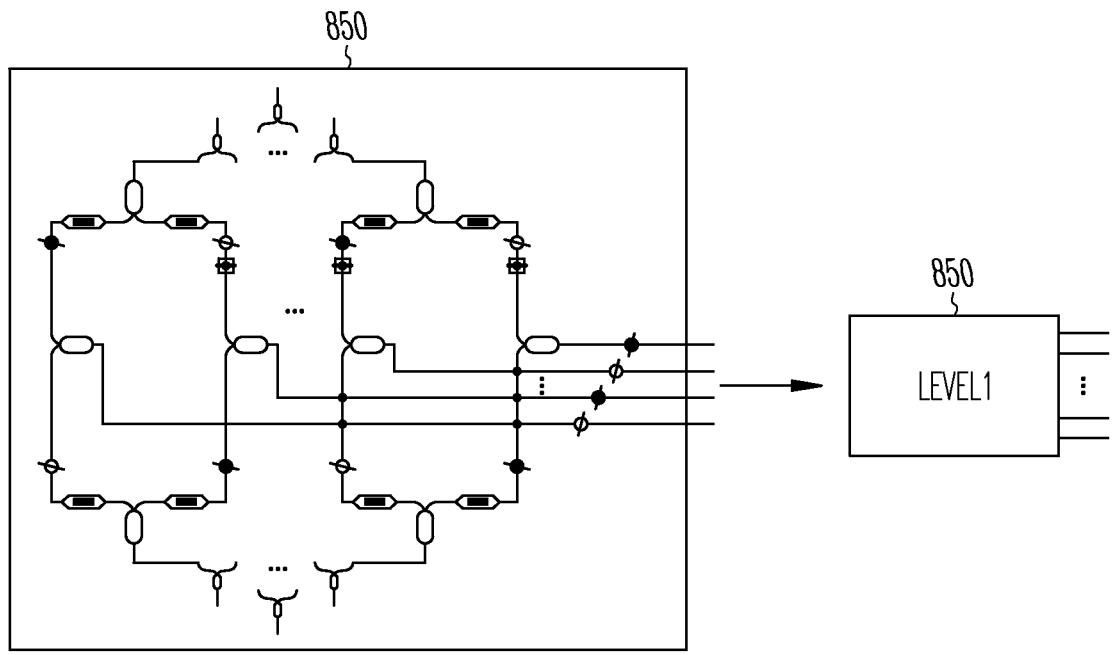
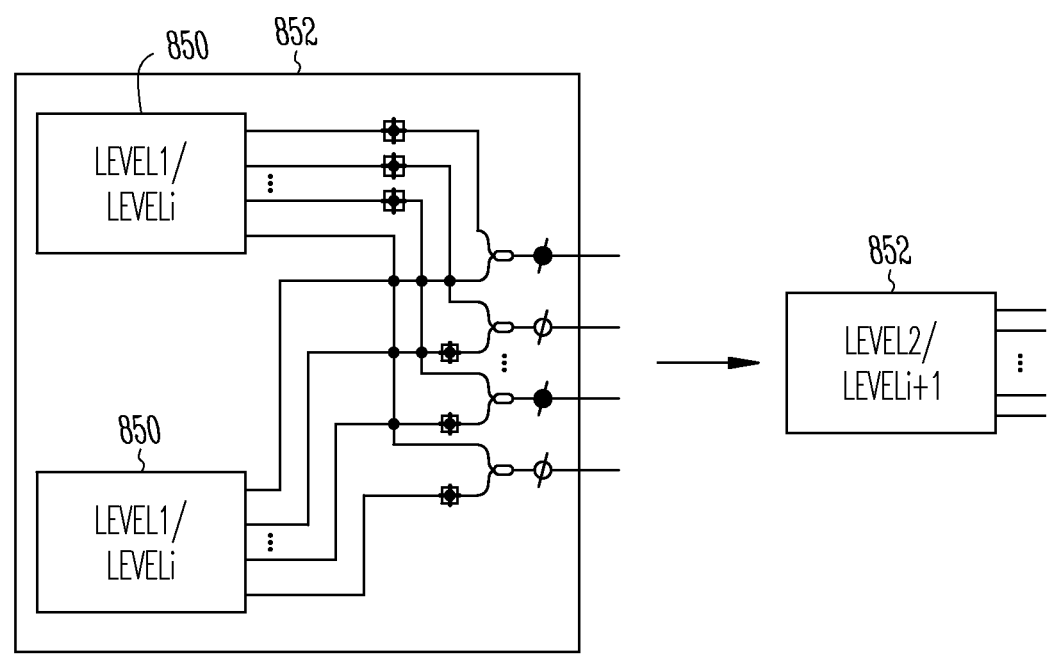
*Fig.8B*

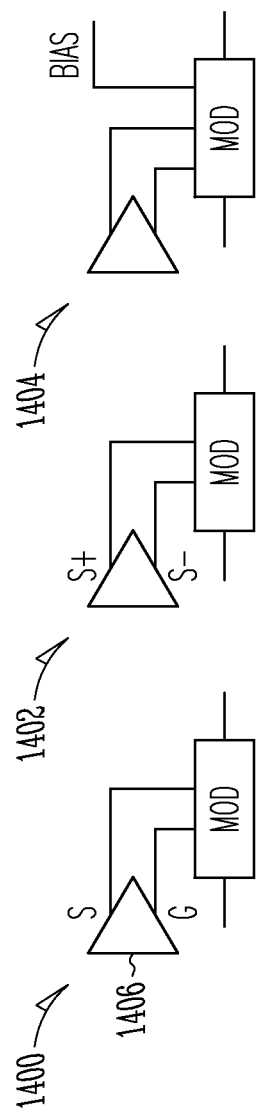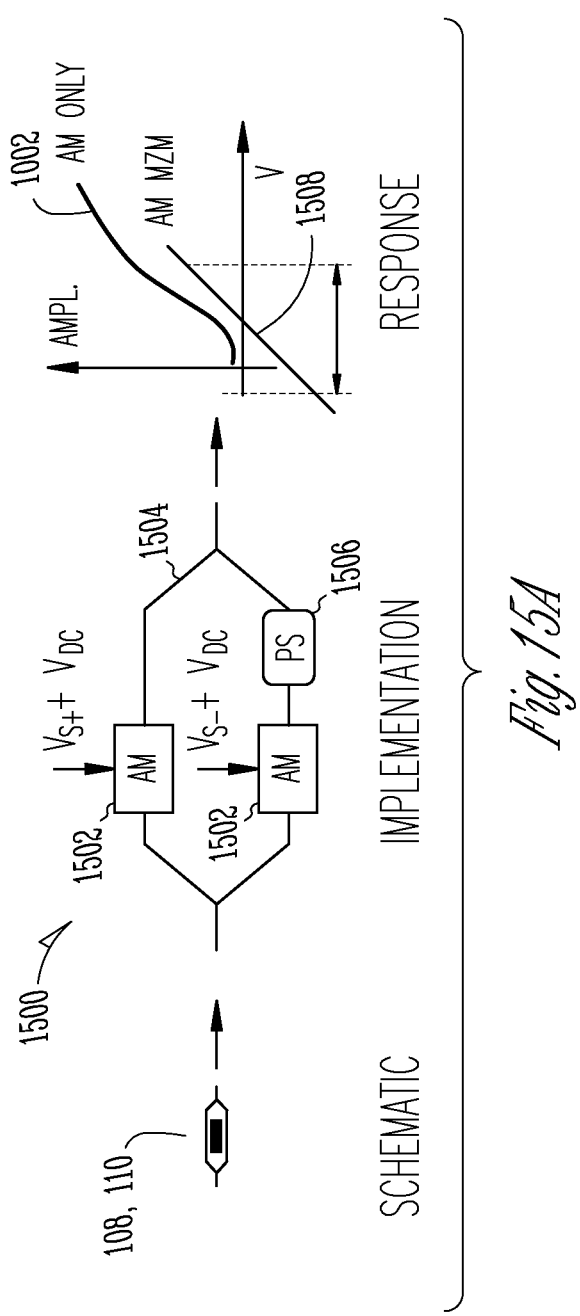

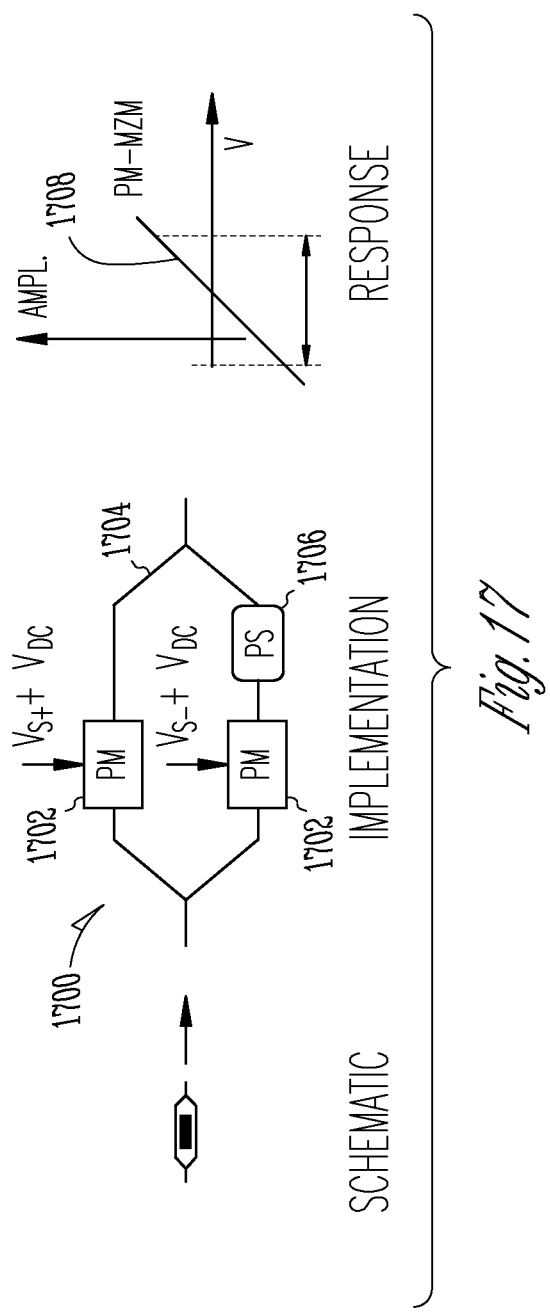
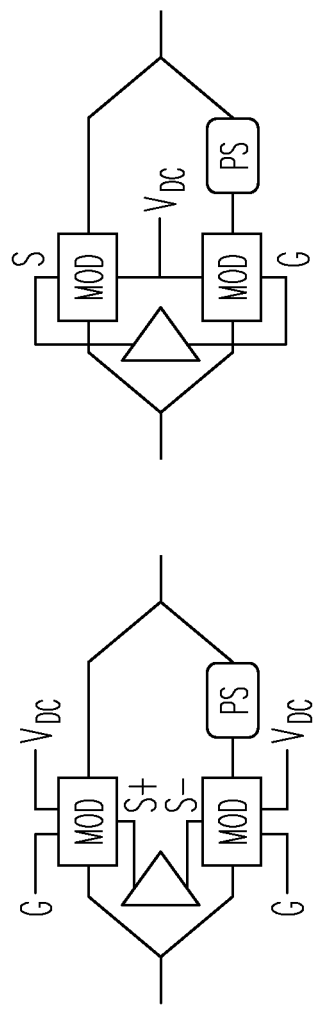
Fig. 17
Fig. 18A
Fig. 18B

BALANCED PHOTONIC ARCHITECTURES FOR MATRIX COMPUTATIONS

CROSS-REFERENCE TO RELATED APPLICATIONS

This application claims priority to and the benefit of U.S. Provisional Application No. 63/199,286, filed on Dec. 17, 2020; U.S. Provisional Application No. 63/199,412, filed on Dec. 23, 2020; and U.S. Provisional Application No. 63/201,155, filed Apr. 15, 2021. The disclosures of all three priority applications are incorporated herein in their entireties.

BACKGROUND

Photonic computing has emerged as a promising candidate for sustaining computational advances as the growth in the computing performance of conventional von Neumann architectures, previously characterized by Moore's and Koomey's laws, has slowed down. Compared with electronic computations, photonics offers the potential for speed increases and energy savings; in fact, efforts to transfer computations from the electronic domain to the optical (or, synonymously, photonic) domain are in no small part inspired by the speed and energy benefits that photonics has already brought to the field of telecommunications and data communications.

BRIEF DESCRIPTION OF THE DRAWINGS

Described herein are beneficial photonic architectures for matrix multiplications, along with implementations of photonic components utilized in and photonic-electronic computing systems incorporating such architectures. Various example embodiments are described with reference to the accompanying drawings.

FIG. 1A depicts an example photonic circuit for the scalar multiplication of two two-component vectors, illustrating the principle of photonic computation in accordance with various embodiments.

FIG. 1B depicts the example photonic circuit of FIG. 1A along with associated electronics for signal conversion between the photonic and electronic domains, illustrating the principle of data flow in accordance with various embodiments.

FIG. 4B depicts an example crossbar photonic circuit with dummy waveguide crossings as shown in FIG. 4A for a 4×4 matrix.

FIG. 5 depicts an example crossbar photonic circuit for multiplying a vector with a matrix, characterized by 2D matrix layout with a reduced number of waveguide crossings, in accordance with various embodiments.

FIG. 6A depicts an example crossbar photonic circuit having the layout of the circuit of FIG. 5, augmented with dummy waveguide crossings for power and/or delay balancing in accordance with various embodiments.

FIG. 8B illustrates sub-units of the photonic circuit of FIG. 8A, as can be replicated to scale the circuit to larger vectors and matrices, in accordance with various embodiments.

FIGS. 14A-14C illustrate various drivers as may be used with the electronically driven optical amplitude modulators of FIGS. 10-13, in accordance with various embodiments.

FIG. 15A illustrates the implementation of an optical amplitude modulator as a Mach-Zehnder modulator with differentially driven optical amplitude modulator devices, in accordance with various embodiments.

FIG. 17 illustrates the implementation of an optical amplitude modulator as a Mach-Zehnder modulator with differentially driven optical phase modulation devices, in accordance with various embodiments.

FIGS. 18A and 18B illustrate various differential drive schemes as may be used with the Mach-Zehnder modulators of FIGS. 15 and 17, in accordance with various embodiments.

DETAILED DESCRIPTION

Figure 2:
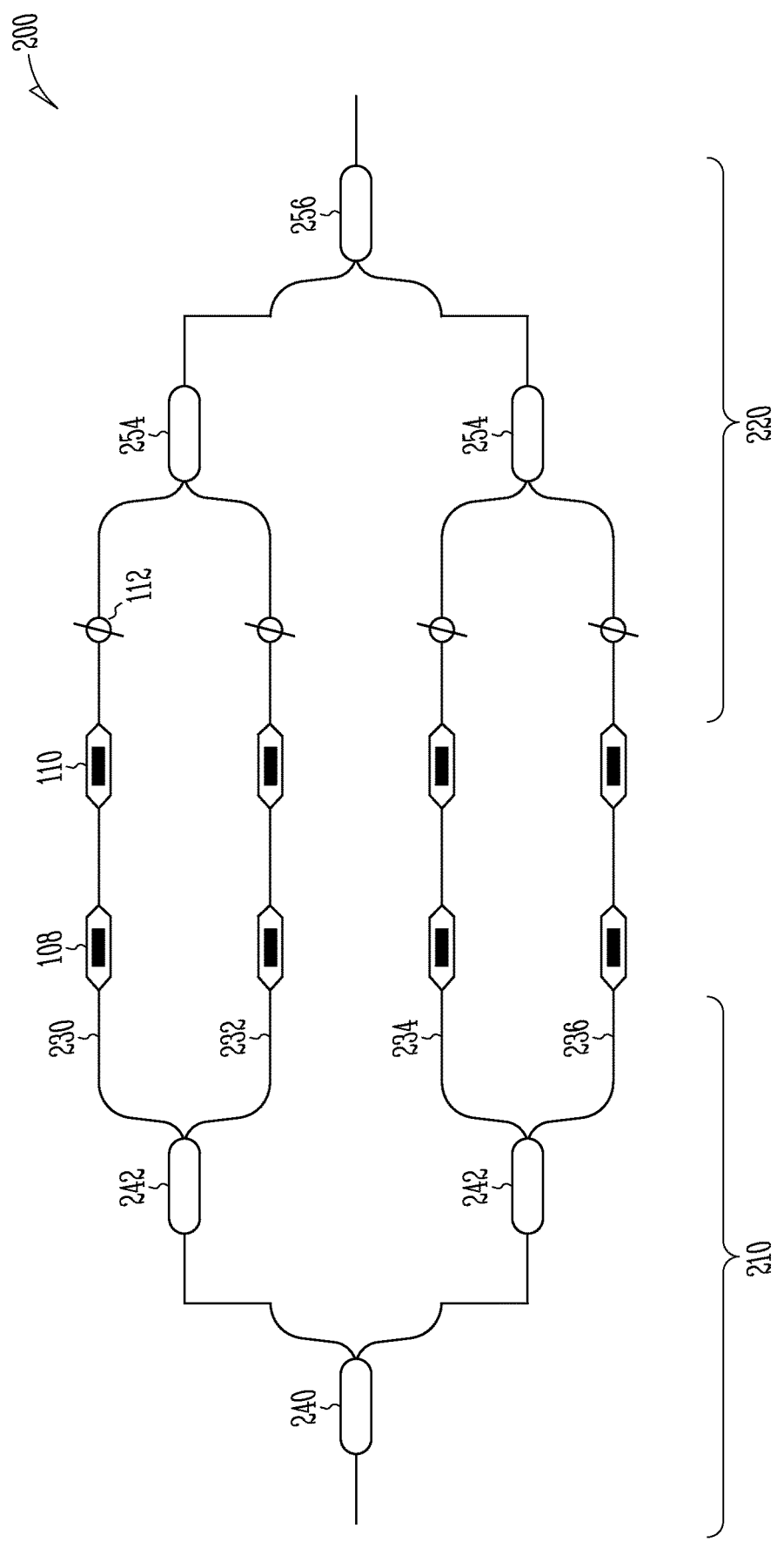
FIG. 2 depicts an example photonic circuit for the scalar multiplication of two four-component vectors, illustrating a front-end optical splitter and back-end optical combiner as used in accordance with various embodiments.

Presented herein are coherent photonic circuit architectures for performing multiply-accumulate (MAC) operations as occur in matrix multiplications. In general, these architectures employ two stages of electronically controlled optical modulator cells, each including an optical amplitude modulator and/or an optical phase shifter, that sequentially encode the components of one or more first vectors, herein also referred to as "input vectors," and one or more second vectors, herein also referred to as "weight vectors," onto the optical fields of coherent optical carrier signals, thereby achieving the multiply operation between the vector components. The twice-modulated light is thereafter coherently combined to accumulate the component products for each pair of vectors, and the resulting optical output signals, which each represent a scalar product, or dot product, between two vectors, are measured by optical receivers that convert the optical output signals into electronic output signals.

With a single first vector and a single second vector, implemented by the first and second stage of optical modulator cells, respectively, the photonic circuit computes the scalar product, or dot product, between the two vectors. With a single first vector and multiple second vectors, the latter implemented by multiple respective sets of second-stage optical modulator cells, the photonic circuit computes the product of the first vector and a matrix whose rows or columns are the second vectors (depending on whether the matrix is multiplied from the left or right of the vector); that product is itself a vector, composed of the scalar products between the first vector and each of the second vectors. With multiple first vectors (e.g., implemented by wavelength-division-multiplexed optical modulator cells in the first stage) and multiple second vectors, the photonic circuit computes the product of a first matrix composed of the first vectors and a second matrix composed of the second vectors, which is itself a matrix. Depending on the particular implementation of the optical modulator cells, the photonic circuit can be configured, via the electronic drive signals controlling the optical modulator cells, to implement any arbitrary positive real-valued, signed real-valued, or complex-valued vectors and matrices. Photonic computations of products between vectors and matrices as disclosed herein may find application, e.g., in photonic-circuit implementations of artificial neural networks, optical beamforming networks, or linear quantum optical processors, among other applications.

In the described photonic circuits, coherent carrier light received at a single optical input of the photonic circuit is split into multiple carrier signals that travel along and are modulated in multiple optical paths before being recombined into one or more optical output signals. To ensure the proper coherent combination of the modulated optical signals flowing into each optical output signal, the respective optical paths from the optical input to the optical outputs are matched in their optical delays and balanced in optical power (or, equivalently, optical losses). In the disclosed embodiments, power balancing across the paths associated with each optical output is achieved with a front-end optical splitter configured to split the incoming carrier light evenly into the optical carrier signals corresponding to the multiple vector components, meaning that the optical carrier signals are all equal in optical power, and a back-end optical combiner that recombines the (twice) modulated optical signals likewise evenly, such that the relative contributions of the modulated optical signal to the optical power in the combined signal are equal to the relative optical power of the modulated optical signals prior to the recombination (e.g., in the case of transparently operated optical modulators, the optical carrier signals are recombined in equal power ratios). Such optical splitters and optical combiners are herein also described as splitting or recombining light with "uniform power coupling ratios." In some embodiments, uniform power coupling ratios are achieved with a symmetric cascade of two-way 3 dB couplers arranged at junctions of a waveguide tree (herein also a binary "tree-coupler"), which allows splitting light into or recombining light across $N=2^n$ optical signals in n stages. In other embodiments, a single N-way coupler or multiple stages of multi-way couplers that collective achieve an N-way split are used.

In various embodiments, the photonic circuit is further configured to achieve power balancing across all optical output combiners and associated optical outputs, and thus across all paths from the optical input to the optical outputs, to achieve fidelity of the optical signals to the mathematical operation they represent, e.g., to ensure that the optical signal amplitudes of the modulated light in different paths properly reflect the magnitudes of the respective vector components. With a front-end optical splitter and back-end optical combiners characterized by uniform power coupling ratios, power balancing across the different back-end optical combiners, corresponding to different second vectors, generally involves splitting the modulated optical signals leaving the first stage of optical modulator cells, where the input vector is imparted, evenly between paths delivering the light to the different sets of second-stage optical modulator cells. For this purpose, the waveguide structures that route light from the first-stage optical modulator cell to the second-stage optical modulator cells are each configured, in some embodiments, similarly to the front-end optical splitter, as a tree coupler, e.g., with a symmetric cascade of 3 dB couplers, or alternatively another symmetric staged coupler or N-way coupler. In other embodiments, the waveguide structures for routing light from the first stage to the second stage of optical modulator cells each include a main waveguide and, along that waveguide, a series of optical couplers of generally non-uniform power coupling ratios that sequentially couple power fractions of the first modulated signals out of the waveguide for delivery to respective second optical modulator cells, with power fractions sequentially increasing in proportions that achieve the desired even power splitting between the different sets of second optical modulator cells.

In various embodiments, the optical paths between the optical input and the optical outputs are matched in their optical delays not only over the full length, but separately within the front-end optical splitter, the waveguide structures between the first and second stages of optical modulator cells, and the back-end optical combiners. That is, the photonic circuit features a common optical delay along all optical paths from the optical input to any of the first optical modulator cells (herein also "first paths"), a common optical delay along all paths between a first optical modulator cell and a second optical modulator cell (herein also "second paths"), and a common optical delay along all paths between any of the second optical modulator cell and the respective optical receiver (herein also "third paths"). Such segment-wise delay-matching, beyond ensuring proper coherent combination, also facilitates the simultaneous, clocked operation of the optical modulator cells in each of the two stages. For arbitrary photonic circuit layouts, any optical propagation delay differences between paths due to different geometric lengths can generally be compensated for by inserting optical delay lines of suitable length in one or more of the paths. In some of the embodiments disclosed here, propagation delay matching is instead achieved with circuit layouts, and particularly waveguide layouts, in which all waveguides within a set of delay-matched paths (e.g., the above-defined first paths, second paths, and third paths) are of the same geometric length, herein also referred to as "geometrically delay-matched." In either case, to compensate for any delay mismatch on a finer scale than what a delay line can accomplish (e.g., on the order of a wavelength), the circuit may additionally include dedicated phase shifters, or utilize phase shifters otherwise included in the circuit (e.g., as part of the optical modulator cells) to perform the delay fine-tuning.

The various disclosed photonic circuit layouts generally include waveguide crossings between the waveguide structures that route light from the first stage to the second stage of optical modulator cells and the back-end optical combiners, or between different back-end optical combiners. Such waveguide crossing can introduce passive optical losses and/or optical delays. To balance optical losses, and thus optical output power, across all paths despite such lossy waveguide crossings, the photonic circuit includes, in various embodiments, "dummy waveguide crossings" to balance the sum of waveguide crossings and dummy waveguide crossings across all paths. Similarly, in various embodiments, "dummy phase shifters" are included to balance out, across paths, losses and delays incurred by other phase shifters in the circuit. The dummy waveguide crossings and phase shifters have no function other than to mirror the losses and delays associated with their functional counterparts.

The foregoing non-exhaustive summary of various aspects of the disclosed subject matter will become clearer from the following description of example photonic circuit architectures and photonic circuit component implementations. Throughout the accompanying drawings, photonic devices such as optical amplitude modulators and phase shifters (e.g., as used in the optical modulator cells), optical receivers, and optical couplers are each consistently depicted using the same symbol, but it is to be understood that these circuit components can generally be implemented in various ways. For example, each amplitude modulator may be implemented as a single electronically driven optical device such as, e.g., an EAM or ring modulator, or a compound device such as Mach-Zehnder modulator including an amplitude or phase modulator in one interferometer arm or a differentially driven pair of amplitude or phase modulators. In some embodiments, the amplitude modulators impart only the absolute value of a vector component, with the sign being encoded separately (e.g., by a phase shifter that can be set to zero for plus or to π for minus); in other embodiments, the amplitude modulators can be complex devices that encode the signed values directly. An optical receiver may be implemented, e.g., as a photodetector with a single input, or as a coherent receiver with multiple photodetectors and multiple input ports. The 3 dB couplers may be implemented as 1×2 couplers (e.g., simple binary waveguide junctions), or alternatively as 2×2 couplers such as 2×2 multi-mode interferometers (MMIs), 2×2 directional couplers, or even multi-stage 2×2 couplers. An optical phase shifter may be implemented as an active tuning device such as a thermal phase tuner or electro-optic phase tuner, or, in some cases, by a passive design such as a waveguide or metal stress that achieves a fixed phase shift. Beneficial implementations of each device can be selected by a person of skill in the art based on considerations involving, e.g., component size and spatial constraints, accuracy, power requirements, optical losses, etc.

Photonic Circuit Architectures

FIG. 1A depicts an example photonic circuit 100 for the scalar multiplication of two two-component vectors, illustrating the principle of photonic computation in accordance with various embodiments. At the input, coherent carrier light with input amplitude $E_{in}$ is split by a 3 dB coupler 102 between two paths 104, 106. Each path 104, 106 includes a first amplitude modulator 108 to encode the absolute value (i.e., magnitude) of a component of the first vector, i.e., the, input vector $[X]^T=[x_1,x_2]$, and a second amplitude modulator 110 to encode the absolute value of a corresponding component of the second vector, i.e., the weight vector $[W]^T=[w_1,w_2]$. (The phrase "corresponding components" herein references components of two vectors that share a common index. For example, in path 104, the first amplitude modulator 108 encodes the magnitude of the first component $w_1$ of the input vector and the second amplitude modulator 110 encodes the magnitude of the first component $w_1$ of the weight vector.) In the depicted embodiment, each path 104, 106 further includes a phase shifter 112. The phase shifter 112 in each path may be used to encode, by a phase shift of 0 or π, the combined sign of the respective input and weight, which is positive if the input $x_i$ and weight $w_i$ (i=1, 2) are either both positive or both negative, and is otherwise negative. Alternatively, for complex-valued inputs $x_i$ and weights $w_i$, the phase shifter 112 in each path may be used to encode the combined complex phases $\varphi_i$. The modulated light in the two paths 104, 106 is then combined at the output by another 3 dB coupler 114. Photonic circuit 100 implements a two-way split and recombination of light, and as such constitutes a Mach-Zehnder interferometer (MZI).

The combination of the modulated optical signals by coupler 114 results, at the output of the MZI, in the following optical output field (where the factor ½ is included to satisfy energy conservation):

$$E_{out} = \frac{1}{2}(|x_1||w_1|e^{j\varphi_1} + |x_1||w_2|e^{j\varphi_2})E_{in}$$

If the phase shifters 112 are tuned such that $\varphi_1-\varphi_2=2\pi m$, where m is an integer, the output field becomes:

$$E_{out} = \frac{1}{2}(|x_1||w_1| + |x_2||w_2|)(E_{in}e^{j\varphi_2}) = \frac{1}{2}(|x_1||w_1| + |x_2||w_2|)E'_{in}$$

Note that, since only the relative phase shift $\varphi_1-\varphi_2$ is relevant here, it is in principle possible to omit one of the two phase shifters 112, retaining a phase shifter in only one arm.

As can be seen, the photonic circuit 100 performs the operation $x_1w_1+x_2w_2$, which is a MAC operation including two multiplications and one addition. Since $x_i$ and $w_i$ are analog numbers, the computation is a photonic analog computation. Photonic circuit 100, thus, constitutes a simple photonic compute unit. For purposes of later generalization to multiple input and/or weight vectors, the above MAC operation can also be written in matrix form:

$$[x_1 \; x_2]\begin{bmatrix} w_1 \\ w_2 \end{bmatrix} = [X]^T[W] = [Y],$$

where $[X]^T$ is a one-dimensional input matrix (equivalent with the input vector), [W] is a one-dimensional weight matrix (equivalent with the weight vector), and [Y] is a zero-dimensional output matrix (corresponding to the scalar product of the two vectors). (The term "matrix" is, in this context, used broadly to refer to both two-dimensional and one-dimensional arrays of numbers, and even a "zero-dimensional" array, which is an individual number.) Further, referring to a one-dimensional array as a vector, and denoting a matrix computation operator as '@', the above MAC computation can be categorized as a 2×1 vector@vector operation since it has two inputs and one output.

FIG. 1B depicts the example photonic circuit of FIG. 1A along with associated electronics for signal conversion between the photonic and electronic domains, illustrating the principle of data flow in accordance with various embodiments. Each of the optical amplitude modulators 108, 110 and phase shifters 112 is controlled by an electrical drive voltage (or, alternatively, drive current) generated by a respective digital-to-analog converter (DAC) and/or driver, collectively DAC/driver 120, from a corresponding digital input signal 122 supplied to the DAC/driver 120. As optical signals pass through the photonic circuit 100, they are modulated in accordance with these electrical drive voltages, and thus in accordance with the input signals 122. At the output of the photonic circuit 100, an optical receiver 124, such as, e.g., a photodetector, converts the optical output signal, whose optical field is the coherent sum of the twice-modulated signals encoding the weighted sum of inputs, into an electronic output signal 126, which, after optional amplification, e.g., by a transimpedance amplifier (TIA) 128, is decoded by an analog-to-digital converter (ADC) 130 into a digital output signal 132. In conjunction with proper mapping in the electronics associated with the photonic devices (e.g., modulators and photodetectors), photonic circuit 100 enables performing analog computations.

FIG. 2 depicts an example photonic circuit 200 for the scalar multiplication of two four-component vectors, illustrating a front-end optical splitter 210 and back-end optical combiner 220 as used in accordance with various embodiments. To facilitate the 4×1 vector@vector operation, the front-end optical splitter 210 is configured to split incoming coherent light evenly between four paths 230, 232, 234, 236. Similarly to the two paths in photonic circuit 100, each of the four paths 230, 232, 234, 236 in circuit 200 includes a first amplitude modulator 108 to impart the magnitude of a respective component of the input vector and a second amplitude modulator 110 to impart the magnitude of a corresponding component of the weight vector onto the optical signal, as well as a phase shifter 112 to encode the combined sign or complex phase. The modulated light is coherently combined across all four paths 230, 232, 234, 236 by the optical combiner 220.

Uniform power coupling ratios in the optical splitter 210 and the optical combiner 220 are achieved, in this example, with a cascade of 3 dB couplers each splitting incoming light 50:50 between two outgoing branches or combining light of two incoming branches in equal amounts into one outgoing signal. (It is to be understood that, in any real-world implementation, a coupler that is designed to provide 50:50 coupling may come with a slight imbalance, such as 45:55 or 52:48; such a coupler will still be deemed to be and referred to as a "3 dB" coupler if the imbalance is within tolerable limits for the particular application.) In the optical splitter 210, the incoming carrier light is split twice successively in two cascaded stages of 3 dB couplers 240, 242: the first coupler 240 splits the light between two paths, and a second coupler 242 in each path splits the light again between two paths, for a total of optical carrier signals in the four optical paths 230, 232, 234, 236. In the optical combiner, the four modulated signals are combined by two cascaded stages of 3 dB couplers 254, 256: at the first stage, two couplers 254 combine light from two paths each, and coupler 268 at the second stage further combines the combined light exiting the first stage. The optical splitter 210, including the two stages of couplers 240, 242 along with the waveguides connecting them to each other and to the first amplitude modulators 108, forms a symmetric binary waveguide tree, or symmetric binary "tree coupler." Similarly, the optical combiner, including the two stages of couplers 254, 256 along with the waveguides connecting them to each other and to the outputs of the phase shifters 112, forms a symmetric binary inverse waveguide tree (the term "inverse" reflecting that, in the direction of light propagation, the branches of the tree combine rather than branching out at the nodes where the couplers are), or symmetric binary inverse tree coupler. Note that, although depicted as distinct photonic components 240, 242, 254, 256, the 3 dB couplers may be implemented, in some embodiments, simply as Y-junctions of the waveguide tree.

As will be readily appreciated by those of ordinary skill in the art, the front-end optical splitter 210 and back-end optical combiner 220 can be straightforwardly extended to vector multiplications for higher-dimensional vectors (including more than four components) by adding further coupling stages in the splitter 210 and combiner 220, or, put differently, adding further levels to the respective waveguide trees. To achieve uniform power coupling, the waveguides are symmetric in the sense that, in each stage, each of the branches (as opposed to just a subset of the branches) bifurcates. Due to this symmetric cascaded binary structure, the number of optical signals into which the carrier light is split or that are recombined into one output, and thus the dimensionality of the input and weight vectors, will generally be a power of two by design. That is, with n stages of 3 dB couplers, the light is split into $2^n$ optical signals onto which a $2^n$-dimensional vector can be encoded. However, arbitrary numbers of vector components can readily be implemented by driving the optical amplitudes of any unwanted components to zero. (For example, tree-component vectors can be multiplied using the circuit 200 with an amplitude in the fourth branch 236 set to zero.)

Further, as noted above, the front-end optical splitter and back-end optical combiners can also be implemented using m-way couplers, with m≠2 in one or more stages. For example, a three-way coupler in the first stage can be combined with three two-way (3 dB) couplers in the second stage for a total of six optical signals. To achieve power balancing across the resulting paths, given couplers that individually provide uniform power coupling ratios, the type of coupler used within each stage is the same for all incoming branches at this stage. Thus, the optical splitter and combiner still take the form of symmetric (albeit generally not binary optical waveguide trees. Furthermore, in some embodiments, the front-end optical splitter and back-end optical combiner may be implemented with cascades of couplers of variable power coupling ratios, allowing the power splits to be tunes as a parameter. Variable couplers may be achieved, for instance, with Mach-Zehnder interferometers including thermo-optically or electro-optically tunable phase shifters in one of their interferometer arms.

Moving now from photonic circuits for vector@vector operations to circuits for vector matrix operations, various coherent, interferometric circuit architectures that include multiple sets of second optical modulator cells for encoding multiple second vectors, or weight vectors, that collectively constitute a weight matrix will now be described. Multiplications of an input vector with a weight matrix are commonly used, for example, to implement artificial neural network layers.

Figure 3:
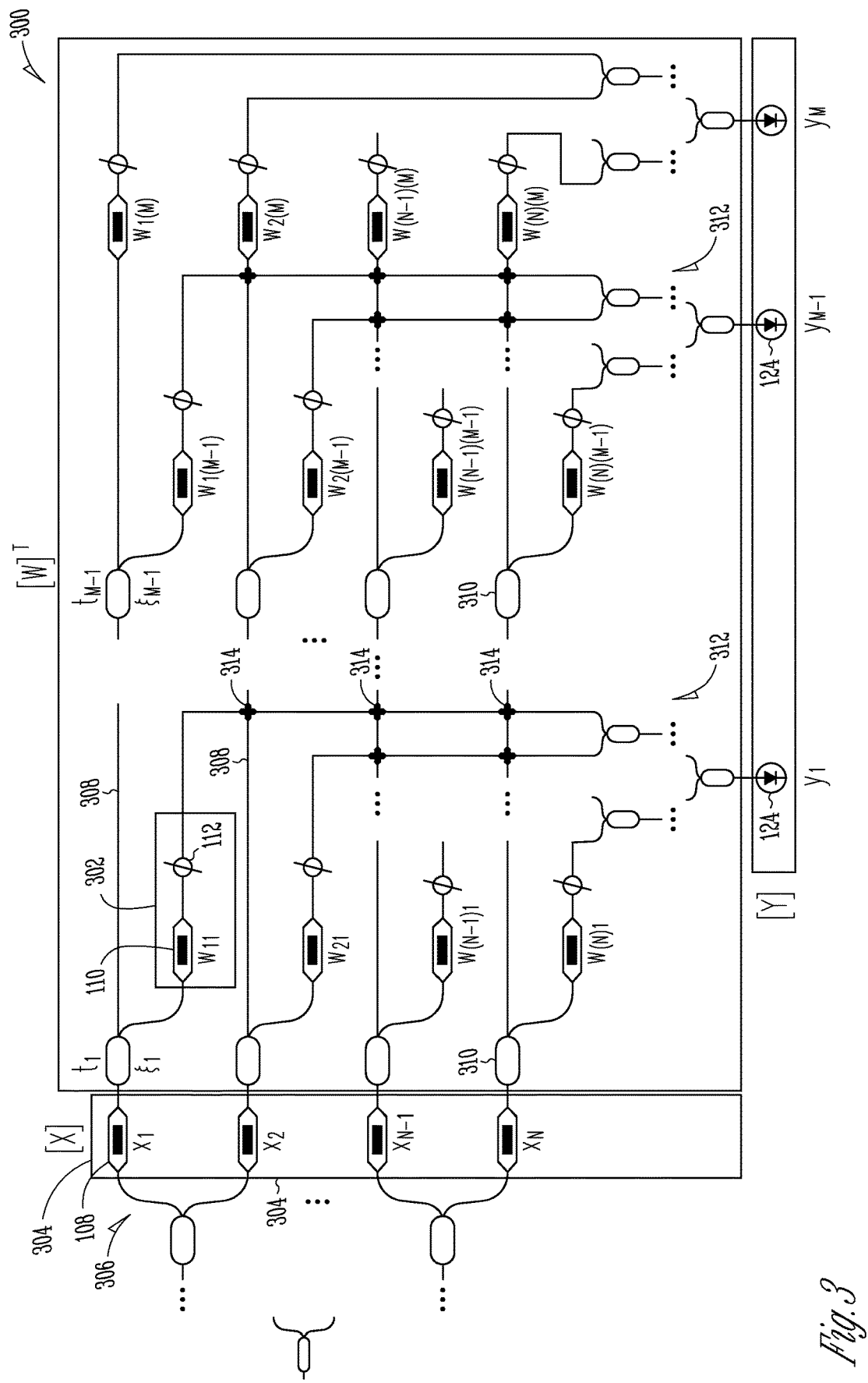
FIG. 3 depicts an example crossbar photonic circuit for multiplying a vector with a matrix, characterized by a two-dimensional (2D) matrix layout in accordance with various embodiments.

FIG. 3 depicts an example crossbar photonic circuit 300 for multiplying a vector with a matrix, characterized by a two-dimensional (2D) matrix layout in accordance with various embodiments. In a crossbar layout, the second optical modulator cells 302 are arranged in a rectangular array of N rows and M columns, mirroring the rows and columns of the represented weight matrix [W] itself. Herein, N corresponds to the dimensionality of the second vectors, and M to the number of second vectors in the matrix. Thus, each set of second optical modulator cells 302 collectively implementing one of the M second vectors is arranged along one of the M columns, and each row includes second optical modulator cells 302 of corresponding components (e.g., the first row includes the first components) of all M second vectors. The first optical modulator cells, which impart the N components of the input vector [X], are arranged in an additional column 304 preceding the array of second optical modulator cells. Note that, in this arrangement of vector components and second vectors along different dimensions, the designation of "rows" and "columns" is arbitrary and could be switched.

In the depicted example, as in subsequently described figures, each first optical modulator cell includes an optical amplitude modulator 108 that can impart a real-valued input vector component (or the magnitude of a complex-valued input vector component), and each second optical modulator cell 302 includes both an optical amplitude modulator 110 and an associated phase shifter 112 that can collectively implement a complex-valued or signed weight (where the complex phase or sign may implement the combined phases or signs of the inputs and weights). However, in other embodiments, the first optical modulator cells may likewise include phase shifters, allowing complex phases or signs to be encoded separately for the inputs and weights. Conversely, in some embodiments, the second optical modulator cells 302 may omit the phase shifters, limiting the imparted weights to positive real values, or in certain signed amplitude-modulator embodiments, to signed real values.

The column of first optical modulator cells, 304, receives its optical carrier signals from a front-end optical splitter 306, which, as shown, may be implemented by a symmetric binary optical waveguide tree including a staged cascade of 3 dB couplers, as described with respect to FIG. 2. The first modulated optical signals output by the first optical modulator cells 304 are then each routed by a horizontal waveguide 308 arranged along the respective row to corresponding second optical modulator cells 302 of all M columns in the array. A series of M−1 optical couplers 310 in each horizontal waveguide 308 sequentially couple fractions of the modulated signal carried in the waveguide 308 into the second optical modulator cells with coupling ratios $\xi_i^2 : t_i^2$ (i=1 ... (M−1)), where $\xi_i^2$ and $t_i^2$ represent the proportions of optical power coupled out of the waveguide 308 into the i-th column of second optical modulator cells (which impart the weights) and transmitted along the waveguide 308, respectively. The optical couples 310 are herein also referred to as "weight couplers." Collectively, the horizontal waveguide 308, the weight couplers 310 along its path, and waveguide sections from the optical couplers to the inputs of the second optical modulator cells form what is herein also called the "waveguide structure routing the first modulated optical signals to the second optical modulator cells."

In each column, the second modulated optical signals output by the second optical modulator cells 302 are recombined across all rows (corresponding to all vector components) by a respective back-end optical combiner 312, which, as shown, may be implemented by a symmetric binary inverse optical waveguide tree including a staged cascade of 3 dB couplers, as described with respect to FIG. 2. Optical receivers 124 at the outputs of the back-end optical combiners 312, forming a separate row below the array, measure the combined optical output signals, corresponding to the components of output vector [Y]. In some embodiments, the optical receivers are immediately preceded by optical attenuators or amplifier that can be set to compensate for any power imbalance between the columns to restore the fidelity of the photonic circuit.

As shown, the cascaded 3 dB couplers may all be located, and the second modulated optical signals may accordingly all be combined, at the bottom of the array of optical modulator cells, after the second modulated optical signals have been routed there from the outputs of the second optical modulator cells 302 by vertical waveguides (forming part of the optical combiners 312) that cross the horizontal waveguides 308 along which the first modulated signals travel. Reflecting these waveguide crossings 314 (which may be implemented, e.g., a cross state operating switches or common crossings), the depicted configuration of second optical modulator cells, waveguide structures routing the first modulated optical signals to the second optical modulator cells, and back-end optical combiners is collectively herein also referred to as a photonic crossbar.

The computation optically implemented by the photonic circuit 300 can, in matrix form (without loss of generality multiplying the matrix from the right to match the circuit layout), be written as follows:

$$[x_1 \ x_2 \ \cdots \ x_N] \begin{bmatrix} w_{11} & w_{12} & \cdots & w_{1M} \\ w_{21} & w_{22} & \cdots & w_{2M} \\ \vdots & \vdots & \ddots & \vdots \\ w_{N1} & w_{N2} & \cdots & w_{NM} \end{bmatrix} = [y_1 \ y_2 \ \cdots \ y_M]$$

For each column, the amplitude of light entering the receiver can be written as:

$$y_j = \sum_{i=0}^{N} x_i w_{ij}$$

To balance column-wise power across all optical receivers 124, the coupling ratios in the couplers along the horizontal waveguides may be chosen such that the following relations hold:

$$\begin{aligned}(\xi_1(EL_w^1))^2 & \quad \#\text{col}1\\ = (t_1\xi_2(EL_w^2))^2 & \quad \#\text{col}2\\ = (t_1 t_2 \xi_3(EL_w^3))^2 & \quad \#\text{col}3\\ = t_1 t_2 \cdots t_{M-2}\xi_{M-1}(EL_w^{M-1}) & \quad \#\text{col}(M-1)\\ = t_1 t_2 \cdots t_{M-2}t_{M-1}(EL_w^{M-1}) & \quad \#\text{col}(M)\end{aligned}$$

Herein, $EL_w$ is the excess loss associated with each of the weight couplers 310 (presumed to be the same for all couplers 310), that is, the in practice usually inevitable loss going beyond any loss deliberately imposed to impart the weight vector components. As the first modulated signal travel long the horizontal waveguides 308, they go through on weight coupler from each column to the next, such that the losses $EL_w$ generally accumulate. Note, however, that the number of weight couplers 310 encountered is the same along the paths to the last and second-to-last columns. Further, since optical power is split by each weight coupler 310 between two paths (towards a corresponding second optical modulator cell or further along the horizontal waveguide 308), we know that $\xi_j^2 + t_j^2 = 1$ for all j=1 . . . M. From this relation, in conjunction with the above power-balancing condition, we can derive, for the last two columns (#col(M–1) and #col(M)):

$$\xi_{M-1}^2 = t_{M-1}^2 = \frac{1}{2},$$

and then reverse-iterate to obtain:

$$\xi_j^2 = \frac{\xi_{j+1}^2 EL_w^2}{1 + \xi_{j+1}^2 EL_w^2} \quad \text{for } j \text{ in } [1, M-2].$$

As noted above, when light passes through passive optical components, such as couplers and waveguide crossings, energy is lost. If there are different numbers of couplers or crossings along different optical paths, the power at the optical receivers may be different as a result. Additionally, the passive components may introduce optical delays. In order to improve the accuracy of photonic computation, passive losses and delays can be balanced by placing dummy components, such as dummy waveguide crossings, in proper places. Note that the dummy crossings will generally not introduce crosstalk, but merely loss and delay to balance total losses and delays between the different paths.

Figure 4A:
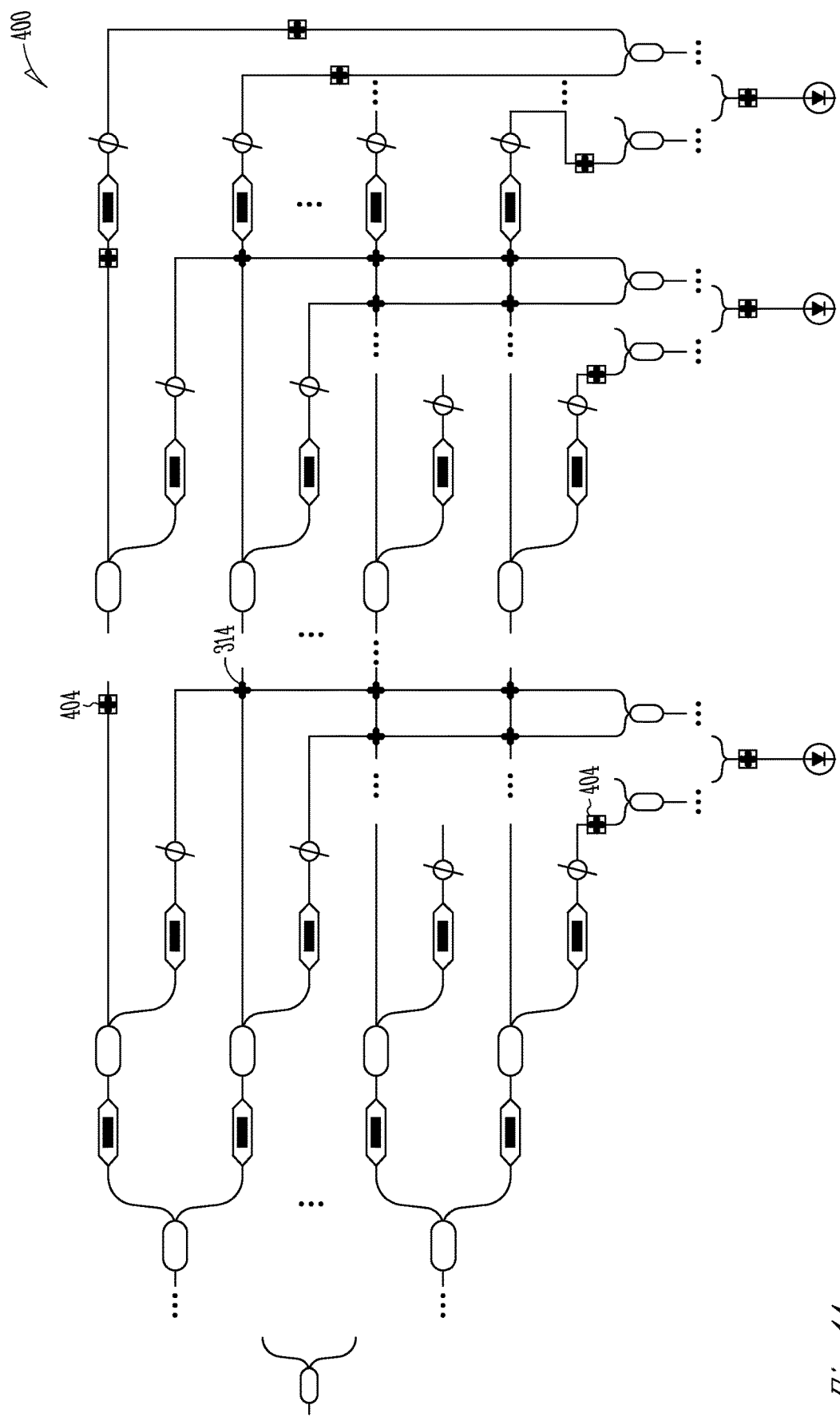
FIG. 4A depicts an example crossbar photonic circuit having the layout of the circuit of FIG. 3, augmented with dummy waveguide crossings for power and/or delay balancing in accordance with various embodiments.

FIG. 4A depicts an example crossbar photonic circuit 400 having the layout of the circuit of FIG. 3, augmented with dummy waveguide crossings for power and/or delay balancing in accordance with various embodiments. Further, FIG. 4B depicts an example crossbar photonic circuit 401 with dummy waveguide crossings as shown in FIG. 4A for a 4×4 matrix. Note that FIG. 4B shows individual dummy waveguide crossings 402, each similar in type and thus incurred loss and delay to any of the actual waveguide crossings 314 (except that, in two places, a notation "6×" or "3×" is used to indicate that there are six or three such dummy waveguide crossings, respectively), whereas FIG. 4A shows placeholders 404 that each stand for one or more dummy waveguide crossings.

As can be seen, the number of actual waveguide crossings 314 encountered by the modulated optical signals increases within each column from top to bottom, and between columns from left to right. For example, in column 1 of photonic circuit 401, the vertical waveguide from the output of the optical modulator cell 302 in the first row crosses three horizontal waveguides 308, the vertical waveguide from the output of the optical modulator cell 302 in the second row crosses two horizontal waveguides 308; the vertical waveguide from the output of the optical modulator cell 302 in the third row crosses one horizontal waveguide 308, and the vertical waveguide from the output of the optical modulator cell 302 in the fourth and last row crosses no waveguide at all, before reaching the cascaded 3 dB couplers at the bottom. To balance waveguide crossings across the paths in this column, therefore, one dummy crossing is added to the vertical waveguide coming from the second row, two dummy crossing are added to the vertical waveguide coming from the third row, and three dummy crossings are added to the vertical waveguide coming from the fourth row. Further, comparing actual waveguide crossings in the horizontal waveguides 308 that route light from the first to the second optical modulator cells, additional waveguide crossings are encountered from each column to the next, increasing in number towards the bottom of the crossbar. Thus, between the modulated optical signals arriving at the fourth column, for instance, the signal traveling along the fourth row has encountered nine waveguide crossings, but the signal traveling along the first row has encountered none. Nine dummy crossings 402 are therefore added to the first row. With the dummy waveguide crossings 402 added in the horizontal waveguides 308 and the vertical paths of the optical combiners 312, power is balanced across paths within each optical combiner, but not yet across optical combiners. Additional dummy crossings 402 are therefore added at the outputs of the optical combiners 312, preceding the optical receivers 124, which achieves sums of actual and dummy waveguide crossings 314, 402 that are equal across all paths (with nine waveguide crossings per path in the depicted example). In general, there is a high degree of flexibility where along the waveguides between the first and second optical modulator cells and the waveguides of the optical output combiners the dummy crossings 402 are placed. In various embodiments, dummy crossings 402 are spatially grouped together where possible, which can simplify manufacturing.

The optical field amplitude of the optical output signal at each column of a photonic circuit 400 with dummy waveguide crossings as shown in FIG. 4A (and for N=M=4 in FIG. 4B) can be calculated according to:

$$E_{out}((ak)(\xi_1)E_{in})(EL_c^{2\,log2(N)})(EL_w^{M-1}EL_x^{(N-1)(M-1)}),$$

where a and k are the amplitude losses associated with the first optical modulator cell (input modulator) and second optical modulator cell (weight modulator), respectively, $\xi_1$ is the coupling ratio of the weight coupler in the first column, and $EL_c$, $EL_w$, and $EL_x$ are excess losses of the 3 dB coupler, weight coupler, and waveguide crossing, respectively. The resulting insertion loss can be written as:

$$IL = -20 \log_{10}((ak\xi_1)(EL_c^{2 \log 2 (N)})(EL_w^{M-1} EL_x^{(N-1)(M-1)})).$$

While circuits 300, 400, 401 all utilize front-end optical splitters and back-end optical combiners constructed from cascades of 3 dB couplers, the described crossbar architecture can also be used, as will be readily appreciated by those of ordinary skill in the art, in conjunction with other splitters and combiners of uniform power coupling ratios, including, e.g., from a 1×N (or N×1) coupler, or multiple stages of couplers at least one of which is not a 1×2 (2×1) coupler (collectively forming a tree coupler). The optical field amplitude of the output signal for this more general case is given by:

$$E_{out} = ((ak)(\xi_1)E_{in})(EL_{c,row})(EL_{c,row})(EL_w^{M-1} EL_x^{(N-1)(M-1)}),$$

where $EL_{c,row}$ means the total loss of row-wise split and combine couplers. The corresponding insertion loss is:

$$IL = -20 \log_{10}((ak\xi_1)(EL_{c,row})(EL_w^{M-1} EL_x^{(N-1)(M-1)}))$$

Further, the couplers in the front-end optical splitter and back-end optical combiners, as well as in the weight couplers, may be variable couplers with tunable power coupling ratios. The flexibility provide by variable couplers can be beneficial, for example, for sparse matrix implementations or, more generally, implementations of matrices that include one or more weights equal to zero. With fixed coupling ratios of static optical couplers, such matrix implementations would suffer potentially large excessive insertion losses, as the fraction of the power directed to the zero weights would contribute zero power to the optical output signals. With variable couplers, the coupling ratios could be adjusted to instead evenly distribute the optical power of the incoming signal among only the non-zero weights.

FIG. 5 depicts an example crossbar photonic circuit 500 for multiplying a vector with a matrix, characterized by 2D matrix layout with a reduced number of waveguide crossings, in accordance with various embodiments. The circuit 500 differs from that of FIGS. 3-4B in the back-end optical combiners 502, but is otherwise similar. Instead of first routing the second modulated optical signals from the second optical modulator cells 302 to the very bottom of the crossbar, circuit 500 recombines the second optical signals in pairs across neighboring rows in between the respective horizontal waveguides 308, preceding any waveguide crossings between the optical combiners and the horizontal waveguides 308. At the next stage of 3 dB couplers of the optical combiner, the (partially) combined signals are then again combined in neighboring pairs, resulting in (generally still partially) combined signals each composed of four second optical modulated signals, and the process continues until signals have been combined across all rows within the column. In the second and each subsequent recombination stage, the modulated signal of the pair that comes from the higher one of the two rows is routed vertically across horizontal waveguides 308 to the lower row, and the two signals are recombined before crossing the horizontal waveguide 308 associated with the lower row. In this manner, modulated signals are gradually aggregated towards the bottom of the crossbar. Once the last row is reached, light from all paths in each column has been combined. Beneficially, this layout reduces the number of waveguide crossings 314, and the associated passive losses, in the photonic circuit 500, as compared with the photonic circuit 300 of FIG. 3.

Figure 6B:
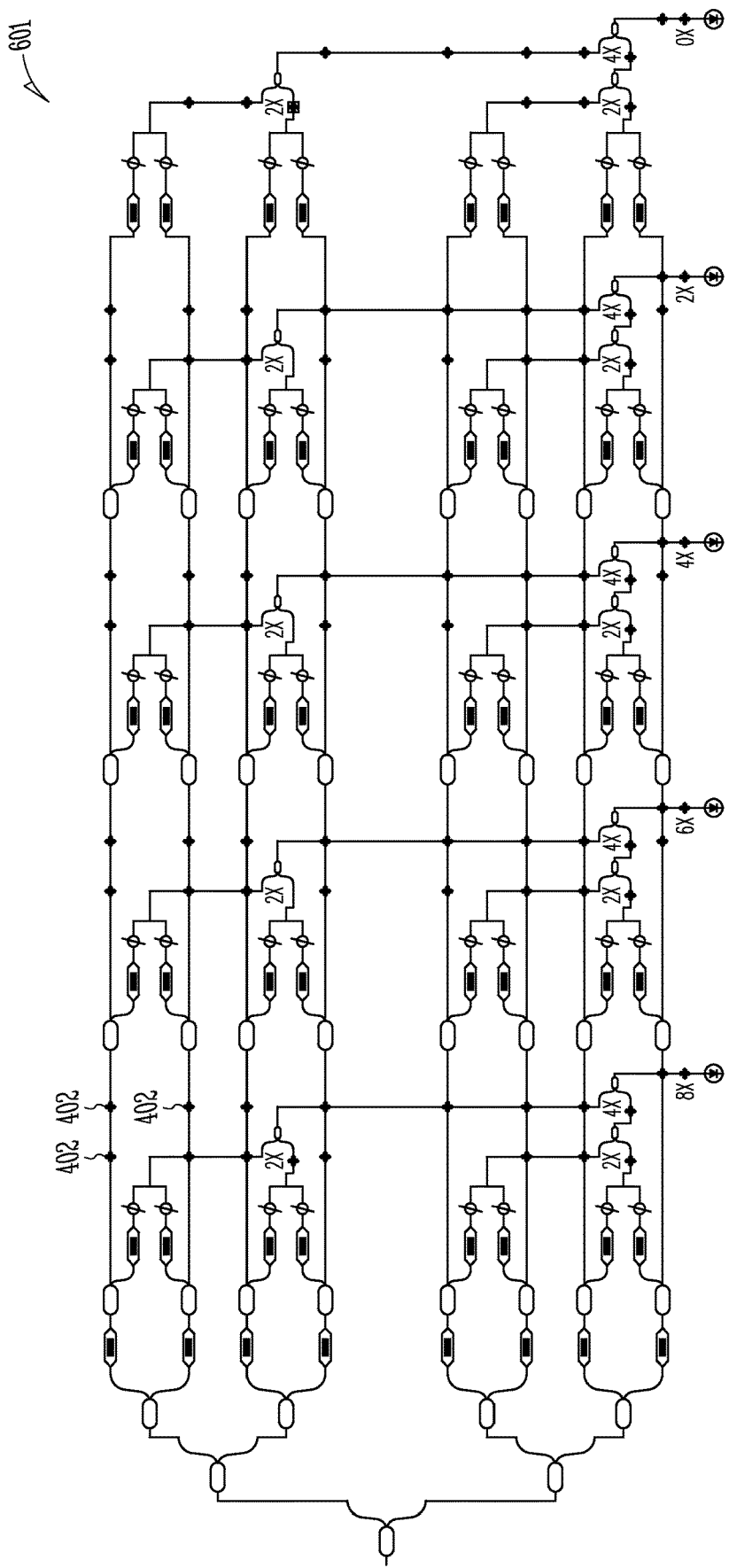
FIG. 6B depicts an example crossbar photonic circuit with dummy waveguide crossings as shown in FIG. 6A for a 8×5 matrix.

FIG. 6A depicts an example crossbar photonic circuit 600 having the layout of the circuit of FIG. 5, augmented with dummy waveguide crossings (indicated by placeholders 404 each representing one or more waveguide crossings) for power and/or delay balancing in accordance with various embodiments. Further, FIG. 6B depicts an example photonic circuit 601 with dummy waveguide crossings 402 (some having associated multipliers of 2×, 4×, etc.) as shown in FIG. 6A for a 8×5 matrix. Dummy waveguide crossings 402 are included in the horizontal waveguides 308 and in the optical combiners 502 (including following the final recombination stage, preceding the optical receivers 124), and may be grouped together where possible to simplify manufacturing.

The optical field amplitude of the optical output signal at each column of a photonic circuit 600 with dummy waveguide crossings as shown in FIG. 6A (and for N=8, M=5 in FIG. 6B) can be calculated according to:

$$E_{out} = ((ak)(\xi_1)E_{in})(EL_c^{2 \log 2(N)})(EL_w^{M-1} EL_x^{(\log 2(N)-1)(M-1)+(N-1)}),$$

where a and k are again the amplitude losses associated with the first optical modulator cells (input modulators) and second optical modulator cells (weight modulators), respectively, $\xi_1$ is the coupling ratio of the weight coupler in the first column, and $EL_c$, $EL_w$, and $EL_x$ are excess losses of the 3 dB coupler, weight coupler, and waveguide crossing, respectively. The resulting insertion loss can be written as:

$$IL = -20 \log_{10}((ak\xi_1)(EL_c^{2 \log 2(N)})(EL_w^{M-1} EL_x^{(\log 2(N)-1)(M-1)+(N-1)})).$$

The output field amplitude and insertion loss differ from those for the photonic circuits of FIGS. 4A-4B in the loss terms associated with the waveguide crossings.

For general embodiments, including cases where the front-end optical splitter and back-end optical combiners are constructed from a 1×N (or 1×N) coupler or multiple stages of couplers at least one of which is not a 1×2 (or 2×1) coupler, the optical field amplitude of the output signal and insertion loss are given by:

$$E_{out} = ((ak)(\xi_1)E_{in})(EL_{c,row})(EL_w^{M-1} EL_x^{(\log 2(N)-1)(M-1)+(N-1)}),$$

$$IL = -20 \log_{10}((ak\xi_1)(EL_{c,row})(EL_w^{M-1} EL_x^{(\log 2(N)-1)(M-1)+(N-1)})),$$

where $EL_{c,row}$ means the total loss of row-wise split and combine couplers. Note that, while the type of front-end optical splitter will not affect the crossbar layout, a different type of back-end optical combiner will entail some adjustments to the waveguide routing. For example, at a stage with three-way couplers, three (original second modulated or already partially combined) optical signals would be routed to the same row and combined there. For a single-stage optical combiner, all signals would be routed to the last row of the crossbar for recombination in an N×1 coupler.

Comparing the passive losses associated with the waveguide crossing, $EL_x$, scaled with the number of rows and columns of the matrix, between the two types of photonic crossbar circuits 400, 600 depicted in FIGS. 4A and 6A, respectively, herein also "crossbar type 1" and "crossbar type 2," we find:

for crossbar type 1 (photonic circuit 400):

$$IL \partial (N-1)(M-1) EL_{x,dB}, \text{ and}$$

for crossbar type 2 (photonic circuit 600):

$$IL \partial ((\log_2(N)-1)(M-1)+(N-1)) EL_{x,dB},$$

where $EL_{x,dB} = -20 \log_{10}(EL_x)$. For N=M, the formulae simplify to:

for crossbar type 1:

$$IL \sim O(N^2), \text{ and}$$

for crossbar type 2:

$$IL \sim O(\log_2(N)N).$$

As can be seen, waveguide crossing scale much slower in photonic circuits 600 of type 2 than in photonic circuits 400 of type 1; thus, type-2 circuits generally have lower insertion losses. For example, for a 32×32 weight matrix, there are 961 waveguide crossing in a crossbar of type 1, but only 160 in a crossbar of type 2.

In the photonic circuits described herein, coherent carrier light coupled from a suitable light source to a single optical input a time delay from the light source to the first optical modulators cells, and that delay is desirably matched across different paths so that the electronic drivers of all first optical modulator cells can be synchronized. Similarly, the first modulated optical signals exiting the first optical modulator cells experience a time delay from the first optical modulator cells to the second optical modulator cells. These delays, too, should are preferably matched between the various modulator pairs so that the electronic drivers of all second optical modulator cells can likewise be synchronized. If delay is not matched, the system can be made work by introducing time differences in the driver synchronization to compensate for the mismatch; this approach, however, comes at the cost of significant control complexity.

In the above-described power-balanced photonic circuits, delay matching across the different optical paths between the optical input and the optical receivers can be achieved with optical delay lines (not shown in the figures). The description now turns to alternative embodiments, in which the optical paths are inherently delay-matched by virtue of equal geometric path lengths, obviating the need for delay lines.

Figure 7A:
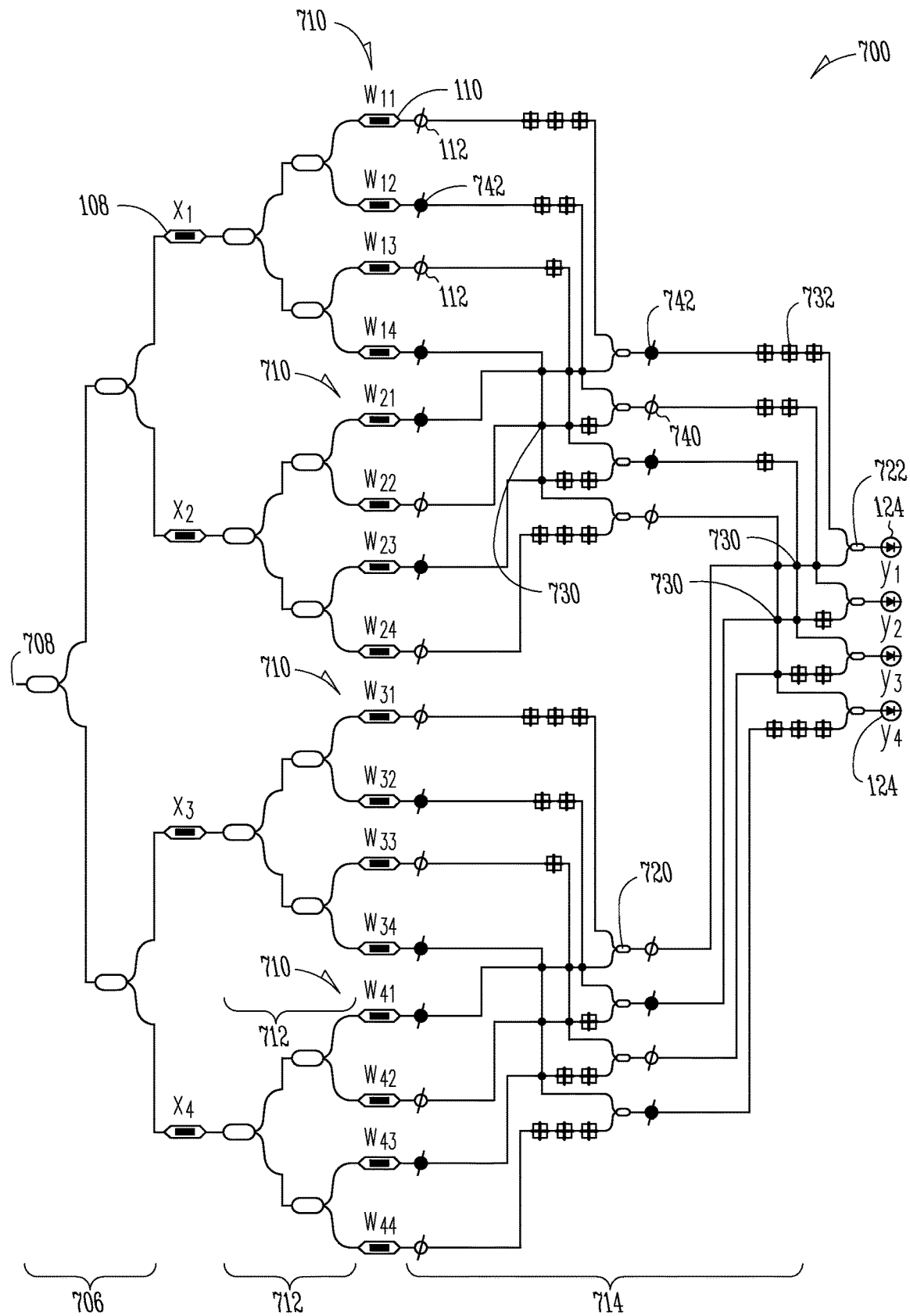
FIGS. 7A-7C depict example photonic circuits for multiplying a vector by a matrix, characterized by one-dimensional (1D) matrix layouts with geometrically delay-matched optical paths in accordance with various embodiments.
Figure 7B:
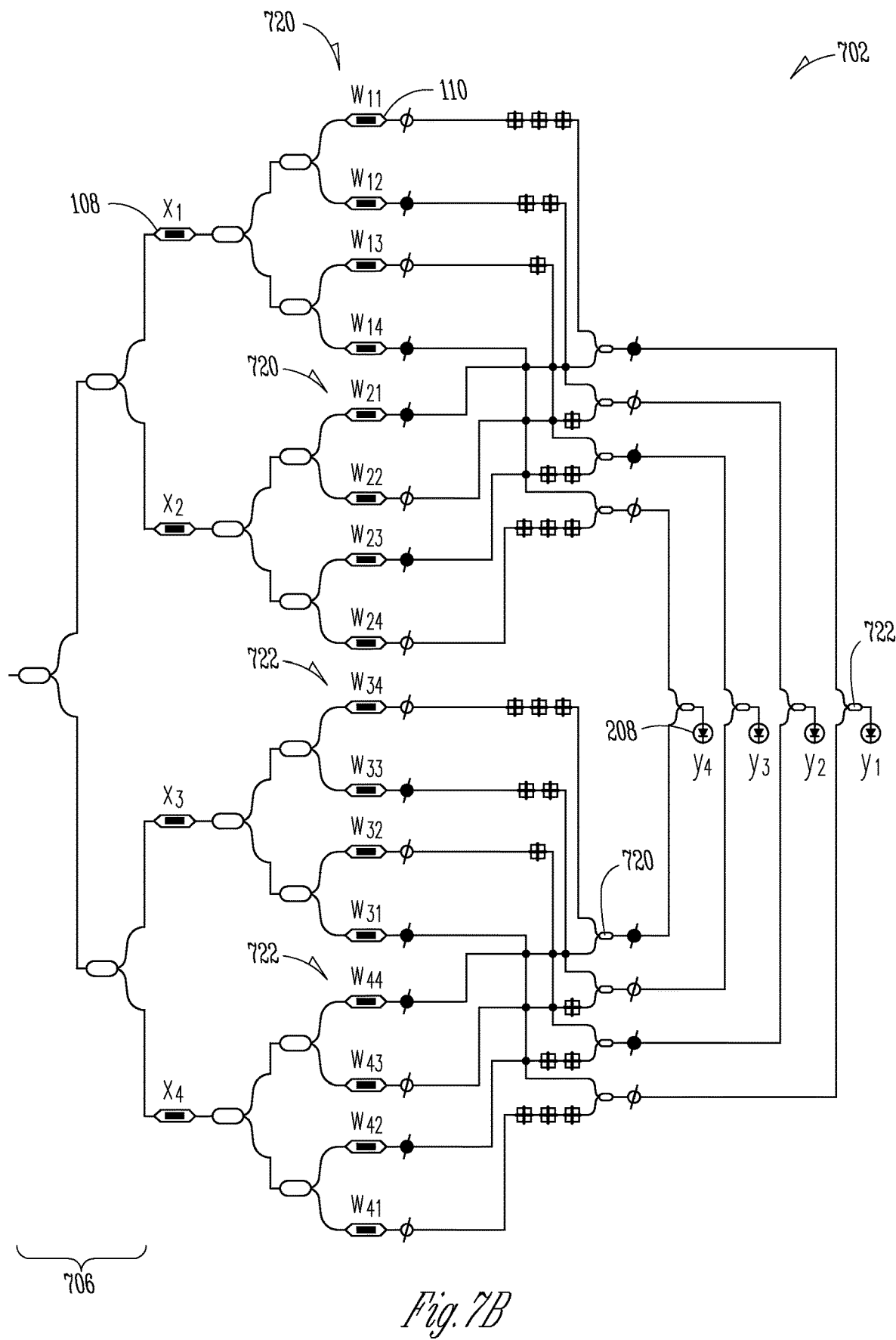
Figure 7C:
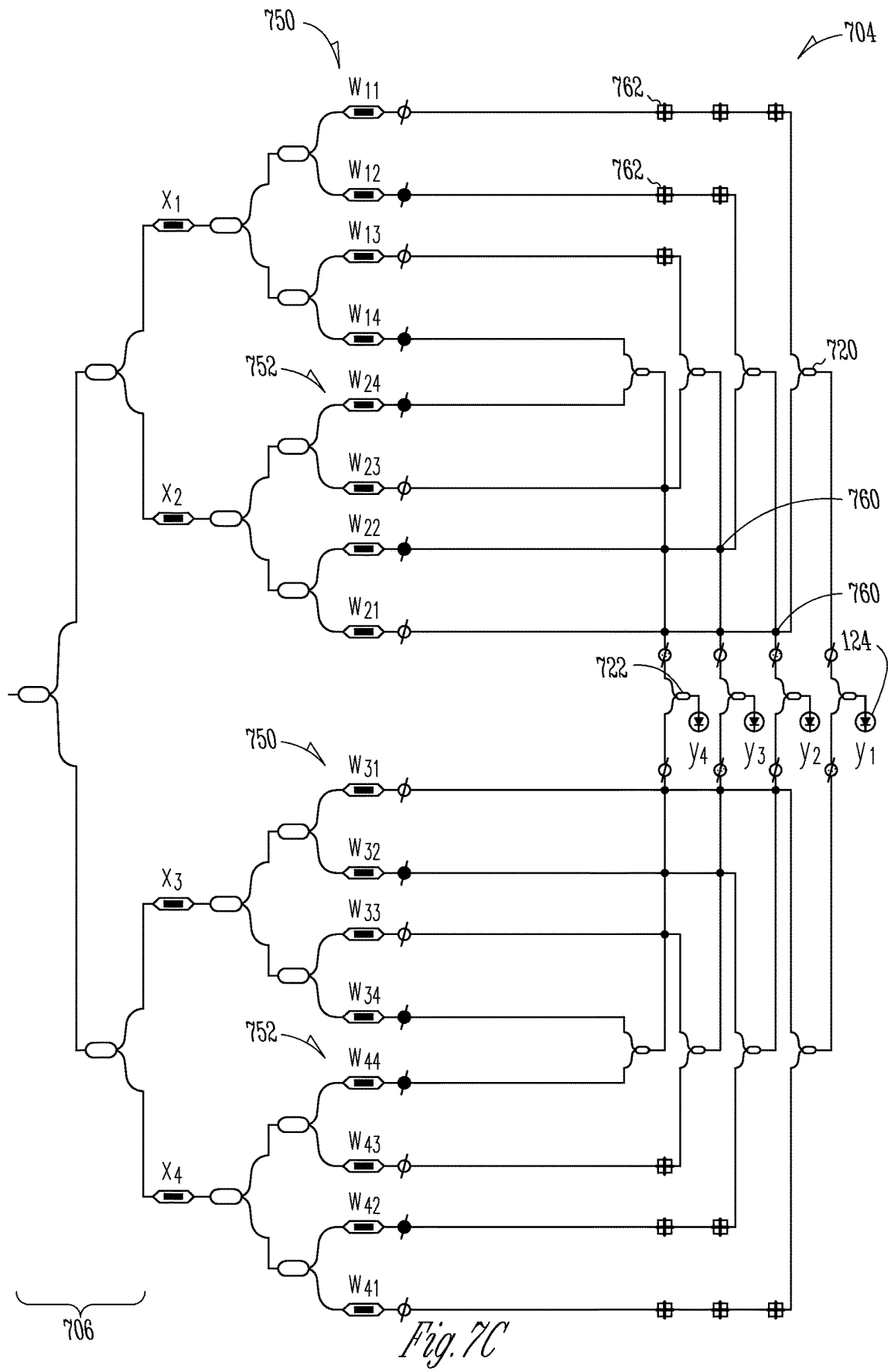

FIGS. 7A-7C depict example photonic circuits 700, 702, 704 for multiplying a vector by a matrix, characterized by one-dimensional (1D) matrix layouts with geometrically delay-matched optical paths in accordance with various embodiments. The depicted example circuits are all configured for four-component first and second vectors, but the design principles can be readily extended to higher-dimensional vectors. In matrix notation, the circuits 700, 702, 704 accomplish the multiplication of a 4×4 weight matrix [W] (comprising four weight vectors along the columns, if multiplied from the right) with a four-component input vector $[X]^T$, resulting in a four-component output vector [Y]:

$$[x_1 \ x_2 \ x_3 \ x_4] \begin{bmatrix} w_{11} & w_{12} & w_{13} & w_{1M} \\ w_{21} & w_{22} & w_{23} & w_{2M} \\ w_{31} & w_{32} & w_{33} & w_{NM} \\ w_{41} & w_{42} & w_{43} & w_{NM} \end{bmatrix} = [y_1 \ y_2 \ \ldots \ y_M]$$

Each of the photonic circuits 700, 702, 704 includes a front-end optical splitter 706 that splits the incoming carrier light between initially four optical paths along which the resulting optical carrier signals are routed to four first optical modulator cells to encode the inputs $x_1, x_2, x_3, x_4$ onto the four optical carrier signals. As depicted, the first optical modulator cells may each be simply a first amplitude modulator 108, although in some embodiments, the first optical amplitude modulator cells may also include a phase shifter. For simplicity, reference is hereinafter made to first amplitude modulators 108, with the understanding that the first amplitude modulators 108 can be substituted with more general first optical modulator cells.

As shown, the front-end optical splitter may be implemented as a tree coupler, e.g., a binary waveguide tree with a symmetric cascade of 3 dB couplers, but other single-stage or multiple-stage splitters providing uniform power coupling ratios may also be used alternatively. The optical splitter 706 is configured such that the paths from the common optical input at 708 to the first amplitude modulators 108 (the "first paths") are all of equal length, and as such geometrically delay-matched. In the depicted circuit, such delay matching in the front-end optical splitter 706 is achieved by the arrangement of the first amplitude modulators along a single line in conjunction with a tree coupler that is symmetric not only in terms of its couplers and coupling ratios, but also in terms of its geometric layout.

In each path, the modulated light exiting the respective first amplitude modulator 108 is further split four-ways to route the modulated light from the first amplitude modulator 108 to four spatially grouped second optical modulator cells, hereinafter also referred to as a group 710 of second optical modulator cells, that collectively impart onto the modulated light corresponding components of all four weight vectors (that is, components that correspond to one another as well as to the component of the input vector encoded on the respective path). For example, in the path where the first amplitude modulator encodes the first component $x_1$ of the input vector, the group 710 of second optical modulator cells 110 encodes the respective first components $w_{11}, w_{12}, w_{13}, w_{14}$ of the four weight vectors. Each second optical modulator cell includes at least a second amplitude modulator 110 and optionally a phase shifter 112. Since in the depicted embodiment, for reasons that will become clear below, only every other of the second amplitude modulators 110 has an associated phase shifter 112 (the other ones having merely dummy phase shifters), reference is hereinafter made simply to second amplitude modulators 110, and the phase shifters are deemed part of the back-end optical combiners. It is to be understood, however, that the second amplitude modulators 110 can generally be substituted with second optical modulator cells.

The second amplitude modulators 110 of all four groups 710 are arranged, in circuits 700, 702, 704, along a single line ("linearly"), parallel to the arrangement of the first amplitude modulators 108, which is herein also denoted as the "first dimension." The waveguide structures each routing an optical signal between one of the first amplitude modulators 108 and the associated group of second amplitude modulators 110 are configured as optical splitters with uniform power coupling ratios, which, just like the front-end optical splitter 706, may take the form of a tree coupler 712, e.g., a binary waveguide tree with 3 dB couplers at the junctions as shown, or some other single-stage or multiple-stage coupler. Also like the front-end optical splitter 706, the waveguide layout of the tree couplers 712 is highly symmetric and intrinsically ensures that the optical paths from the first amplitude modulators 108 to the second amplitude modulators 110 of the respective group 710 (the "second paths") are all of equal length, i.e., geometrically delay-matched. As a result of the spatial groupings of the second amplitude modulators by the first modulated optical signals onto which they impart weights, the tree couplers 712 can also be configured to avoid any waveguide crossings, such as with waveguides downstream of the second amplitude modulators. That is, the circuits 700, 702, 704 are free of any waveguide crossings upstream of the second amplitude modulators.

In each of the circuits 700, 702, 704, the outputs of second amplitude modulators 110 are routed, and combined across groups 710, by binary inverse tree couplers (constituting the back-end optical combiners, collectively labeled 714), which are symmetric in terms of the couplers at their junction, but do not exhibit the kind of geometric symmetry as, e.g., the depicted mirror-symmetric front-end optical splitter 706. As between the circuits 700, 702, 704, the order of the second amplitude modulators 110 within the linear arrangement, the waveguide layout of the inverse tree couplers between the second amplitude modulators 110 and the optical receivers 124, and the arrangement of the receivers 124 themselves, differ.

With reference to FIG. 7A, in example circuit 700, the optical receivers 124 are all arranged linearly, parallel to the arrangement of first amplitude modulators 108 and the arrangement of second amplitude modulators 110. Further, the optical receivers 124 are ordered by the output vector component they measure in the same manner as the first amplitude modulators 108 and the respective groups 710 of second amplitude modulators 110; for instance, as depicted, the modulators 108, 110 and receiver 124 associated with the first vector component may be the top-most in the arrangement (referencing the position within the figure), followed by those associated with the second vector component, etc. Further, within each group 710, the second amplitude modulators 110 are also arranged in the same order as the optical receivers 124 (and thus in the same order across all groups 710, corresponding to the same sequence of the associated weight vectors whose components they encode). As a result of this ordering, each inverse tree coupler combines light from second amplitude modulators at positions within the groups (or spatial groupings) that correspond to a position of the associated optical receiver 124 within the linear arrangement of receivers 124.

For each of the weight vectors (second vectors), the modulated outputs of the corresponding second amplitude modulators 110 are combined across all groups 710 by an inverse tree coupler, in the depicted example a binary inverse waveguide tree with 3 dB couplers at its junctions. As can be seen in FIG. 7A, the individual inverse waveguide trees do not exhibit the same mirror symmetry that characterizes the front-end splitter 706, but are nonetheless configured such that the optical paths from the second optical modulator cells 110 to the first stage of couplers 720 and from the first stage of couplers 720 of the tree coupler to the coupler 722 at the second stage are each equal in length (such that the overall third optical paths from the second optical modulator cells to the optical receivers 124 are also equal in length). Further, the inverse waveguide trees all share a common layout, and are simply shifted along the first dimension.

As can also be seen, the inverse waveguide trees inevitably cross at various points 730 (only some waveguide crossings being labeled in the figure to avoid obfuscation), as a result of combining light across the multiple groups 710 of second amplitude modulators 110. To balance out any impact that these waveguide crossings have on the optical delay or the optical power in the various (third) paths, additional, dummy waveguide crossings 732 are included in the waveguide trees such that the number of actual plus dummy waveguide crossings 730, 732 matches between all counterpart optical path segments. For instance, in the example of FIG. 7A, the optical path segments preceding the couplers 720 in the first stage of the back-end optical combiners each have three waveguide crossings 730, 732 in total. Similarly, the optical path segments between the first and second stages of couplers 720, 722 each have three waveguide crossings 730, 732.

As a result of the binary waveguide trees that serve as back-end optical couplers in the depicted circuit 700, it is possible to encode relative phase shifts (or signs) between the second modulated optical signals combined for each optical receiver 124 without having to include a phase shifter 112 alongside each second amplitude modulator 110. Instead, as shown, the back-end optical combiner may include, for each pair of optical signals to be combined at a given stage, a single phase shifter 112 or 740 preceding the respective coupler to encode the relative phase between the two signals. Thus, in the depicted circuit, only every other of the second amplitude modulators 110 has a phase shifter directly following it, preceding the first stage of couplers 720. Additional phase shifters 742 are included between the first and second stages of couplers 720, 722 to encode the relative phase shift between the two partially combined signals output in the first stage (or, in real-valued application, to control whether the outputs of the first stage are added or subtracted). The phases shifters 112, 740 may additionally serve to correct for any phase mismatch between paths, which cannot be completely eliminated by geometric delay-matching alone.

Placing phase shifters in the back-end optical combiners, one phase shifter preceding each of the optical couplers 720, 722 in each stage, is beneficial in that it reduces the total number of operative phase shifters needed, as compared with using phase shifters in all second optical modulator cells, to encode relative phase shifts between all signals. For example, photonic circuit 720 includes only twelve, rather than sixteen, operative phase shifters. However, these phase shifters can cause excess optical delays or losses. To balance losses and delays across all paths, dummy phase shifters 742 may therefore be placed in the circuit. As shown, among a pair of optical paths to be combined at any coupler 720, 722, one path may include an operative phase shifter while the other path includes a dummy phase shifter. Since dummy phase shifters need not be actively controlled, this configuration may still be beneficial over phase shifters in each second optical modulator cell, despite a greater total number of operative and dummy phase shifters.

Turning now to FIG. 7B, in the photonic circuit 702, the layout differs in that the optical receivers 124 are arranged linearly along a direction (herein also the "second dimension") that is perpendicular to the first dimension, along which each of the first and second amplitude modulators 108, 110 are arranged. Further, the order of second amplitude modulators 110 in terms of their associated weight vectors and optical receivers 124 is no longer the same across all groups of second amplitude modulators 110. Rather, the groups of second amplitude modulators 110 fall into an upper half of groups 220 and a lower half of groups 222, which mirror each other in the order of second amplitude modulators within each group. For instance, as shown, in the upper groups 220, the second amplitude modulators 110 are ordered, from top to bottom (referencing relative positions within the drawing), by weight vectors from the first vector to the fourth vector (e.g., for the set associated with the first vector components, in the order of $w_{11}$, $w_{12}$, $w_{13}$, $w_{14}$), while in the lower groups 220, the second amplitude modulators 110 are arranged in the reverse order, i.e., from top to bottom, by weight vectors from the fourth vector to the first vector (e.g., for the set associated with the fourth vector components, $w_{44}$, $w_{43}$, $w_{42}$, $w_{41}$) As a result of this ordering, each inverse tree coupler combines light from second amplitude modulators at positions within the groups (or spatial groupings) that mirror each other between the first half of groups 220 and the second half of groups. This configuration, in turn, allows routing the waveguides of the inverse tree coupler between the first and second stages of couplers 720, 722 in a "nested" manner, e.g., as shown, combining the modulated light associated with the fourth to first weight vectors in a direction from the inside to the outside of the layout. The nesting of waveguides avoids waveguide crossings between the couplers 720, 722, leaving waveguide crossings (including dummy crossings) only between the second amplitude modulators 110 and the first stage of couplers 720 of the back-end optical combiners (714). The photonic circuit 702, like circuit 700 of FIG. 7A, may include operative and dummy phase shifters preceding each coupler of the back-end combiners.

In the photonic circuit 704 of FIG. 7C, the optical receivers 124 are arranged, like in circuit 702 of FIG. 7B, along a second dimension, perpendicular to the direction along which each of the first and second amplitude modulators 108, 110 are arranged. Further, the ordering of second amplitude modulators 110 differs between the sets associated with the various vector components. Specifically, the order of second amplitude modulators by weight vectors alternates between adjacent groups (corresponding to spatial groupings), such that the groups fall into two sets, groups 750 and groups 752, that mirror each other in the order of second amplitude modulators 110 within each group. For instance, the second amplitude modulators 110 associated with the first vector components are ordered, from top to bottom (referencing relative positions within the drawing), by $w_{11}$, $w_{12}$, $w_{13}$, $w_{14}$, whereas the second amplitude modulators 110 associated with the second vector components are arranged in the reverse order, i.e., are ordered, from top to bottom, by $w_{24}$, $w_{23}$, $w_{22}$, $w_{21}$. With this ordering, the waveguide routing from the second amplitude modulators 110 to the first stage of couplers 720 in the back-end optical combiners (714) can be nested for the pair of groups 750, 752 associated with the first and second vector components and, separately, the pair of groups 750, 752 associated with the third and fourth vector components, eliminating (actual) waveguide crossings between the waveguides of this first combiner stage. Further, following the first stage of couplers 720, the waveguides to the second stage of couplers 722 are parallel to each other, and thus do not cross each other either. However, the layout includes waveguide crossings 760 (only some being labeled) between the waveguides of the first stage of some inverse waveguide trees and the waveguides of the second stage of other inverse waveguide trees. Overall, following the addition of dummy waveguide crossings 762 to balance the layout, the number of waveguide crossings per third optical path is three in this layout, just as in photonic circuit 702.

As can be seen in FIGS. 7A-7C, the overall layouts of the example photonic circuits 700, 702, 704 contain structural sub-units that are repeated across the circuit in identical or similar form, allowing the circuits to be expanded to higher-dimensional vectors and greater numbers of vectors by adding further copies.

Figure 7D:
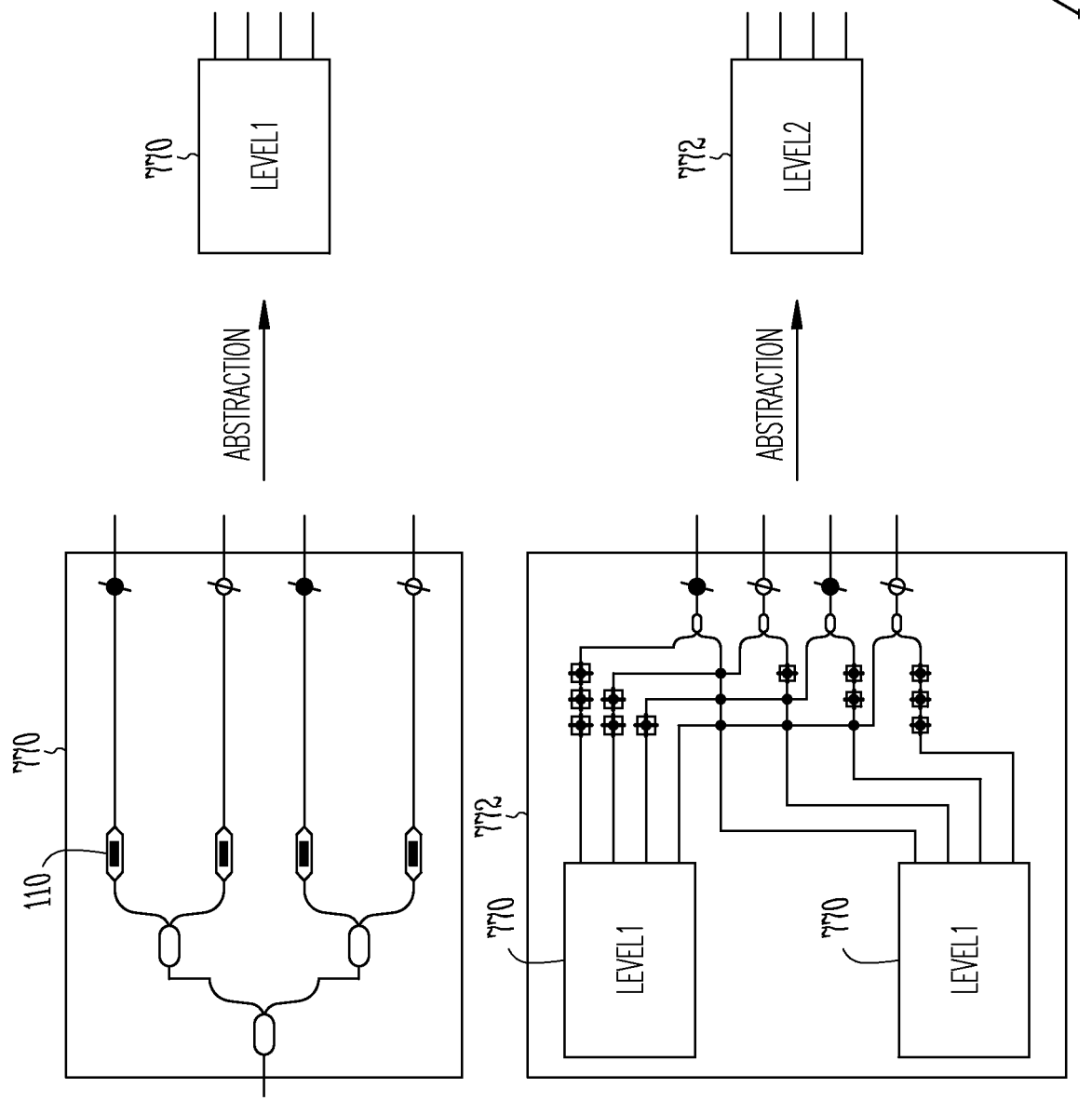
FIG. 7D illustrates sub-units of the photonic circuit of FIG. 7A, as can be replicated to scale the circuit to larger vectors and matrices, in accordance with various embodiments.

FIG. 7D illustrates sub-units of the photonic circuit 700 of FIG. 7A, as can be replicated to scale the circuit to larger vectors and matrices, in accordance with various embodiments. At a first level, each set of second amplitude modulators associated with a particular vector component and the associated operative or dummy phase shifter, along with the waveguide tree that provides modulated output light from the corresponding first amplitude modulator 108 to the second amplitude modulators 110, can be considered a first type of sub-unit 770. At a second level, two such sub-units, along with the waveguide tree structures that combine light across the two sub-units 770 in the first combiner stage, can be considered a second type of sub-unit 772. For four-component vectors, as shown in FIG. 7A, the circuit would include two such second-level sub-units 772; n sub-units 772 would serve to implement multiplications of 2n-component vectors.

Figure 8A:
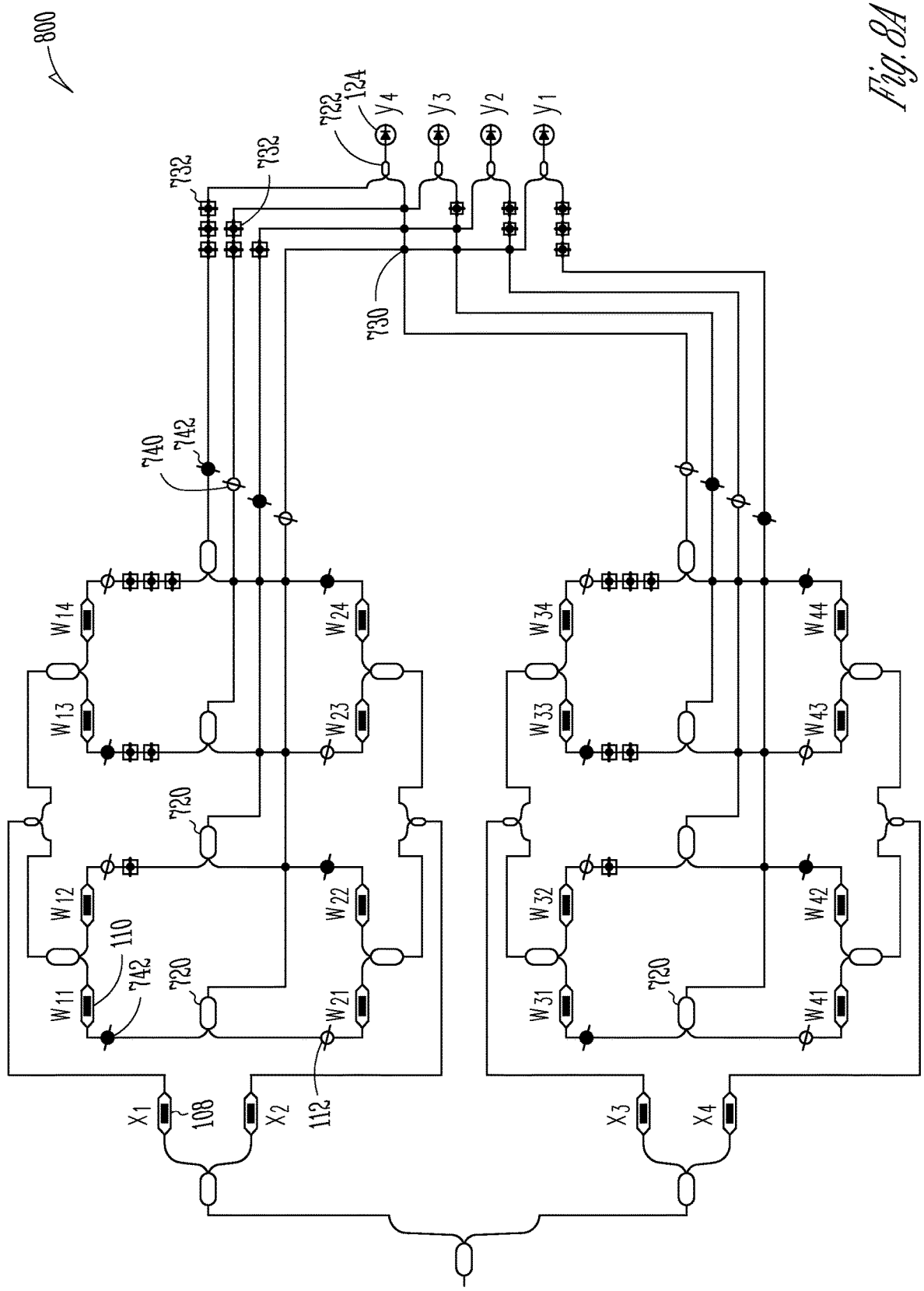
FIG. 8A depicts an example photonic circuit for multiplying a vector by a matrix, characterized by a 2D matrix layout with geometrically delay-matched optical paths in accordance with various embodiments.

FIG. 8A depicts an example photonic circuit 800 for multiplying a vector by a matrix, characterized by a 2D matrix layout with geometrically delay-matched optical paths in accordance with various embodiments. The example is, again, for four-component vectors, but the design principles can be extended to higher-dimensional vectors. Like in circuits 700, 702, 704, the front-end optical splitter at the input, the waveguide structures connecting the first and second amplitude modulators 108, 110, and the back-end optical combiners are implemented topologically by binary tree couplers and binary inverse tree couplers (which could be replaced by other single-stage or multiple-stage splitters and combiners as long as they provide uniform power coupling ratios), but the geometric layout differs substantially from the above embodiments.

In photonic circuit 800, the first amplitude modulators 108 for encoding the inputs and the optical receivers 124 measuring the optical outputs are each aligned along a first dimension (as shown, vertically, so as to form a column), but the second amplitude modulators 110 for encoding the weights are arranged in a two-dimensional array defined along the first dimension and a second (as shown, horizontal) dimension perpendicular to the first. More specifically, as in the crossbar layouts of FIGS. 3-6B, the four groups associated with the four vector components are spread out along the first dimension (as shown, vertically), as in the circuit layouts of FIGS. 7A-7C, but within each group, the four second amplitude modulators 110 are arranged in rows along the second dimension (horizontally), aligned across groups to form four sets of second amplitude modulators 110 arranged along columns, each corresponding to one of the weight vectors. Put differently, the array arrangement of the second amplitude modulators reflects the arrangements of weights in the weight matrix [W] in the operation $[X]^T[W]=[Y]$.

The 3 dB couplers of the binary waveguide trees that connect each first amplitude modulator 108 to its respective group of second amplitude modulators 110 are arranged, in the first (vertical) dimension, above or below the respective row of second amplitude modulators, and in the second (horizontal) dimension, symmetrically between the second and third columns of amplitude modulators associated with the second and third weight vectors. In the inverse waveguide trees of the back-end optical combiners, the modulated light outputs of pairs of second amplitude modulators in each column are combined by a first stage of 3 dB couplers 720 placed vertically mid-way between the respective rows, and the combined output is routed to the second stage of 3 dB couplers 722, which are arranged along the first dimension directly preceding the optical receivers 124. In the depicted waveguide layout, each third path includes three actual or dummy waveguide crossings 730, 732 preceding each of the two coupler stages. Further, the photonic circuit 800 may include operative and dummy phase shifters 112, 740, 742 preceding each coupler 720, 722 of the back-end optical combiners.

FIG. 8B illustrates sub-units of the photonic circuit of FIG. 8A, as can be replicated to scale the circuit to larger vectors and matrices, in accordance with various embodiments. At the first level, two rows of second amplitude modulators 110, along with the preceding waveguide tree that splits modulated light received from the corresponding first amplitude modulators 108 between the different columns, and further along with the first stage of the combiner, constitutes sub-unit 850. While four columns of weights, corresponding to four second (weight) vectors associated with four outputs $y_1$-$y_4$, are explicitly shown, the sub-unit 850 can be straightforwardly expanded to incorporate additional columns of weights for additional outputs, as symbolically indicated by dots. At the second level, two such sub-units 850, along with the waveguide tree structures that combines light across the two sub-units 870 in the second combiner stage, form sub-unit 852. For four-component vectors, as shown in FIG. 8A, the circuit would include only one such second-level sub-units 852. The photonic circuit 800 architecture can be expanded to higher-dimensional vectors by adding further sub-units 850, corresponding to pairs of additional rows of second amplitude modulators for additional weights, along with additional pairs of first amplitude modulators and additional stages of couplers in the output combiner. To expand the photonic circuit 800 to a greater number of second (weight) vectors, additional columns may be added to the matrix arrangement of second amplitude modulators, along with additional stages of couplers in the splitters between the first and second amplitude modulators, within each sub-unit 850. Dummy waveguide crossings may be added at both the first and the second level as needed to balance the layout. Note that the depicted symbols for dummy waveguide crossings each stand for one or more dummy waveguide crossings.

The photonic circuits of FIGS. 3-8B all achieve the multiplication of a vector with a matrix. The computation can be extended to matrix@matrix multiplications by using wavelength division multiplexing (WDM) to impart multiple input vectors simultaneously onto the optical carrier signals and retrieve multiple respective output vectors at the optical receivers.

Figure 9:
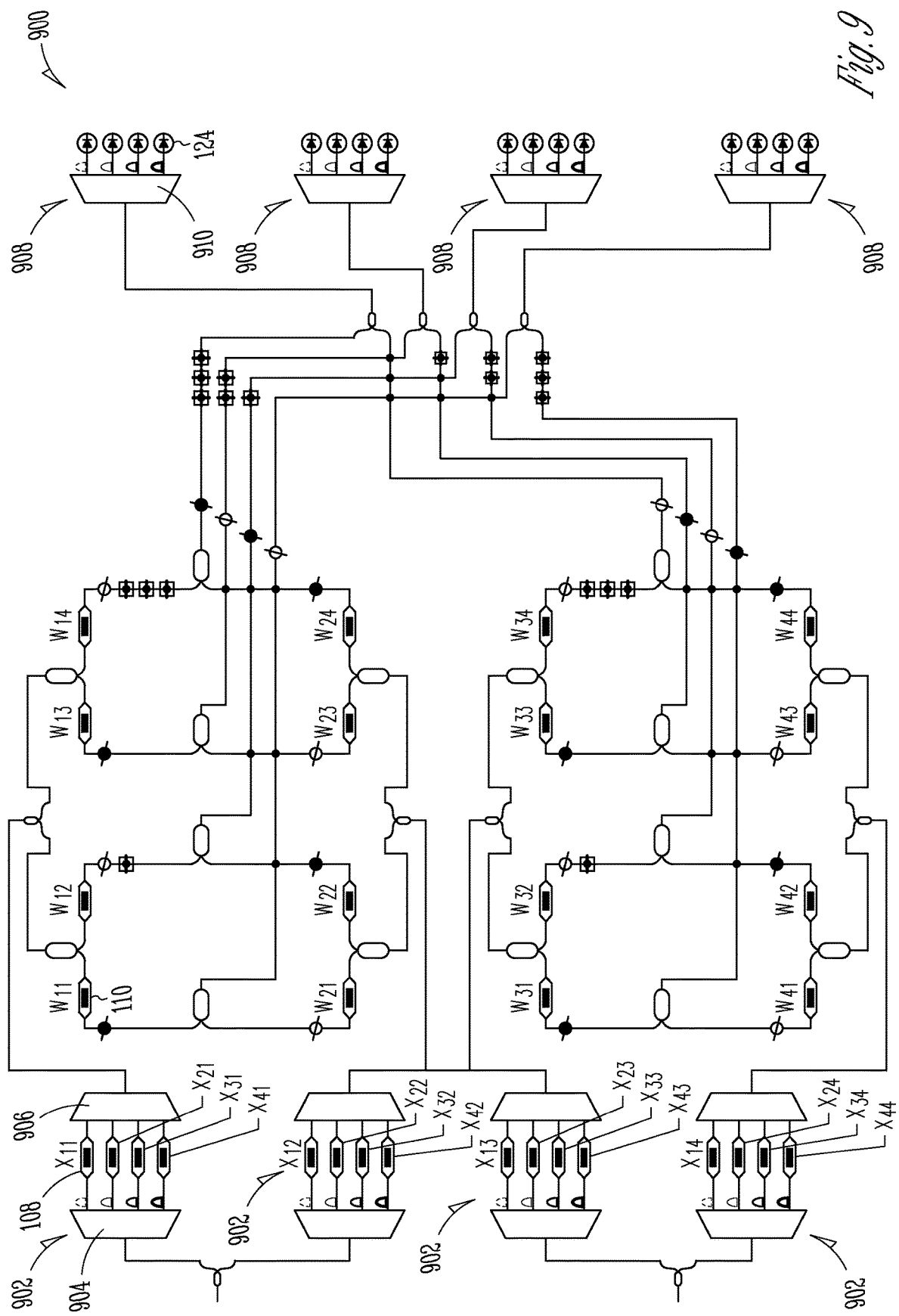
FIG. 9 depicts an example photonic circuit for multiplying two matrices with each other, using wavelength-divisional multiplexing in accordance with various embodiments.

FIG. 9 depicts an example photonic circuit 900 for multiplying two matrices with each other, using wavelength-divisional multiplexing in accordance with various embodiments. The specific depicted circuit layout follows that of photonic circuit 800 of FIG. 8A, but it will evident to those of ordinary skill in the art that the modifications relative to circuit 800 can be equally applied to any of the other circuit layouts. In photonic circuit 900, multiple first (input) vectors are encoded onto multiple respective wavelengths, and multiplied in parallel with the weight matrix to produce multiple respective output vectors. The depicted example illustrates a (4×4)×(4×4) matrix@matrix operation (with four four-component input vectors and four four-component output vectors):

$$\begin{bmatrix} x_{11} & x_{12} & x_{13} & x_{14} \\ x_{21} & x_{22} & x_{23} & x_{24} \\ x_{31} & x_{32} & x_{33} & x_{34} \\ x_{41} & x_{42} & x_{43} & x_{44} \end{bmatrix} \begin{bmatrix} w_{11} & w_{12} & w_{13} & w_{14} \\ w_{21} & w_{22} & w_{23} & w_{24} \\ w_{31} & w_{32} & w_{33} & w_{34} \\ w_{41} & w_{42} & w_{43} & w_{44} \end{bmatrix} = \begin{bmatrix} y_{11} & y_{12} & y_{13} & y_{14} \\ y_{21} & y_{22} & y_{23} & y_{24} \\ y_{31} & y_{32} & y_{33} & y_{34} \\ y_{41} & y_{42} & y_{43} & y_{44} \end{bmatrix}.$$

It will be readily appreciated that additional input vectors at further wavelengths can be added.

The photonic circuit 900 includes modifications, relative to circuit 800, at the level of the first amplitude modulators 108 and the optical receivers 124. Specifically, the first amplitude modulators associated with the different components of the input vector are each replaced by a first optical modulator cell 902 that includes multiple (in the example, four) first amplitude modulators 108 associated with the respective component of all (four) input vectors, bracketed between a demultiplexer 904 and a multiplexer 906. The optical receivers (e.g., photodetectors) 124 associated with the various weight vectors are each replaced by an optical receiver cell 908 that includes a demultiplexer 910 followed by multiple receivers 124 (e.g., multiple photodetectors) associated with the respective multiple input vectors. These substitutions of the first amplitude modulators 108 and receivers 124 can be made similarly in any of the circuits 300, 400, 401, 500, 600, 601, 700, 702, 704 to extend those circuits to matrix@matrix operations with wavelength division multiplexing.

Returning, in more detail, to the circuit 900, coherent light—including components at multiple wavelengths—received at the optical input is, like before, routed with a front-end optical splitter, e.g., as shown, in the form of a binary waveguide tree, to the various optical modulator cells 902, each of which corresponds to one of the components of the input vectors (e.g., the first cell corresponds to the first components $x_{11}$, $x_{21}$, $x_{31}$, $x_{41}$). In each cell 902, the demultiplexer 904 separates out the various wavelengths, and light at each wavelength is separately modulated by respective first amplitude modulators 108 to impart the applicable component of the different input vectors. The multiplexer 906 then recombines the modulated light, such that the second amplitude modulators 110 encode the weights onto all wavelengths simultaneously. Following the second amplitude modulators 110, back-end optical combiners implemented by inverse waveguide trees each recombines the modulated light over an associated set of second amplitude modulators (arranged along a column) and routes the combined light to a respective receiver cell 908. The light reaching each receiver cell 908 encodes the scalar products between an associated weight vector and each of the input vectors at the multiple wavelengths. The demultiplexer 910 of the receiver cell 908 separates out the wavelength components, allowing the optical signals each representing a scalar product between one of the input vector and the weight vector associated with the cell 908 to be measured by an individual receiver 124.

The various described coherent, interferometric photonic circuit architectures provide multiple benefits for photonic computations. Using suitable optical modulator cells, e.g., including both amplitude and phase shifters, these coherent photonic circuits can implement any real- or complex-valued vectors and matrices. Further, in various embodiments, all parameters for the realization of any real-valued or complex-valued matrix can be set in a single step. By contrast, various prior photonic architectures for matrix operations that rely on singular value decomposition (SVD) and photonic implementations of the resulting unitary matrices (e.g., architectures employing cascaded stages of 2×2 MZIs as disclosed by Reck et al. in "Experimental realization of any discrete unitary operator," Phys. Rev. Lett. 73, 58-61 (1994), and by Clements et al. in "Optimal design for universal multiport interferometers," Optica 3, 1460-1465 (2016)) require N−1 steps to set the parameters for the photonic implementation of an N-dimensional matrix.

Also, unlike the SVD-based circuits, the disclosed photonic circuit architectures allow, in various embodiments, for 100% fidelity of the optical computation to the underlying mathematical operation that it implements. In general, when analog vector and matrix computations are performed in real-world photonic circuitry, non-ideal circuit components, such as lossy photonic devices, result in a performance degradation and a discrepancy between the actually implemented values of the vector and matrix elements and the nominal values. In various embodiments, however, such discrepancies can be compensated for in the controllable circuit components, e.g., by adjusting the optical amplitudes of signals in the optical modulators, or in the event of unbalanced losses along the paths leading to different optical receivers, by adding circuit components that amplify or attenuate the optical output signals to cure the imbalance; in this manner, to the extent fidelity degradation is loss-induced, the fidelity can in principle be fully restored.

Further, insertion losses in various of the disclosed photonic circuit architectures scale linearly with the loss of individual nodes, rather than exponentially as is the case for SVD-based counterparts. The disclosed photonic circuits, thus, have the potential to outperform SVD-based architectures, especially when dimensions increase. The comparatively low insertion losses entail significant fabrication versatility in the selection of dimensions and technologies of the active devices (such as modulators), which is beneficial for adapting the general circuit layouts to specific practical applications. Moreover, in various embodiments, the photonic circuits are loss-balanced, which may allow for highly loss-resistive behavior.

Some of the above-described photonic circuits provide additional or different benefits. For example, in the photonic circuit architectures described with reference to FIGS. 3-8B, the optical paths are inherently, by virtue of the geometric layouts, delay-matched, so that the optical modulator drivers and associated digital-to-analog converters (DACs) can be synchronized. Further, the proposed geometrically delay-matched layouts can achieve low latency between the first optical modulator cells encoding the inputs and the second optical modulator cells encoding the weights. Embodiments where front-end optical splitter and back-end optical combiner use only 50:50 optical couplers may be beneficial in that these coupler are broad-band and compact and the 50:50 splitting ratio, as compared with other splitting ratios, simplifies design, fabrication, and maintenance. Also, in some embodiments, the overall circuit layouts are composed of multiple structurally identical sub-units that can be grouped and copied over for high re-use, which reduces manufacturing cost and complexity.

Photonic Circuit Components

The above-described photonic circuits include photonic circuit components such as amplitude modulators, phase shifters, and optical receivers that can be implemented in various ways, depending, for example, on size and performance requirements as well as on the particular application (e.g., whether the imparted weights are unsigned or signed). Optical receivers may be implemented by individual photodetectors, or as coherent receivers including multiple photodetectors. The phase shifters (e.g., 112) may be electro-optic or thermo-optic phase shifters that modulate the refractive index within a waveguide carrying the signal by application of an electrical voltage or heat, respectively. In the case of a thermo-optic phase shifter, heat is usually applied by one or more Ohmic heating filaments; thus, thermo-optic phase shifters, like electro-optic phase shifters, can be controlled via electronic signals. The amplitude modulators may likewise be implemented by electro-optic or thermo-optic components, such as, e.g., EAMs (e.g., germanium silicon EAMs), optical resonant modulators (e.g. optical ring modulators), or Quantum-Confined Stark Effect (QCSE) EAMs. Since EAMs affect the refractive index as well as the absorption properties of the waveguide, it is also possible to implement phase shifters with EAMs, e.g., three EAMs in series to impart the desired phase shift while mutually canceling out incidental amplitude modulations caused by each individual EAM. The electronically controllable phase shifters and amplitude modulators may be used as such, or used as part of more complex (e.g., interferometric) modulator structures, optionally using differential drive schemes. Further, in some embodiments, the function of the amplitude modulators (and/or phase shifters), in particular those for imparting the weights, may be provided by non-volatile optical memory implemented by optical phase-change materials (O-PCMs). O-PCMs, such as various chalcogenide alloys (e.g., germanium-antimony-tellurium (GST) alloys), can undergo gradual changes between their crystalline and amorphous phases, and can be set, by controlled application of heat, to any physical phase along a continuum of phases between crystalline and amorphous. The different physical phases have different associated electrical and/or optical properties. Thus, O-PCMs, e.g., when disposed as thin films on top of a waveguide, can effect a change in the optical properties, such as refractive index and absorption, of the waveguide itself (e.g., by virtue of the overlap of the evanescent field of any guided mode with the O-PCM film). Beneficially, O-PCM-based optical memory is non-volatile, yet rewritable. Using O-PCMs, fixed optical amplitude modulations and/or fixed phase shifts can be stored directly in the circuit, without any need for electronic drive signals. Specific implementations of optical amplitude modulators and the associated drivers, as well as of optical receivers, are illustrated in the following with reference to FIGS. 10-22B.

Figure 10:
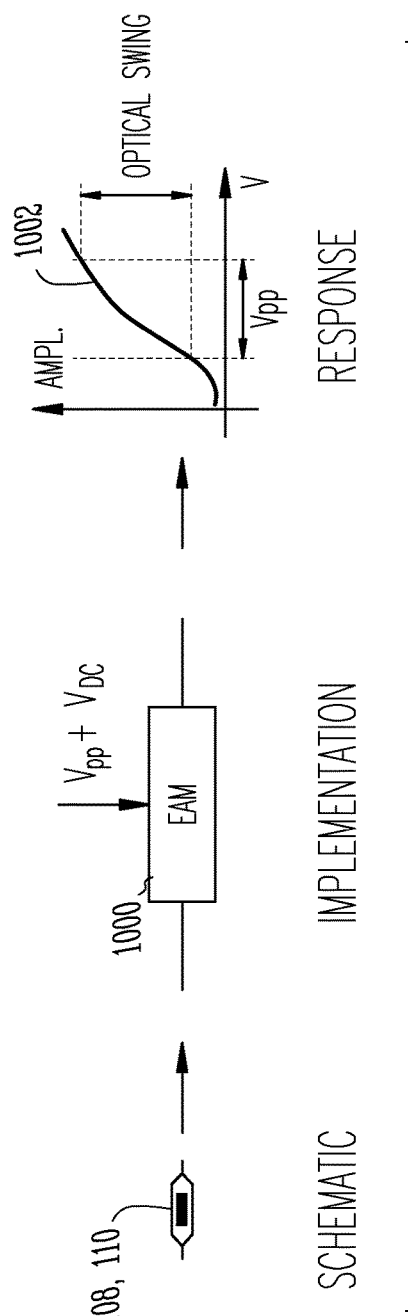
FIG. 10 illustrates the implementation of an optical amplitude modulator as an electro-absorption modulator (EAM), in accordance with various embodiments.

FIG. 10 illustrates the implementation of an optical amplitude modulator (e.g., 108, 110) as an EAM 1000, in accordance with various embodiments. In a silicon photonics platform, an EAM may be realized, e.g., in a Si—Ge structure. Alternatively, the EAM may also be implemented in III-V material, either in a pure III-V material platform or a hybrid silicon/III-V photonics platform. FIG. 10 shows, along with a symbolic amplitude modulator representation on the left, a schematic representation of an EAM 1000 along with its electro-optical response 1002 under a drive voltage.

Figure 11:
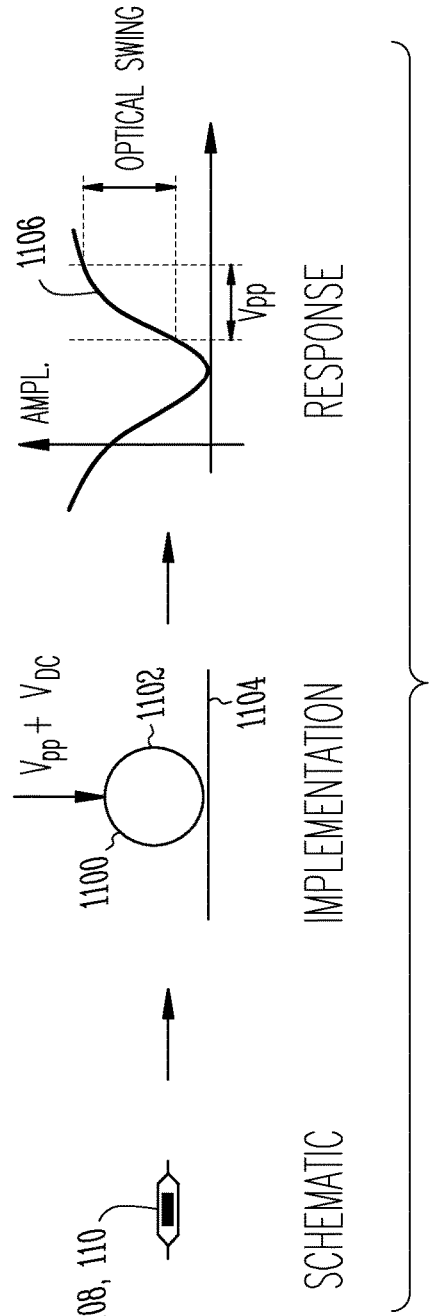
FIG. 11 illustrates the implementation of an optical amplitude modulator as an electro-optic ring modulator, in accordance with various embodiments.

FIG. 11 illustrates the implementation of an optical amplitude modulator (e.g., 108, 110) as an electro-optic ring modulator 1100, in accordance with various embodiments. The ring modulator 1100 is formed of an optical ring resonator 1102 coupled to a waveguide 1104. The refractive index of the ring resonator 1102 is controllable via an applied electrical drive voltage, which allows shifting the resonance of the ring. FIG. 11 also shows the electro-optical response 1106 of the ring modulator.

Both the EAM 1000 and the optical ring modulator 1102 are driven by a variable electrical drive voltage composed of a peak-to-peak swing voltage ($V_{pp}$) superposed onto a direct current (DC) bias voltage ($V_{DC}$). The bias voltage may be set such that, over the range of voltage values between the extrema of the swing voltage, the optical amplitude varies monotonically with the drive voltage.

Figure 12:
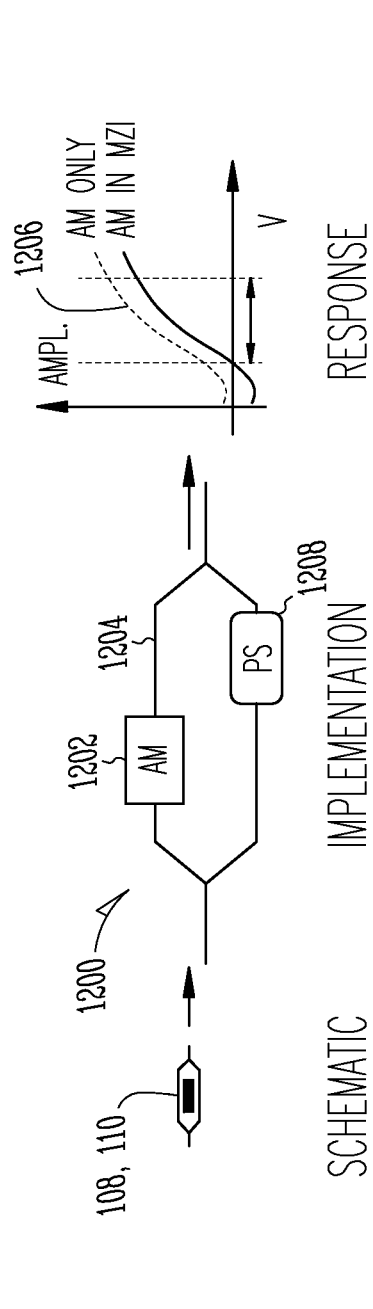
FIG. 12 illustrates the implementation of an optical amplitude modulator as a Mach-Zehnder modulator including an electronically controlled amplitude modulator device, in accordance with various embodiments.

FIG. 12 illustrates the implementation of an optical amplitude modulator as a Mach-Zehnder modulator 1200 including an electronically controlled amplitude modulator (AM) device 1202, in accordance with various embodiments. This configuration allows the optical amplitude swing to reach zero at one end of the swing voltage $V_{pp}$, which can be desirable in some applications. To achieve the complete extinction of the optical amplitude, the amplitude modulator device 1202, which may be, e.g., an EAM or optical ring modulator as described with reference to FIGS. 10 and 11, is placed into one interferometer arm of an MZI 1204. The optical electro-optical response 1206 of the Mach-Zehnder modulator depends on the coupling ratio of the split and combine couplers of the MZI 1204. Accordingly, by properly setting the coupling ratio of split and combine couplers of the MZI 1204, the output optical amplitude at the output of the MZI 1302 can be brought to zero at one end of the voltage swing, as illustrated. In some embodiments, a phase shifter (PS) 1208 is used in the MZI to properly control the phase.

Figure 13:
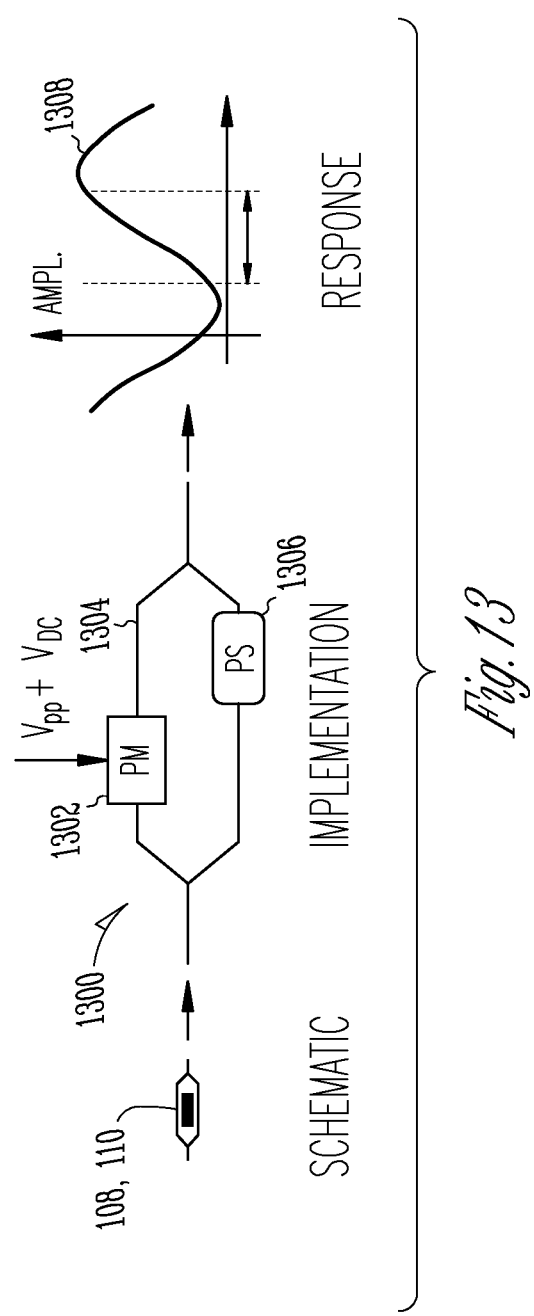
FIG. 13 illustrates the implementation of an optical amplitude modulator as a Mach-Zehnder modulator including an electronically controlled phase modulator device, in accordance with various embodiments.

FIG. 13 illustrates the implementation of an optical amplitude modulator as a Mach-Zehnder modulator 1300 including an electronically controlled phase modulator (PM) device 1302, in accordance with various embodiments. The phase modulator device 1302, which is included in one arm of an MZI 1304, may be any electronically controllable phase shifter (e.g., a thermo-optic or electro-optic phase shifter) The PM device 1302 is controlled by an electrical drive voltage $V=V_{pp}+V_{DC}$, which results in a voltage-dependent phase $\varphi_{PM}(V)$. In some embodiments, the MZI 1302 also includes an additional phase shifter (PS) 1306 to apply a static phase $\varphi_{PS}$. When the MZI couplers are ideal 3 dB couplers, the electro-optical response 1308 of the Mach-Zehnder modulator 1300 is:

$$E_{out} = \frac{1}{2}E_{in}\left(e^{j\varphi_{PS}} + e^{j\varphi_{PM}(V)}\right).$$

When the MZI couplers are not ideal 3 dB couplers, the above equation no longer holds, but a proportionality relationship remains:

$$E_{out} \partial E_{in}(e^{j\varphi_{PS}}+e^{j\varphi_{PM}(V)})$$

In some scenarios, one may set $$\varphi_{PS} = m\pi + \frac{\pi}{2},$$

where mi is an integer. This setting is generally known as the quadrature bias point. In some scenarios, one may set $\varphi_{PS}=2m\pi+\pi$, where m is an integer. This setting is generally known as the null bias point.

FIGS. 14A-14C illustrate various drivers 1400, 1402, 1404 as may be used with the electronically driven optical amplitude modulators 1000, 1100, 1200, 1300 of FIGS. 10-13, in accordance with various embodiments. Each driver 1400, 1402, 1404 may include a DAC 1406, or a DAC followed by an amplifier to further increase $V_{pp}$. FIG. 14A shows a single-end driver 1400, where one of the driver output ports is pinned to ground (G). FIG. 14B shows a differential driver 1402, where both output ports (S+ and S−) generate voltage swings, which are differential to each other. In some scenarios, as shown in FIG. 14C, an extra pin may be used to add DC bias to the modulator 1404.

FIG. 15 illustrates the implementation of an optical amplitude modulator as a Mach-Zehnder modulator 1500 with differentially driven optical AM devices 1502, in accordance with various embodiments. The differentially driven optical AM devices 1502 are placed in the two arms of an MZI 1504. Such a modulator is herein referred to as an AM-MZM, or if the optical AM device is an EAM, as an EAM-MZM. As shown, the AM-MZM 1500 may also include a phase shifter 1506 in the MZI 1504 to properly control the phase. The linearity of the electro-optical response 1508 of the AM-MZM may be better than that of the electro-optical response 1002 of an individual AM device 1000. The response 1508 for the AM-MZM can be expressed as:

$$E_{out} = \frac{1}{2}E_{in}\left(\alpha_t(V_t) + \alpha_b(V_b)e^{j\varphi_{PS}}\right),$$

where $\alpha_t$ and $\alpha_b$ are the amplitude responses in the top and bottom arm of the MZI 1504, respectively; $V_t$ and $V_b$ are the differential drive voltages $V_t=V_{S+}+V_{DC}$ and $V_b=V_{S-}+V_{DC}$ applied to the AM devices 1502; and $\varphi_{PS}$ is a static phase shift imparted by the phase shifter 1506. In one scenario, assuming, without loss of generality, that $V_{S+}$ and $V_{S-}$ are purely AC signals, $V_{S+}=-V_{S-}$, and setting $\varphi_{PS}=2m\pi+\pi$, where m is an integer, the optical amplitude at the AM-MZM becomes:

$$E_{out} = \frac{1}{2}E_{in}(\alpha_t(V_t) - \alpha_b(V_b)).$$

As can be seen from this equation, as well as from the electro-optical response curve 1508, the optical amplitude $E_{out}$ can become negative. The AM-MZM 1500 is, thus, suitable to realize signed multiplication. To elaborate: With EAMs used as the optical AM devices, one can assume that $\alpha_{MAX}=\alpha(0)$ and $\alpha_{MIN}=\alpha(V_{max})$. The optical modulation amplitude (OMA) of the EAM is $\Delta\alpha=\alpha_{MAX}-\alpha_{MIN}$. Accordingly, the amplitude range of the EAM-MZM is $[-\Delta\alpha, \Delta\alpha]$. This range, evidently, contains both positive and negative amplitudes. For a signed 8-bit number, one can map, for instance, −128 to −Δα and 127 to Δα.

Figure 15B:
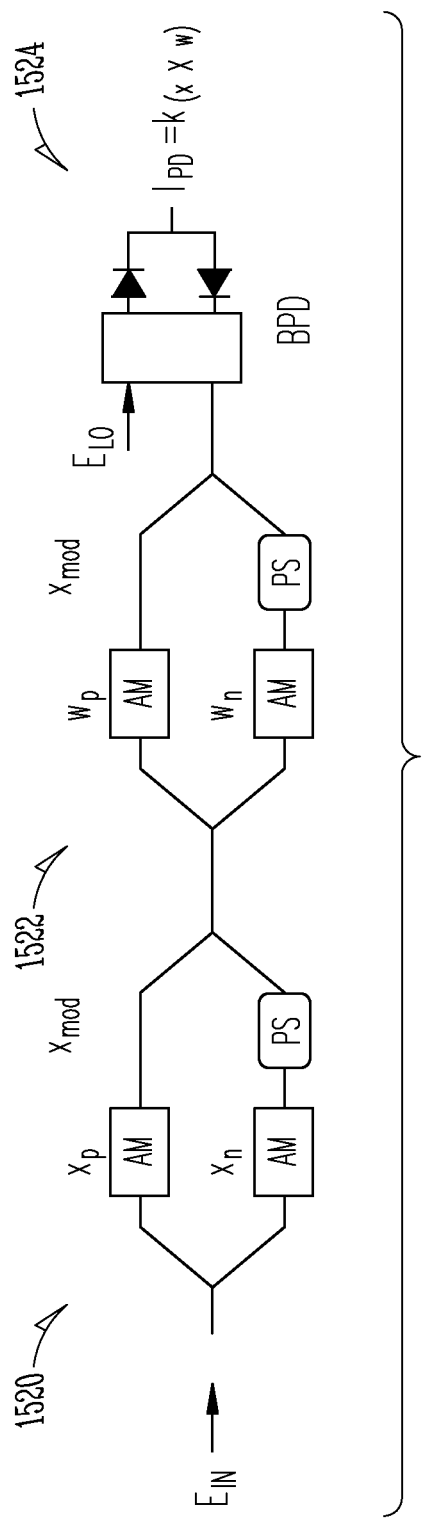
FIG. 15B depicts a cascade of two Mach-Zehnder modulators with differentially driven optical amplitude modulator devices, as may used to implement signed multiplication in accordance with various embodiments.

FIG. 15B depicts a cascade of two Mach-Zehnder modulators 1520, 1522 with differentially driven optical amplitude modulator devices, as may be used to implement signed multiplication in accordance with various embodiments. The first AM-MZM may impart a signed input x and the second AM-MZMs 1522 may impart a signed weight w, resulting at the output of the cascade in a signed product x w encoded onto the optical signal. To preserve the sign feature when converting the optical signal into an electronic signal, rather than measuring the light with a single photodetector, an optical receiver 1524 with balanced photodetectors, implementing a coherent detection scheme (as described below with reference to FIGS. 22A and 22B), may be used at the output of the second AM-MZM 1522. The output current of the receiver is proportional to the product of: x and w:

$$I_{PD}\partial(x_p-x_n)(w_p-w_n)$$

where subscripts p and n indicate a differential pair. The range of this operation is $Range(I_{PD})\partial[-\Delta\alpha^2,\Delta\alpha^2]$ if the modulators and DAC (driver) are identical in design.

Figure 16:
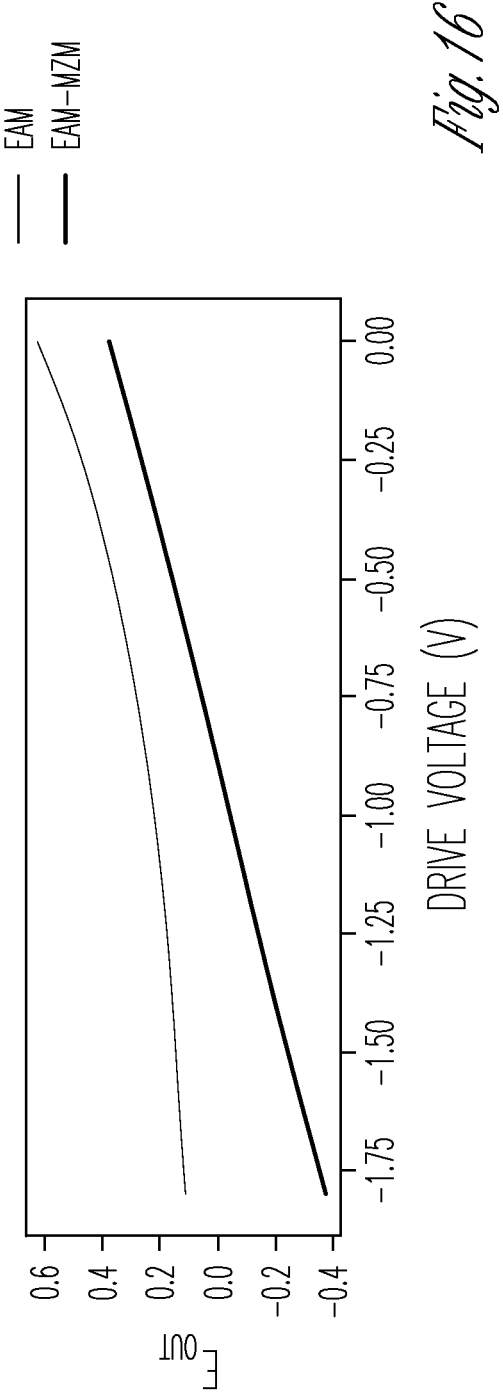
FIG. 16 shows example simulation result comparing the electro-optical responses of a Mach-Zehnder modulator with differentially driven optical amplitude modulator devices as shown in FIG. 15 and of a single-drive EAM as shown in FIG. 10.

FIG. 16 shows example simulation result comparing the electro-optical responses of an EAM-MZM 1500 with differentially driven optical AM devices 1502 and of a single-drive EAM 1000 as shown in FIG. 10. One can see that the optical field amplitude $E_{out}$ of the EAM-MZM 1500 is much more linear with drive voltage than the single-drive EAM 1000. A linear relationship between input voltage and output amplitude may be desirable for analog computation. A differential drive of two amplitude modulators helps to improve the output linearity of an MZM, compared to that of a single-drive amplitude modulator.

FIG. 17 illustrates the implementation of an optical amplitude modulator as a Mach-Zehnder modulator 1700 with differentially driven optical PM devices 1702, in accordance with various embodiments. Such a modulator 1700 is herein referred to as a PM-MZM. The PM-MZM 1700 includes the two PM devices 1702 in the two arms of an MZI 1704, and further includes a phase shifter 1706 in the MZI 1704. The electro-optical response 1708 of the PM-MZM can be expressed as:

$$E_{out} = \frac{1}{2}E_{in}\left(e^{(j\varphi_t(V_t))} + e^{(j\varphi_b(V_b))}e^{j\varphi_{PS}}\right),$$

where $\varphi_t$ and $\varphi_b$ are the phase responses in the top and bottom arm of the MZI 1704, respectively; $V_t$ and $V_b$ are the differential drive voltages $V_t=V_{S+}+V_{DC}$ and $V_b=V_{S-}+V_{DC}$ applied to the PM devices 1702; and $\varphi_{PS}$ is a static phase shift imparted by the phase shifter 1706. In some scenarios, one may set $$\varphi_{PS} = m\pi + \frac{\pi}{2},$$

where m is an integer. In some scenarios, one may set $\varphi_{PS}=2m\pi+\pi$, where m is an integer. The MZM structure helps to translate phase modulation into amplitude modulation. The differential drive on two PM devices 1702 in the MZM helps to improve the output linearity of the MZM, compared to that of a single-drive PM in an MZM.

FIGS. 18A and 18B illustrate various differential drive schemes as may be used with the Mach-Zehnder modulators 1500, 1700 of FIGS. 15 and 17, in accordance with various embodiments. FIG. 18A shows a driver in a fully differential scheme, while FIG. 18B shows the driver in a push-pull scheme. In some scenarios, a DC bias ($V_{DC}$) may be used.

Figure 19:
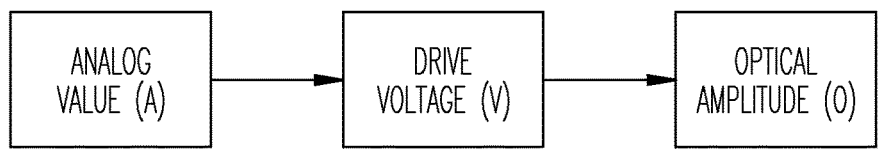
FIG. 19 conceptually illustrates the data flow, in an optical amplitude modulator in accordance with various embodiments, from an analog value to a drive voltage, and then from the drive voltage to the optical output amplitude.

FIG. 19 conceptually illustrates the data flow, in an optical amplitude modulator in accordance with various embodiments, from an analog value (A) to a drive voltage (V), and then from the drive voltage (V) to the optical output amplitude (O). The mapping relationship can be written as:

$$O(A)=h(V)=h(f(A)).$$

In some scenarios, it is desirable to have a linear mapping between O and A, O=kA+b, where k and b are constant coefficients. In some embodiments, the electro-optical response of the amplitude modulator is linear in drive voltage: $h(V)=k_2V+b_2$. In this case, a linear mapping between V and A, $V=f(A)=k_3A+b_3$, gives a linear mapping between O and A:

$$O(A)=k_2(k_3A+b_3)+b_2=k_2k_3A+(k_2b_3+b_2).$$

In some embodiments, the electro-optical response of the amplitude modulator is nonlinear in drive voltage. In this case, a liner mapping between O and A can be achieved with a driver, DAC, or DAC plus driver, that produces the inverse of the amplitude modulator's response. With $f(A)=h^{-1}(k'A+b')$, we have:

$$O(A)=h(V)=h(h^{-1}(k'A+b'))=k'A+b'.$$

Figure 20A:
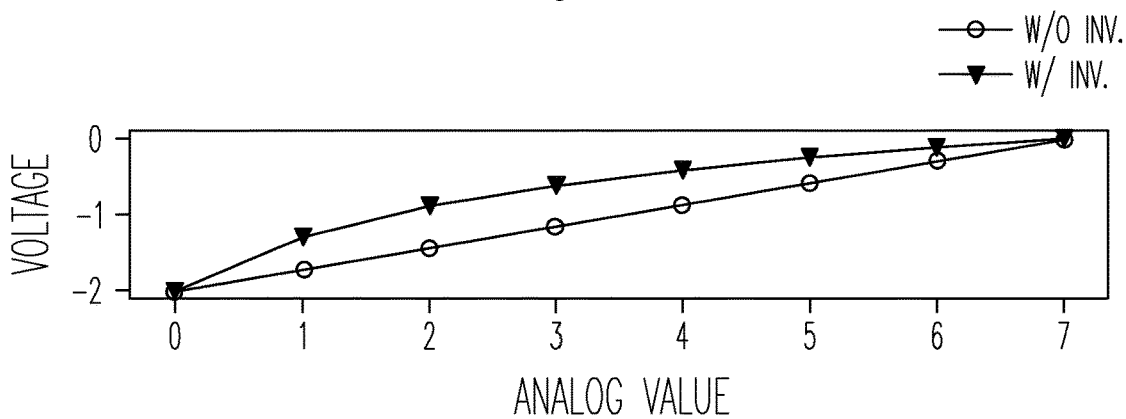
FIGS. 20A-20C show the transfer functions between analog value and drive voltage, between drive voltage and optical amplitude, and between analog value and optical amplitude, respectively, for the case where the mapping between analog value and drive voltage is the inverse of the transfer function between drive voltage and amplitude, and for comparison for the case of a linear mapping between analog value and drive voltage, in accordance with various embodiments.
Figure 20B:
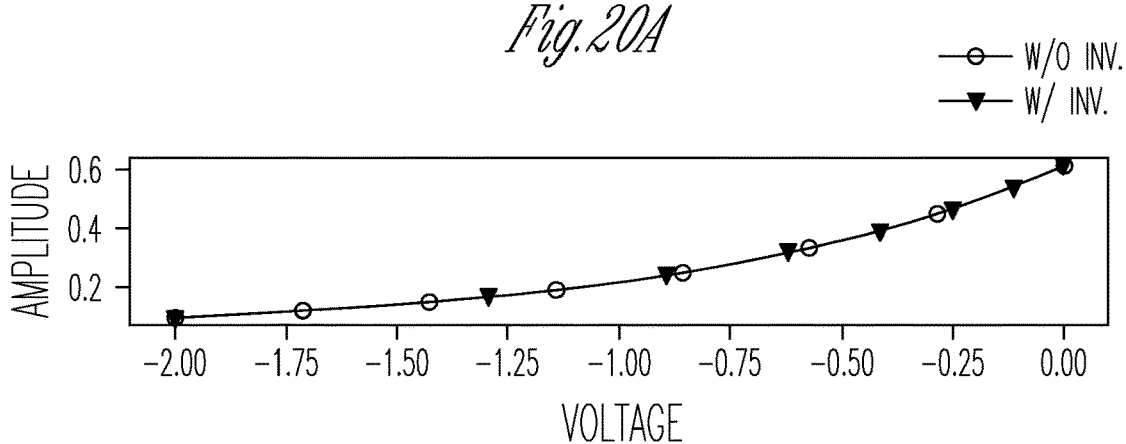
Figure 20C:
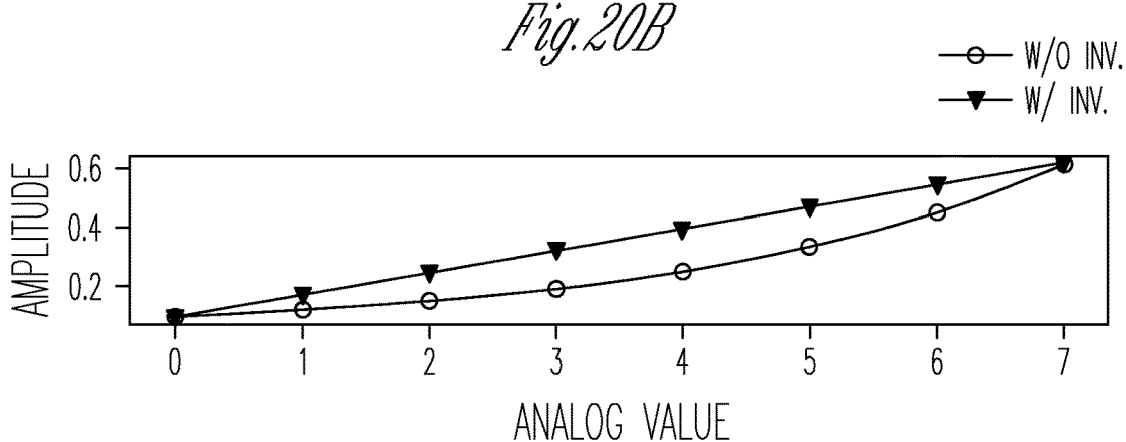

FIGS. 20A-20C show the transfer functions between analog value (A) and drive voltage (V), between drive voltage (V) and optical amplitude (O), and between analog value (A) and optical amplitude (O), respectively, for the case where the mapping between analog value (A) and drive voltage (V) is the inverse of the transfer function between drive voltage and amplitude (O) (solid lines in FIGS. 20A and 20C), and for comparison for the case of a linear mapping between analog value (A) and drive voltage (V)

(dashed lines in FIGS. 20A and 20C), in accordance with various embodiments. As can be seen, the nonlinear mapping between analog value (A) and optical amplitude (O) that results from a nonlinear electro-optical response of the amplitude modulator (FIG. 20B) becomes linear after the inverse transfer function has been implemented between analog value (A) and drive voltage (V).

Figure 21:
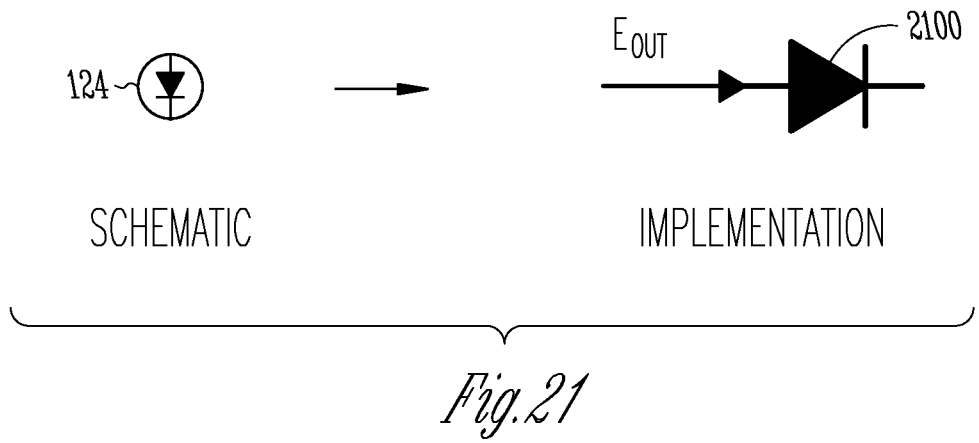
FIG. 21 illustrates the implementation of an optical receiver as a photodetector in a direct detection scheme, in accordance with various embodiments.

FIG. 21 illustrates the implementation of an optical receiver 124 as a photodetector 2100 in a direct detection scheme, in accordance with various embodiments. Denoting the responsivity of the photodetector 2100 with η A/W, the photodetector 2100 converts the optical signal into an electrical current according to:

$$I_{PD}=\eta P_{op}=\eta(E_{out}E_{out}^*)=\eta|E_{out}|^2,$$

$$I_{PD} = \eta\left|\sum_{i=0}^{N}w_{ji}x_i\right|^2.$$

In this embodiment, the detected photocurrent $I_{PD}$ is proportional to the intensity of the optical signal, i.e., the square of the optical amplitude, $|E_{out}|^2$.

Figure 22A:
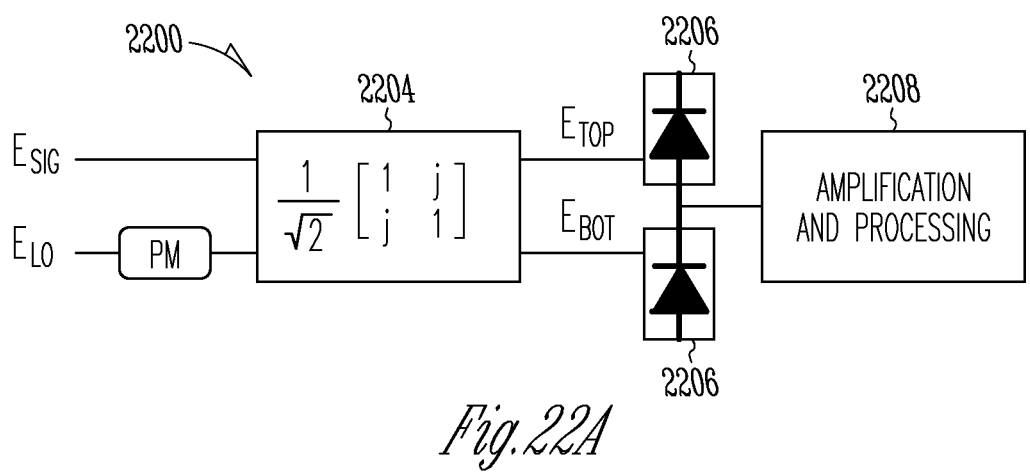
FIGS. 22A and 22B illustrate the implementation of coherent optical receivers, in accordance with various embodiments.
Figure 22B:
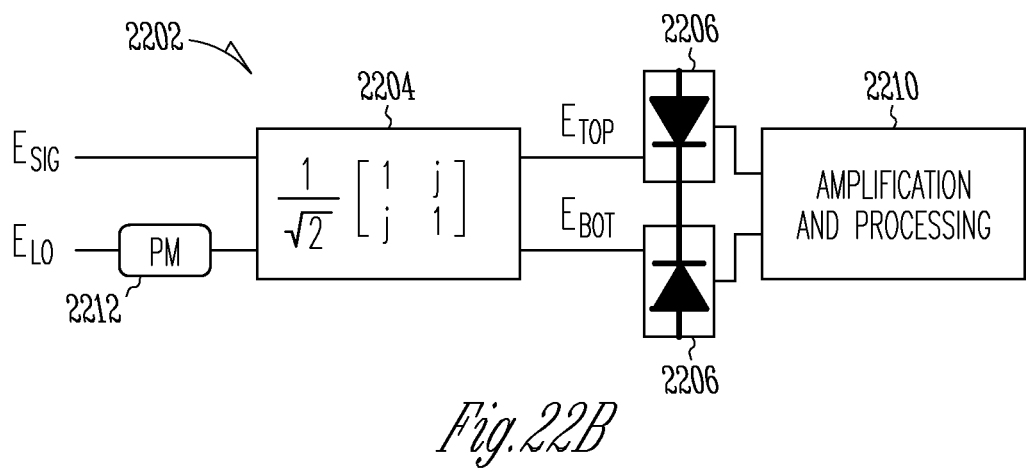

FIGS. 22A and 22B illustrate the implementation of coherent optical receivers 2200, 2202, in accordance with various embodiments. In coherent detection schemes, the optical output signal ($E_{sig}$, which corresponds to $E_{out}$) is mixed with a local oscillator signal ($E_{LO}$). In some embodiments, the optical output signal $E_{sig}$ and local-oscillator signal $E_{LO}$ come from the same laser; such a detection scheme is called homodyne detection. In other embodiments, the optical output signal $E_{sig}$ and local-oscillator signal $E_{LO}$ come from two different lasers; such a detection scheme is called heterodyne detection. To generate the mixed optical signals, an optical mixer 2204 is used in each of the coherent optical receivers 2200, 2202. In some embodiments, a phase modulator 2212 may be used before the 2×2 optical mixer 2204.

The transfer function of a 2×2 optical mixer 2204 is:

$$\frac{1}{\sqrt{2}}\begin{bmatrix}1 & j \\ j & 1\end{bmatrix}.$$

The mixed optical signals at the top and bottom outputs of the mixer 2204 are:

$$E_{top} = \frac{j}{\sqrt{2}}(E_{LO} - jE_{sig}), \text{ and}$$

$$E_{bot} = \frac{1}{\sqrt{2}}(E_{LO} + jE_{sig}).$$

The mixed optical signals are measured by two respective photodetectors 2206, resulting in the following photocurrents for the top and bottom branches:

$$I_{PD,top} = \eta E_{top}E_{top}^* = \frac{\eta}{2}\left(E_{LO}^2 + E_{sig}^2 + T_1\right),$$

and $$I_{PD,bot} = \eta E_{bot}E_{bot}^* = \frac{\eta}{2}(E_{LO}^2 + E_{sig}^2 - T_1),$$

where $$T_1 = jE_{LO}E_{sig}^* + (jE_{LO})^* E_{sig} = 2Re(jE_{LO}E_{sig}^*).$$

The difference between the top and bottom photocurrents is:

$$I_{PD,top} - I_{PD,bot} = 2\eta \; Re(jE_{LO}E_{sig}^*).$$

As can be seen, the detected difference photocurrent is proportional to $E_{sig}$, which is $E_{out}$. The photodetectors 2206 may be followed by an amplification stage 2208, 2210, for example, by a transimpedance amplifier (TIA). In the coherent optical receiver 2200 shown in FIG. 2A, the difference between the top and bottom photocurrents is realized in the photodetector pair before amplification. In the coherent optical receiver 2202 shown in FIG. 2B, the photocurrent difference between the two photodetectors 2206 is realized in the amplification stage, e.g., by a differential TIA 2210. Compared to direct detection, coherent detection offers better sensitivity so that the receiver system as a whole may operate at lower input power.

Photonic Computation Method

Figure 23:
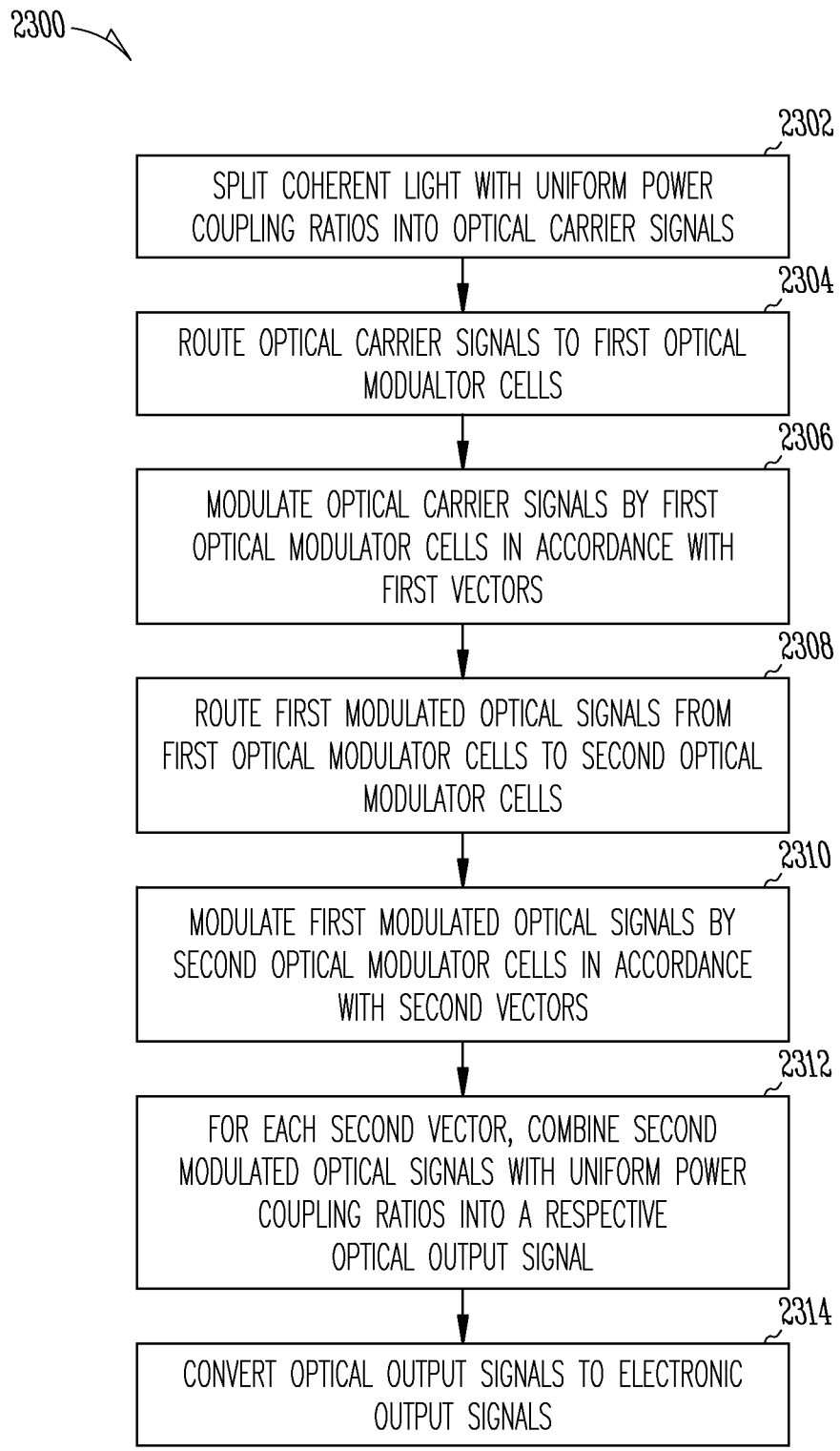
FIG. 23 is a flow chart of an example method for optically performing scalar vector and matrix multiplications, in accordance with various embodiments.

FIG. 23 is a flow chart of an example method 2300 for optically performing scalar vector and matrix multiplications, in accordance with various embodiments. In this method 2300, coherent light is split evenly, with uniform power coupling ratios, into a plurality of optical carrier signals of uniform optical power (2302), which are then routed to a plurality of first optical modulator cells (2304). In some embodiments, the optical paths from the optical input to the plurality of first optical modulator cells are geometrically delay-matched. Each first optical modulator cell is associated with a corresponding component of one or more first vectors (e.g., using WDM schemes to impart vector components of multiple first vectors), and used to modulate the corresponding optical carrier signal in accordance with that vector component (2306). The resulting first modulated optical signals are then routed from the first optical modulator cells to corresponding second optical modulators cells, in some embodiments along second geometrically delay-matched optical paths (2308). The second optical modulator cells include one or more sets of second optical modular cells associated with one more respective second vectors (multiple second vectors collectively forming a matrix), and the second optical modulator cells within each set are used to modulate the first modulated optical signals in accordance with corresponding components of the associated second vector (2310) to generate second modulated optical signals. In the case of multiple second vectors, the first modulated optical signals, as they are being routed from the first to the second optical modulator cells, are evenly split between the different sets of second optical modulators associated with the respective second vectors. For each of the one or more second vectors, the associated second modulated (or twice modulated) optical signals are combined evenly, with uniform power coupling ratios, across all vector components of the second vector into an associated optical output signal (2312). The one or more optical output signals are then converted, by optical receivers, into electronic output signals each representative of a scalar product between a first vector and one of the second vectors (2314). In some embodiments, the paths from the outputs of the second optical modulator cells to the optical receivers are all geometrically delay-matched.

Photonic-Electronic Computing System

To form a functioning computing system, the photonic circuits described above are used in conjunction with electronic circuitry that provides the control signals for drivers associated with, e.g., optical amplitude modulators and phase shifters of the optical modulator cells, and that processes the optical receiver (e.g., photodetector) outputs. For example, the disclosed photonic circuits may be used to implement artificial neural networks, the neuron weights in each network layer being implemented by the second optical modulator cells, which take the first modulated optical signals as the neuron inputs. The optical receiver outputs, which correspond to the neuron outputs of the neural network layer, may be processed to compute the neuron inputs for the next layer in the neural network. In some embodiments, such next layer is implemented as a separate photonic circuit. In other embodiments, multiple layers of the neural network are implemented successively in multiple computational cycles using a single photonic circuit by applying, during each cycle, the neuron inputs and neuron weights of the respective network layer, as may be stored in memory of the electronic circuitry, to the optical amplitude modulators and phase shifters. The electronic circuitry may also provide neural network functions (e.g., implementing non-linear activation layers, pooling layers, etc.) and perform pre-processing and post-processing operations on the input to and output generated by the neural network. In general, the electronic circuitry may be analog circuitry, or mixed-signal (analog-digital) circuitry including ADCs and DACs to convert between the analog and digital domains. One benefit of digital circuitry is its ability to support mixed-precision operations.

Figure 24A:
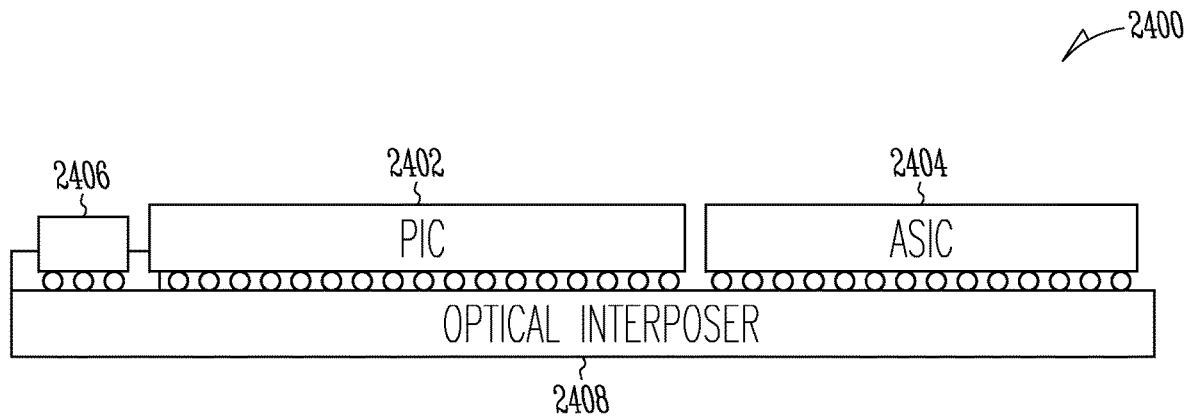
FIGS. 24A and 24B are schematic side and top views, respectively, illustrating an example hybrid photonic-electronic computing system in accordance with various embodiments.
Figure 24B:
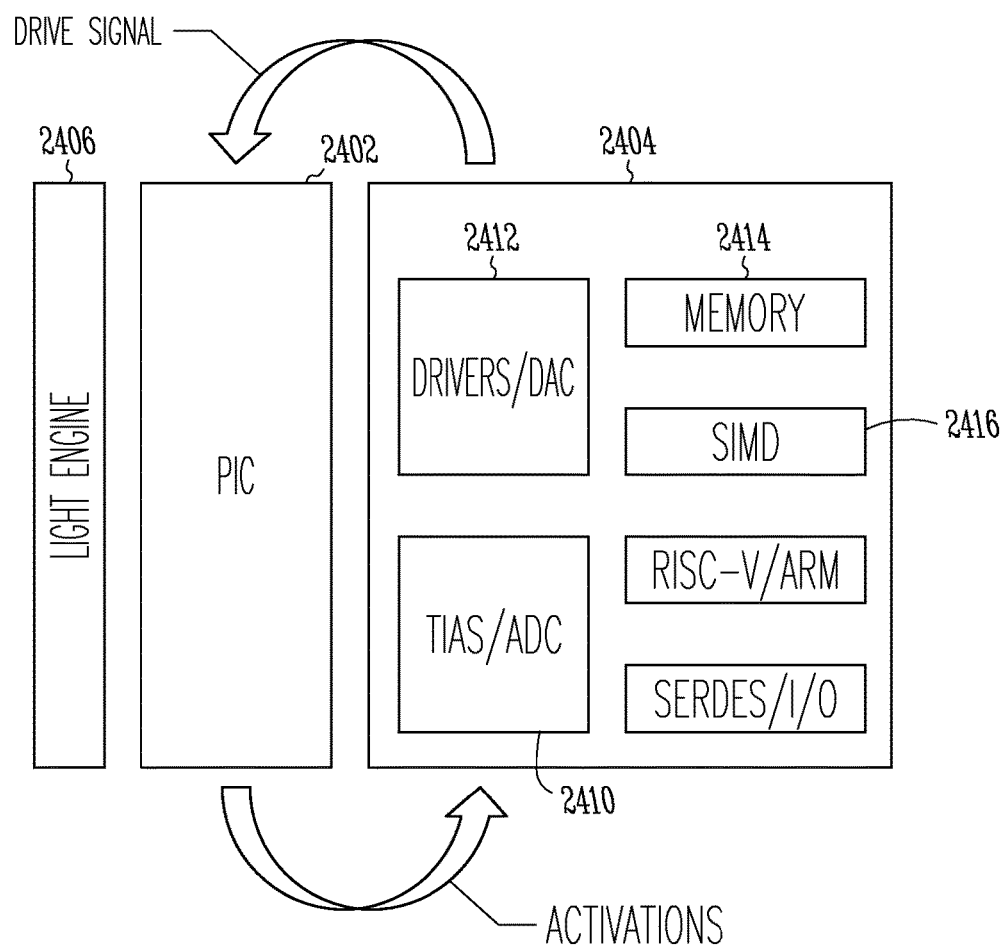

FIGS. 24A and 24B are schematic side and top views, respectively, illustrating an example hybrid photonic-electronic computing system 2400 in accordance with various embodiments. As shown in FIG. 24A, the system 2400 includes a photonic integrated circuit (PIC) 2402, e.g., implemented in silicon, that includes one or more of the above-described photonic circuits (e.g., 300, 400, 401, 500, 600, 601, 700, 702, 704, 800, 900) for performing vector and matrix multiplications (e.g., implementing linear neural network layers), and an electronic integrated circuit (EIC) 2404 that interfaces with and complements the function of the PIC 2402. The EIC 2404 may include analog and/or digital circuitry, and may be hardwired and application-specific (e.g., an application-specific integrated circuit (ASIC)) or programmable (e.g., a field-programmable gate array FPGA). The system 2400 may further include a light engine 2406 with one or more lasers, such as, without limitation, distributed feedback (DFB) lasers or other laser diodes implemented, e.g., in III-V compound semiconductor materials, to generate coherent carrier light. Multiple lasers emitting at the same wavelength may be used to generate light for multiple photonic circuits at one or more wavelengths. Alternatively or additionally, the light engine 06 may include multiple lasers emitting at different wavelengths, as well as a wavelength multiplexer, e.g., implemented as an arrayed waveguide grating, to combine the different wavelengths into a single, multiplexed optical carrier signal.

The PIC 2402, EIC 2404, and light engine 2406 may interface with each other via an optical interposer 2408, which integrates them into a chip-scale package. The interposer 2408 may, for instance, include electrical connections between the photodetectors on the PIC 2402 and the associated processing circuitry in the EIC 2404, where the analog electronic output signals of the photodetectors are processed, as well as between the modulators (that is, amplitude modulators and phase shifters) in the PIC 2402 and the associated driver circuitry in the EIC 2404. Additionally, the interposer 2408 may include electrical connections between the EIC 2404 and the light engine 2406, e.g., to allow the EIC 2404 to control and monitor operation of the light engine 2406. The power consumption of the electronic interface between the PIC 2402 and the EIC 2404 is, in some embodiments, less than 3 pJ (picojoules) per bit of data converted between the optical domain and the digital electronic domain.

The interposer 2408 may further facilitate optical communication between the light engine 2406 and the PIC 2402 via waveguiding structures in the interposer 2408 that couple the (e.g., multiplexed) laser outputs into waveguides (e.g., a carrier-light waveguide leading up to the optical splitter of a photonic crossbar) in the PIC 2406. Coupling may be achieved, e.g., using an edge coupler, an inverted taper coupler, or a grating coupler in the PIC 2402 and/or interposer 2408. In the depicted embodiment, the PIC 2402 and EIC 2404 are flip-chip-bonded to the optical interposer 2408 next to each other. It is, however, also possible to bond the EIC 2404 directly to the PIC, which can provide the benefit of significantly reduced electrical connections from the EIC 2404 to the electro-optic devices within the PIC 2402.

FIG. 24B provides, in a schematic block-style top view, more detail about the components of the EIC 2404 in accordance with an example embodiment. The depicted EIC 2404 is a mixed-signal circuit, including ADCs and DACs to convert electronic signals between the analog and digital domains. The ADCs are provided at the outputs of TIAs that amplify the electronic output signal received from the photodetectors of the PIC 1402. In neural-network application, the electronic output signals constitute the activations generated by the linear network layer; TIAs and ADCs are collectively labeled 2410. The DACs are provided at the inputs of drivers that provide the drive signals for the optical modulators of the PIC 2402; drivers and DACs are collectively labeled 2412.

In various neural-network applications, drive signals are applied at least to the first optical modulator cells in the photonic circuit to provide the neuron inputs in electronic form to the optical linear neural network layer. The drivers of the input signals may operate at high frequency, e.g., at 50 GHz to apply a new neuron input to a given modulator every 20 ps. In some embodiments, drive signals are further applied to the second optical modulator cells, which impart the neuron weights, typically at a much lower rate or quasi-statically. The weights may be updated once a large number of different sets of inputs have been processed, e.g., every one hundred clock cycles of the input for an interference application, to implement another neural network layer. In this manner, a single photonic circuit (e.g., a single crossbar) can sequentially implement multiple neural network layers. For instance, the neuron outputs of one layer, as encoded in the optical output signals of the photonic circuit, may be processed, after conversion into the electronic domain, to compute neuron inputs for the next layer, which are then fed back into the same photonic circuit, now operated based on a new set of neuron weights. Alternatively, the processed neuron outputs from one photonic circuit may be provided as neuron inputs to another physical photonic circuit implemented on the PIC 2402. Optionally, the processed outputs of the second photonic circuit, or of any additional photonic circuit, may eventually be fed back into the first photonic circuit. It is also possible for a photonic circuit to implement a recurrent neural network layer, in which case the applied neuron weights remain the same as the neuron output of the recurrent layer is fed back into the layer as input.

With renewed reference to FIG. 24B, the EIC 2404 may further include on-chip memory 2414, e.g., static random access memory (SRAM) or other embedded non-volatile memory, such as magnetoresistive RAM (MRAM), resistive RAM (ReRAM), NOR flash memory, phase-change memory (PCM), etc. The memory 2414 may store, for example, the weights to be applied to the modulators in the weighting cells, and/or intermediate data, such as (neuron) inputs to a computational (neural network) layer as computed from the outputs of the preceding layer. Weights may, alternatively, be stored directly in the PIC 2402, e.g., using O-PCM.

The EIC 2404 may be configured to perform various operations that cannot, or not as efficiently, be implemented in the photonic circuit, including, in particular, non-multiply-accumulate (non-MAC) operations. The EIC 2404 may, for example, apply an analog or digital non-linear activation function to the optically generated linear neuron outputs, although certain activation functions can also be implemented all-optically in the PIC 2402. As another example, the EIC 2404 may include a single instruction, multiple data (SIMD) processor 2416 that can efficiently perform pooling operations, e.g., in between photonically implemented convolutional layers of a neural network. In some embodiments, it is also beneficial to implement a fully-connected neural network layer electronically in the EIC 2404. For example, in a photonic-electronic neuromorphic computing system 2400 configured for image-recognition applications using a RESNET50 model, the PIC 2402 may implement the convolutional neural network layers, whereas the EIC 2404 may handle the pooling layers and fully-connected layers of the model at higher bit precision than would be achievable with the PIC 2402.

Apart from certain neural network operations, the EIC 2404 may also perform pre- and post-processing of the neural network (or other computational) model and or its input and output. In some embodiments, a neural network model (or other model represented by a matrix) is rendered sparse by converting inessential network parameters (or matrix elements) to zero, without compromising accuracy. In addition, sparse input data may be pre-processed for more efficient storage in the on-chip memory 2414. Image input data may be pre-processed to suppress undesired distortions or enhance relevant features, e.g., using Gaussian, wavelet, average, or median filters, fuzzy histogram hyperbolization, bias correction, or any of a variety of other techniques known in the field of image processing to generate better input features to the neural network. In some embodiments, the EIC 2404 includes a graphic processing unit (GPU) for performing certain (e.g., image-processing) operations. Processing digital signals, beneficially, supports mixed-precision computations and can achieve higher bit precision (e.g., any combination of FP64, FP32, FP16, bfloat16, INT8, INT8 sparse, and INT4 operations) than photonic operations. In various embodiments, the PIC 2402 can perform 4-bit or 8-bit operations (or mixed-precision operations combining 4-bit and 8-bit precision).

In various embodiments, the computing system 2400 implements a trained neural network model with pre-computed neuron weights (e.g., as stored in the on-chip memory 2414 or in O-PCM directly in the PIC 2402) for a particular inference application. The machine-learning algorithm (e.g., backpropagation of errors with gradient descent) to determine the neuron weights may be implemented and executed, for example, using conventional computing hardware (e.g., a general-purpose processor or GPU). Alternatively, the neural network model may be trained in situ using the neuromorphic computing system 2400, e.g., with neuron inputs processed optically by the PIC 2402 in the forward propagation phase, and adjustments to the weights based on the neuron outputs being computed electronically, either directly by the EIC 2404 (which, for this purpose, would be configured to implement the back-propagation phase of the algorithm) or by an additional computing device in communication with the EIC 2404.

The computing system 2400 may, of course, be used in many applications other than neural-network implementations. Further, the described computing system 2400 is only one nonlimiting way of integrating photonic circuits as described herein with electronic circuitry, and other integration approaches may occur to those of ordinary skill in the art.

The following numbered examples provide illustrative embodiments.

Example 1 is a photonic circuit comprising: a front-end optical splitter configured to split carrier light with uniform power coupling ratios into a plurality of optical carrier signals; a plurality of first optical modulator cells configured to modulate the plurality of optical carrier signals in accordance with components of a first vector to generate a plurality of first modulated optical signals; multiple sets of second optical modulator cells, each set associated with a corresponding one of multiple second vectors and comprising a plurality of second optical modulator cells configured to modulate the plurality of first modulated optical signals in accordance with components of that second vector to generate a plurality of second modulated optical signals associated with that second vector; a plurality of waveguide structures each configured to route a corresponding one of the plurality of first modulated optical signals to corresponding second optical modulator cells of the multiple sets of second optical modulator cells; and multiple back-end optical combiners each associated with a corresponding one of the multiple second vectors and the associated set of second optical modulator cells and configured to coherently combine the plurality of second modulated optical signals associated with that second vector with uniform power coupling ratios into an optical output signal that represents a scalar product between the first vector and the second vector.

Example 2 is the photonic circuit of example 1, wherein the front-end splitter comprises a symmetric cascade of 3 dB couplers.

Example 3 the photonic circuit of example 1 or example 2, wherein the multiple back-end optical combiners each comprise a symmetric cascade of 3 dB couplers.

Example 4 is the photonic circuit of any of examples 1-3, wherein the multiple back-end optical combiners and the plurality of waveguide structures configured to route the first modulated optical signals to the second optical modulator cells form waveguide crossings, the photonic circuit further comprising dummy waveguide crossings in the back-end optical combiners, wherein for each of the sets of second optical modulator cells, the waveguide crossings and the dummy waveguide crossings are balanced in sum across all paths from the plurality of second optical modulator cells of the set to an output of the associated back-end optical combiner.

Example 5 is the photonic circuit of example 4, further comprising dummy waveguide crossings in the waveguide structures configured to route the first modulated optical signals to the second optical modulator cells, wherein the waveguide crossings and the dummy waveguide crossings are further balanced in sum across all back-end optical combiners.

Example 6 is the photonic circuit of example 4 or example 5, wherein the dummy waveguide crossings are spatially clustered.

Example 7 is the photonic circuit of any of examples 1-6, wherein each of the plurality of waveguide structures comprises, arranged along a waveguide, a series of optical couplers that sequentially couple power fractions of the corresponding first modulated optical signal to the corresponding second optical modulator cells of the multiple sets of second optical modulator cells.

Example 8 is the photonic circuit of example 7, wherein power coupling ratios of the series of optical couplers are configured to balance optical input power across all sets of second optical modulator cells.

Example 9 is the photonic circuit of example 7 or example 8, wherein the second optical modulator cells of the plurality of sets are arranged in a rectangular array of rows and columns, the waveguides of the waveguide structures configured to route the first modulated optical signals to the second optical modulator cells being arranged along the rows, and the second optical modulator cells of each set being arranged along a corresponding one of the columns.

Example 10 is the photonic circuit of example 9, wherein the multiple back-end optical combiners are each configured to coherently combine the plurality of second modulated optical signals at a bottom of the corresponding column, following all waveguide crossings of the back-end optical combiners with the waveguide structures configured to route the first modulated optical signals.

Example 11 is the photonic circuit of example 9, wherein the multiple back-end optical combiners are each configured to combine pairs of the second modulated optical signals in between the corresponding waveguides of the waveguide structures configured to route the first modulated optical signals, preceding waveguide crossings of the back-end optical combiner with the waveguide structures.

Example 12 is the photonic circuit of any of examples 1-11, wherein the second optical modulator cells comprise optical amplitude modulators collectively configurable to implement any positive real-valued matrix.

Example 13 is the photonic circuit of any of example 12, wherein the second optical modulator cells further comprise optical phase modulators collectively configurable, in conjunction with the optical amplitude modulators, to implement any real-valued or complex-valued matrix.

Example 14 is the photonic circuit of any of examples 1-13, wherein total active insertion losses at outputs of the multiple back-end optical combiners scale linearly with a size of the first and second vectors.

Example 15 is the photonic circuit of any of examples 1-14, further comprising, at outputs of the multiple back-end optical combiners, optical amplifiers or attenuators collectively configurable to restore a fidelity of the photonic circuits to 100%.

Example 16 is the photonic circuit of any of examples 1-15, further comprising, at outputs of the multiple back-end optical combiners, multiple respective optical receivers configured to convert the optical output signals into respective electronic output signals.

Example 17 is the photonic circuit of example 16, wherein: the first optical modulator cells are wavelength-division-multiplexed optical modulator cells configured to modulate light at multiple wavelengths in accordance with multiple first vectors; and the multiple receivers are wavelength-division-multiplexed receivers each configured to generate multiple electronic output signals, the multiple electronic output signals representative of scalar products of the multiple first vectors with the second vector associated with the receiver.

Example 18 is the photonic circuit of example 17, wherein: the wavelength-division-multiplexed first optical modulator cells each comprise multiple first modulators corresponding to the multiple first vectors, bracketed between a demultiplexer and a multiplexer; and the wavelength-division-multiplexed receivers each comprise a demultiplexer followed by multiple receivers to measure electronic output signals representing respective products with the multiple first vectors.

Example 19 is the photonic circuit of any of examples 1-3 or 12-18, further comprising, at outputs of the multiple back-end optical combiners, multiple respective optical receivers configured to convert the optical output signals into respective electronic output signals, wherein: the front-end optical splitter is configured to route the plurality of optical carrier signals from an optical input to the first optical modulator cells along first geometrically delay-matched optical paths; the plurality of waveguide structures are configured to route the first modulated optical signals from the first optical modulator cells to the second optical modulator cells along second geometrically delay-matched optical paths; and the multiple back-end optical combiners are configured to route the second modulated optical signals to the receivers along third geometrically delay-matched optical paths.

Example 20 is the photonic circuit of example 19, wherein the plurality of waveguide structures are configured as symmetric optical waveguide trees with couplers of uniform power coupling ratios at their junctions.

Example 21 is the photonic circuit of example 20, wherein: the first optical modulator cells are arranged linearly along a first dimension; and the second optical modulators cells of all sets of second optical modulators cells are arranged linearly along the first dimension, parallel to the first optical modulator cells, ordered based on their associated first modulated optical signals to form spatial groupings each associated with one of the first modulated optical signals.

Example 22 is the photonic circuit of example 21, wherein: the multiple optical receivers are arranged linearly along the first dimension, parallel to the first optical modulator cells and the second optical modulator cells of all sets of second optical modulator cells; and the second optical modulator cells within each grouping are arranged in a same order as the multiple optical receivers with which they are associated, such that each of the back-end optical combiners combines light from second optical modulator cells at positions within each of the groupings that correspond to a position of the associated optical receiver within the linearly arranged multiple optical receivers.

Example 23 is the photonic circuit of example 21, wherein: the multiple optical receivers are arranged linearly along a second dimension that is perpendicular to the first dimension; and the second optical modulator cells within each of a first half of the groupings along the first dimension are arranged in a same order as the multiple optical receivers with which they are associated and the second optical modulator cells within each of a second half of the groupings along the first dimension are arranged in a reverse order to the multiple optical receivers with which they are associated, such that each of the multiple back-end optical combiners combines light from second optical modulator cells at positions within the groupings that mirror each other between the first half and the second half.

Example 24 is the photonic circuit of example 21, wherein: the multiple optical receivers are arranged linearly along a second dimension that is perpendicular to the first dimension; and the second optical modulator cells are arranged within the groupings alternatingly in a same order as or in a reverse order to the multiple optical receivers with which they are associated, such that each of the multiple back-end optical combiners combines light from second optical modulator cells at positions within the groupings that mirror each other between adjacent groupings along the first dimension.

Example 25 is the photonic circuit of example 20, wherein: the first optical modulator cells are arranged linearly along a first dimension; the second optical modulator cells within each of the sets are arranged linearly along the first dimension, parallel to the first optical modulator cells; and the sets of second optical modulator cells are arranged linearly along a second dimension that is perpendicular to the first dimension.

Example 26 is the photonic circuit of any of examples 1-25, further comprising, at outputs of the multiple back-end optical combiners, multiple respective optical receivers configured to convert the optical output signals into respective electronic output signals, wherein the optical receivers each comprise a photodetector.

Example 27 is the photonic circuit of any of examples 1-25, further comprising, at outputs of the multiple back-end optical combiners, multiple respective optical receivers configured to convert the optical output signals into respective electronic output signals, wherein the optical receivers comprise one or more coherent receivers each including an optical mixer configured to mix the respective optical output signal with a local oscillator signal, a pair of photodetectors to measure intensities of optical outputs of the optical mixer, and an optical amplifier to combine electronic outputs of the pair of photodetectors.

Example 28 is the photonic circuit of any of examples 1-27, wherein each of the back-end optical combiners comprises a cascade of 3 dB couplers formed at junctions of an inverse optical waveguide tree, and preceding each of the junctions, a phase shifter in each waveguide of a pair of waveguides combined at the junction.

Example 29 is the photonic circuit of example 28, wherein, in each pair of waveguides combined at one of the junctions, the phase shifter in one of the waveguides is controlled and the phase shifter in the other one of the waveguides is a dummy phase shifter.

Example 30 is the photonic circuit of any of examples 1-29, wherein the first and second optical modulator cells each comprise an optical amplitude modulator.

Example 31 is the photonic circuit of example 30, wherein the optical amplitude modulators comprise electronically driven optical devices whose output optical amplitude depends monotonically on a voltage value of a variable drive-signal voltage over a range of voltage values.

Example 32 is the photonic circuit of example 31, wherein the electronically driven optical devices comprise at least one of electro-absorption modulators or electro-optic ring modulators.

Example 33 is the photonic circuit of example 31 or example 32, wherein at least one of the optical amplitude modulators further comprises a Mach-Zehnder interferometer including one of the electronically driven optical devices in one of its interferometer arms, wherein coupling ratios of split and combine couplers of the Mach-Zehnder interferometer are configured such that an optical amplitude at an output of the Mach-Zehnder interferometer is zero at one end of the range of voltage values of the drive-signal voltage.

Example 34 is the photonic circuit of example 31, wherein at least one of the optical amplitude modulators further comprises a Mach-Zehnder interferometer including in its two interferometer arms two respective devices of the electronically driven optical devices, wherein the two optical devices are driven differentially.

Example 35 is the photonic circuit of example 30, wherein at least one of the optical amplitude modulators comprises a Mach-Zehnder interferometer including an electronically driven optical phase shifter in one of its interferometer arms, wherein over a range of voltage values of a variable drive-signal voltage applied to the optical phase shifter, an optical amplitude at an output of the Mach-Zehnder interferometer depends monotonically on a voltage value of the variable drive-signal voltage.

Example 36 is the photonic circuit of example 30, wherein at least one of the optical amplitude modulators comprises a Mach-Zehnder interferometer including in its two interferometer arms two respective electronically driven optical phase shifters, wherein the two optical phase shifters are driven differentially, and wherein over a range of voltage values of a variable differential drive-signal voltage applied to the optical phase shifters, an optical amplitude at an output of the Mach-Zehnder interferometer depends monotonically on a voltage value of the variable differential drive-signal voltage.

Example 37 is the photonic circuit of example 30, wherein the optical amplitude modulators are electronically driven by a drive signal voltage created from an analog input, and
wherein a transfer function mapping the analog input to the drive signal voltage is configured based on a transfer function from the drive signal voltage to an output optical amplitude of the optical amplitude modulator such that an overall transfer function from the analog input to the output optical amplitude is substantially linear.

Example 38 is a method comprising: receiving coherent light at an optical input; splitting the coherent light with uniform power coupling ratios into a plurality of optical carrier signals; routing the optical carrier signals to a plurality of first optical modulator cells; using the first optical modulator cells to modulate the optical carrier signals in accordance with components of a first vector to generate a plurality of first modulated optical signals; splitting each of the first modulated optical signals with uniform power coupling ratios between multiple sets of second optical modulator cells associated with multiple respective second vectors; routing each of the first modulated optical signals to second optical modulator cells, within the multiple sets, that are associated with components of the second vectors corresponding to the component of the first vector associated with the first modulated optical signal; using the second optical modulator cells of each set to modulate the first modulated optical signals in accordance with corresponding components of the second vector associated with the set to generate second modulated optical signals; coherently combining the second modulated optical signals associated with each of the second vectors with equal power coupling ratios into an optical output signal associated with the second vector and routing; and converting the optical output signals associated with the multiple second vectors into respective electronic output signals.

Example 39 is the method of example 38, wherein: the optical carrier signals are routed to the first optical modulator cells along first geometrically delay-matched optical paths; the first modulated optical signals are routed to the second optical modulator cells along second geometrically delay-matched optical paths; and the second modulated optical signals are routed to optical receivers that convert the optical output signals into electronic output signals along third geometrically delay-matched optical paths.

Example 40 is the method of example 38 or example 39, wherein: each of the first optical modulator cells is used to demultiplex the optical carrier signal into optical carrier signals at multiple wavelengths, modulate the optical carrier signals at the multiple wavelengths with multiple corresponding first amplitude modulators in accordance with multiple first vectors, and multiplex the modulated optical carrier signals at the multiple wavelengths into the first modulated optical signal; and converting the optical output signals associated with the multiple second vectors into respective electronic output signals comprises demultiplexing the optical output signals into optical output signals at the multiple wavelengths, and converting the optical output signals at the multiple wavelengths separately into electronic output signals.

The method of any of examples 38-40, further comprising balancing optical losses across optical paths from the optical input to optical receivers that convert the optical output signals into electronic output signals.

Although the inventive subject matter has been described with reference to specific example embodiments, it will be evident that various modifications and changes may be made to these embodiments without departing from the broader scope of the inventive subject matter. Accordingly, the specification and drawings are to be regarded in an illustrative rather than a restrictive sense.

What is claimed is:

1. A photonic circuit comprising:
a front-end optical splitter configured to split carrier light with uniform power coupling ratios into a plurality of optical carrier signals;
a plurality of first optical modulator cells configured to modulate the plurality of optical carrier signals in accordance with components of a first vector to generate a plurality of first modulated optical signals;
multiple sets of second optical modulator cells, each set associated with a corresponding one of multiple second vectors and comprising a plurality of second optical modulator cells configured to modulate the plurality of first modulated optical signals in accordance with components of that second vector to generate a plurality of second modulated optical signals associated with that second vector;
a plurality of waveguide structures each configured to route a corresponding one of the plurality of first modulated optical signals to corresponding second optical modulator cells of the multiple sets of second optical modulator cells; and
multiple back-end optical combiners each associated with a corresponding one of the multiple second vectors and the associated set of second optical modulator cells and configured to coherently combine the plurality of second modulated optical signals associated with that second vector with uniform power coupling ratios into an optical output signal that represents a scalar product between the first vector and the second vector.

2. The photonic circuit of claim 1, wherein the front-end splitter and each of the multiple back-end optical combiners comprises a symmetric cascade of 3 dB couplers.

3. The photonic circuit of claim 1, wherein the multiple back-end optical combiners and the plurality of waveguide structures configured to route the first modulated optical signals to the second optical modulator cells form waveguide crossings, the photonic circuit further comprising dummy waveguide crossings in at least one of the back-end optical combiners or the waveguide structures configured to route the first modulated optical signals to the second optical modulator cells, wherein for each of the sets of second optical modulator cells, the waveguide crossings and the dummy waveguide crossings are balanced in sum across all paths from the plurality of second optical modulator cells of the set to an output of the associated back-end optical combiner.

4. The photonic circuit of claim 1, wherein each of the plurality of waveguide structures comprises, arranged along a waveguide, a series of optical couplers that sequentially couple power fractions of the corresponding first modulated optical signal to the corresponding second optical modulator cells of the multiple sets of second optical modulator cells.

5. The photonic circuit of claim 4, wherein power coupling ratios of the series of optical couplers are configured to balance optical input power across all sets of second optical modulator cells.

6. The photonic circuit of claim 4, wherein the second optical modulator cells of the plurality of sets are arranged in a rectangular array of rows and columns, the waveguides of the waveguide structures configured to route the first modulated optical signals to the second optical modulator cells being arranged along the rows, and the second optical modulator cells of each set being arranged along a corresponding one of the columns.

7. The photonic circuit of claim 6, wherein the multiple back-end optical combiners are each configured to coherently combine the plurality of second modulated optical signals at a bottom of the corresponding column, following all waveguide crossings of the back-end optical combiners with the waveguide structures configured to route the first modulated optical signals.

8. The photonic circuit of claim 6, wherein the multiple back-end optical combiners are each configured to combine pairs of the second modulated optical signals in between the corresponding waveguides of the waveguide structures configured to route the first modulated optical signals, preceding waveguide crossings of the back-end optical combiner with the waveguide structures.

9. The photonic circuit of claim 1, wherein the second optical modulator cells comprise optical amplitude modulators collectively configurable to implement any positive real-valued matrix.

10. The photonic circuit of claim 9, wherein the second optical modulator cells further comprise optical phase modulators collectively configurable, in conjunction with the optical amplitude modulators, to implement any real-valued or complex-valued matrix.

11. The photonic circuit of claim 1, further comprising, at outputs of the multiple back-end optical combiners, optical amplifiers or attenuators collectively configurable to restore a fidelity of the photonic circuits to 100%.

12. The photonic circuit of claim 1, further comprising, at outputs of the multiple back-end optical combiners, multiple respective optical receivers configured to convert the optical output signals into respective electronic output signals.

13. The photonic circuit of claim 12, wherein:
the first optical modulator cells are wavelength-division-multiplexed optical modulator cells configured to modulate light at multiple wavelengths in accordance with multiple first vectors; and
the multiple receivers are wavelength-division-multiplexed receivers each configured to generate multiple electronic output signals, the multiple electronic output signals representative of scalar products of the multiple first vectors with the second vector associated with the receiver.

14. The photonic circuit of claim 12, wherein:
the front-end optical splitter is configured to route the plurality of optical carrier signals from an optical input to the first optical modulator cells along first geometrically delay-matched optical paths;
the plurality of waveguide structures are configured to route the first modulated optical signals from the first optical modulator cells to the second optical modulator cells along second geometrically delay-matched optical paths; and
the multiple back-end optical combiners are configured to route the second modulated optical signals to the receivers along third geometrically delay-matched optical paths.

15. The photonic circuit of claim 14, wherein the plurality of waveguide structures are configured as symmetric optical waveguide trees with couplers of uniform power coupling ratios at their junctions.

16. The photonic circuit of claim 15, wherein:
the first optical modulator cells are arranged linearly along a first dimension; and
the second optical modulators cells of all sets of second optical modulators cells are arranged linearly along the first dimension, parallel to the first optical modulator cells, ordered based on their associated first modulated optical signals to form spatial groupings each associated with one of the first modulated optical signals.

17. The photonic circuit of claim 16, wherein:
the multiple optical receivers are arranged linearly along the first dimension, parallel to the first optical modulator cells and the second optical modulator cells of all sets of second optical modulator cells; and
the second optical modulator cells within each grouping are arranged in a same order as the multiple optical receivers with which they are associated, such that each of the back-end optical combiners combines light from second optical modulator cells at positions within each of the groupings that correspond to a position of the associated optical receiver within the linearly arranged multiple optical receivers.

18. The photonic circuit of claim 16, wherein:
the multiple optical receivers are arranged linearly along a second dimension that is perpendicular to the first dimension; and
the second optical modulator cells within each of a first half of the groupings along the first dimension are arranged in a same order as the multiple optical receivers with which they are associated and the second optical modulator cells within each of a second half of the groupings along the first dimension are arranged in a reverse order to the multiple optical receivers with which they are associated, such that each of the multiple back-end optical combiners combines light from second optical modulator cells at positions within the groupings that mirror each other between the first half and the second half.

19. The photonic circuit of claim 16, wherein:
the multiple optical receivers are arranged linearly along a second dimension that is perpendicular to the first dimension; and
the second optical modulator cells are arranged within the groupings alternatingly in a same order as or in a reverse order to the multiple optical receivers with which they are associated, such that each of the multiple back-end optical combiners combines light from second optical modulator cells at positions within the groupings that mirror each other between adjacent groupings along the first dimension.

20. The photonic circuit of claim 14, wherein:
the first optical modulator cells are arranged linearly along a first dimension;
the second optical modulator cells within each of the sets are arranged linearly along the first dimension, parallel to the first optical modulator cells; and
the sets of second optical modulator cells are arranged linearly along a second dimension that is perpendicular to the first dimension.

21. The photonic circuit of claim 12, wherein the optical receivers comprise one or more coherent receivers each including an optical mixer configured to mix the respective optical output signal with a local oscillator signal, a pair of photodetectors to measure intensities of optical outputs of the optical mixer, and an optical amplifier to combine electronic outputs of the pair of photodetectors.

22. The photonic circuit of claim 1, wherein each of the back-end optical combiners comprises a cascade of 3 dB couplers formed at junctions of an inverse optical waveguide tree, and preceding each of the junctions, a phase shifter in each waveguide of a pair of waveguides combined at the junction.

23. A method comprising:
receiving coherent light at an optical input;
splitting the coherent light with uniform power coupling ratios into a plurality of optical carrier signals;
routing the optical carrier signals to a plurality of first optical modulator cells;
using the first optical modulator cells to modulate the optical carrier signals in accordance with components of a first vector to generate a plurality of first modulated optical signals;
splitting each of the first modulated optical signals with uniform power coupling ratios between multiple sets of second optical modulator cells associated with multiple respective second vectors;
routing each of the first modulated optical signals to second optical modulator cells, within the multiple sets, that are associated with components of the second vectors corresponding to the component of the first vector associated with the first modulated optical signal;
using the second optical modulator cells of each set to modulate the first modulated optical signals in accordance with corresponding components of the second vector associated with the set to generate second modulated optical signals;
coherently combining the second modulated optical signals associated with each of the second vectors with equal power coupling ratios into an optical output signal associated with the second vector and routing; and
converting the optical output signals associated with the multiple second vectors into respective electronic output signals.

* * * * *